(12) United States Patent
Zhang et al.

(10) Patent No.: US 11,653,002 B2
(45) Date of Patent: May 16, 2023

(54) MOTION CANDIDATE LIST CONSTRUCTION FOR VIDEO CODING

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yang Wang, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/541,092

(22) Filed: Dec. 2, 2021

(65) Prior Publication Data

US 2022/0103828 A1 Mar. 31, 2022

Related U.S. Application Data

(63) Continuation of application No. PCT/CN2020/094865, filed on Jun. 8, 2020.

(30) Foreign Application Priority Data

| Jun. 6, 2019 | (WO) | ............... PCT/CN2019/090409 |
| Jun. 22, 2019 | (WO) | ............... PCT/CN2019/092438 |
| Sep. 10, 2019 | (WO) | ............... PCT/CN2019/105180 |

(51) Int. Cl.
*H04N 19/52* (2014.01)
*H04N 19/137* (2014.01)
(Continued)

(52) U.S. Cl.
CPC ......... *H04N 19/137* (2014.11); *H04N 19/105* (2014.11); *H04N 19/132* (2014.11); *H04N 19/176* (2014.11)

(58) Field of Classification Search
CPC ...... H04N 19/61; H04N 19/52; H04N 19/105; H04N 19/137; H04N 19/159; H04N 19/51
See application file for complete search history.

(56) References Cited

U.S. PATENT DOCUMENTS 9,357,214 B2 5/2016 Zhang et al.
9,432,685 B2 8/2016 Chon et al.
(Continued)

FOREIGN PATENT DOCUMENTS

| CN | 104754343 A | 7/2015 |
| CN | 106576152 A | 4/2017 |

(Continued)

OTHER PUBLICATIONS

History-Based Motion Vector Prediction considering parallel processing, 2018; Park (Year: 2018).*
(Continued)

*Primary Examiner* — Luis Perez-Fuentes
(74) *Attorney, Agent, or Firm* — Perkins Coie LLP

(57) ABSTRACT

A method of video processing includes determining, for a conversion between a current block of a video and a bitstream representation of the video, an operation associated with a list of motion candidates based on a condition related to a characteristic of the current block. The list of motion candidates is constructed for a coding technique or based on information from previously processed blocks of the video. The method also includes performing the conversion based on the determining.

20 Claims, 28 Drawing Sheets

(51) Int. Cl.
  *H04N 19/105* (2014.01)
  *H04N 19/176* (2014.01)
  *H04N 19/132* (2014.01)

(56) References Cited

U.S. PATENT DOCUMENTS

| | | | |
|---|---|---|---|
| 9,491,461 B2 | 11/2016 | Chen et al. | |
| 9,538,180 B2 | 1/2017 | Zhang et al. | |
| 9,549,180 B2 | 1/2017 | Chen et al. | |
| 9,609,347 B2 | 3/2017 | Thirumalai et al. | |
| 9,699,450 B2 | 7/2017 | Zhang et al. | |
| 9,716,899 B2 | 7/2017 | Thirumalai et al. | |
| 9,800,895 B2 | 10/2017 | Thirumalai et al. | |
| 9,924,168 B2 | 3/2018 | Zhang et al. | |
| 10,045,014 B2 | 8/2018 | Zhang et al. | |
| 10,057,574 B2 | 8/2018 | Li et al. | |
| 10,057,594 B2 | 8/2018 | Xiu et al. | |
| 10,165,252 B2 | 12/2018 | An et al. | |
| 10,326,986 B2 | 6/2019 | Zhang et al. | |
| 10,362,330 B1 * | 7/2019 | Li | H04N 19/44 |
| 10,440,378 B1 * | 10/2019 | Xu | H04N 19/423 |
| 10,448,010 B2 | 10/2019 | Chen et al. | |
| 10,462,439 B2 | 10/2019 | He et al. | |
| 10,560,718 B2 | 2/2020 | Li et al. | |
| 10,567,789 B2 | 2/2020 | Chen et al. | |
| 10,567,799 B2 | 2/2020 | Liu et al. | |
| 10,721,489 B2 | 7/2020 | Chen et al. | |
| 10,743,016 B2 * | 8/2020 | Lai | H04N 19/107 |
| 10,785,494 B2 | 9/2020 | Chien et al. | |
| 10,841,607 B2 * | 11/2020 | Park | H04N 19/176 |
| 10,958,934 B2 * | 3/2021 | Li | H04N 19/52 |
| 11,051,034 B2 * | 6/2021 | Han | H04N 19/159 |
| 11,128,884 B2 | 9/2021 | Liu et al. | |
| 11,245,892 B2 * | 2/2022 | Zhang | H04N 19/137 |
| 11,277,624 B2 * | 3/2022 | Zhang | H04N 19/593 |
| 11,284,088 B2 * | 3/2022 | Zhang | H04N 19/186 |
| 11,381,832 B2 * | 7/2022 | Li | H04N 19/44 |
| 2013/0329007 A1 | 12/2013 | Zhang et al. | |
| 2013/0336406 A1 | 12/2013 | Zhang et al. | |
| 2014/0071235 A1 | 3/2014 | Zhang et al. | |
| 2014/0376634 A1 | 12/2014 | Guo et al. | |
| 2016/0100189 A1 | 4/2016 | Pang et al. | |
| 2016/0105670 A1 | 4/2016 | Pang et al. | |
| 2016/0219278 A1 | 7/2016 | Chen et al. | |
| 2016/0330471 A1 | 8/2016 | Zhu et al. | |
| 2016/0373756 A1 | 12/2016 | Yu et al. | |
| 2017/0195677 A1 | 7/2017 | Ye et al. | |
| 2017/0289566 A1 | 10/2017 | He et al. | |
| 2018/0205946 A1 | 7/2018 | Zhang et al. | |
| 2018/0343463 A1 | 11/2018 | Xiu et al. | |
| 2019/0014325 A1 | 1/2019 | Lin et al. | |
| 2019/0104303 A1 | 4/2019 | Xiu et al. | |
| 2019/0116374 A1 | 4/2019 | Zhang et al. | |
| 2020/0014948 A1 * | 1/2020 | Lai | H04N 19/43 |
| 2020/0186820 A1 * | 6/2020 | Park | H04N 19/52 |
| 2020/0195959 A1 | 6/2020 | Zhang et al. | |
| 2020/0374542 A1 | 11/2020 | Zhang et al. | |
| 2020/0413044 A1 | 12/2020 | Zhang et al. | |
| 2021/0006787 A1 | 1/2021 | Zhang et al. | |
| 2021/0006788 A1 | 1/2021 | Zhang et al. | |
| 2021/0006790 A1 | 1/2021 | Zhang et al. | |
| 2021/0021811 A1 | 1/2021 | Xiu et al. | |
| 2021/0021856 A1 | 1/2021 | Zhang et al. | |
| 2021/0029373 A1 * | 1/2021 | Park | H04N 19/44 |
| 2021/0029374 A1 | 1/2021 | Zhang et al. | |
| 2021/0051324 A1 | 2/2021 | Zhang et al. | |
| 2021/0076029 A1 | 3/2021 | Han et al. | |
| 2021/0092379 A1 | 3/2021 | Zhang et al. | |
| 2021/0092436 A1 | 3/2021 | Zhang et al. | |
| 2021/0105482 A1 | 4/2021 | Zhang et al. | |
| 2021/0127129 A1 | 4/2021 | Zhang et al. | |
| 2021/0152846 A1 | 5/2021 | Zhang et al. | |
| 2021/0160529 A1 | 5/2021 | Zhang et al. | |
| 2021/0160532 A1 | 5/2021 | Zhang et al. | |
| 2021/0185342 A1 | 6/2021 | Zhang et al. | |
| 2021/0195234 A1 | 6/2021 | Zhang et al. | |
| 2021/0211647 A1 | 7/2021 | Liu et al. | |
| 2021/0235073 A1 | 7/2021 | Liu et al. | |
| 2021/0235108 A1 | 7/2021 | Zhang et al. | |
| 2021/0250602 A1 | 8/2021 | Zhang et al. | |
| 2021/0258575 A1 | 8/2021 | Zhang et al. | |
| 2021/0266537 A1 | 8/2021 | Zhang et al. | |
| 2021/0266562 A1 | 8/2021 | Zhang et al. | |
| 2021/0281859 A1 | 9/2021 | Zhang et al. | |
| 2021/0281875 A1 | 9/2021 | Liu et al. | |
| 2021/0281877 A1 | 9/2021 | Liu et al. | |
| 2021/0297659 A1 | 9/2021 | Zhang et al. | |
| 2021/0321092 A1 | 10/2021 | Zhang et al. | |
| 2021/0329227 A1 | 10/2021 | Zheng et al. | |
| 2021/0337232 A1 | 10/2021 | Zheng et al. | |
| 2021/0352312 A1 | 11/2021 | Zhang et al. | |
| 2021/0385451 A1 | 12/2021 | Zhang et al. | |
| 2021/0409684 A1 | 12/2021 | Wang et al. | |
| 2021/0409720 A1 | 12/2021 | Meng et al. | |
| 2022/0007053 A1 | 1/2022 | Hanhart et al. | |
| 2022/0094917 A1 | 3/2022 | Zhang et al. | |
| 2022/0094927 A1 | 3/2022 | Zhang et al. | |
| 2022/0116592 A1 | 4/2022 | Zhang et al. | |

FOREIGN PATENT DOCUMENTS

| | | | |
|---|---|---|---|
| CN | 106797476 A | 5/2017 | |
| CN | 107211144 A | 9/2017 | |
| WO | 2015176678 A1 | 11/2015 | |
| WO | 2016138513 A1 | 9/2016 | |
| WO | 2016165623 A1 | 10/2016 | |

OTHER PUBLICATIONS

History-based Motion Vector Prediction; Jul. 2018; Zhang et al. (Year: 2018).*

Fixed sub-block size and restriction for ATMVP, Oct. 3-12, 2018; Lee; et al. (Year: 2018).*

History-Based Motion Vector Prediction considering parallel processing, 2018; Park et al. (Year: 2018).*

Restrictions on History-based Motion Vector Prediction; Jun. 2019— Zhang; et al. (Year: 2019).*

Bross et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1001, 2019.

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.

Chen et al. "Algorithm Description of Joint Exploration Test Model 7 (JEM 7)," Joint Video Exploration Team (JVET) of TU-T SG 16 WP 3 and ISO/IEC JTC 1/SC 29/WG 11, 7th Meeting: Torino, IT, Jul. 13-21, 2017, document JVET-31001, 2017.

Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0100, 2018.

Han et al. "CE4: Modification on History-based Motion Vector Prediction." Joint Video Exploration Team (JVET) of ITU-T SG 16 WP 3 and ISO/IEC JTC 1/SC 29/WG 11 13th Meeting: Marrakech, MA, Jan. 9-18, 2019, document JVET-M0126, 2019.

"Information Technology—High Efficiency Coding and Media Delivery in Heterogeneous Environments—Part 2: High Efficiency Video Coding" Apr. 20, 2018, ISO/DIS 23008, 4th Edition.

Jeong et al. "CE4 Ultimate Motion Vector Expression (Test 4.5.4)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0054, 2018.

Li et al. "Non-CE8: IBC Modifications," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0201, 2019.

(56) References Cited

OTHER PUBLICATIONS

Rosewarne et al. "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG11 25th Meeting: Chengdu, CN, Oct. 14-21, 2016, document JCTVC-Y1002, 2016.

Sethuraman et al. "CE9: Results of DMVR Related Tests CE9.2.1 and CE9.2.2," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0147, 2019.

Wang et al. "CE4-related: An Improved Method for Triangle Merge List Construction," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0340, 2019.

Xu et al. "CE8-related: Combination Test of JVET-N0176/JVET-N0317/JVET-N0382 on Simplification of IBC Vector Prediction," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0843, 2019.

Yang et al. "CE4: Summary Report on Inter Prediction and Motion Vector Coding," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0024, 2019.

JEM-7.0: https://jvet.hhi.fraunhofer.de/svn/svn_HMJEMSoftware/tags/HM-16.6-JEM-7.0.

https://vcgit.hhi.fraunhofer.de/jvet/WVCSoftware_VTM/-/tags/VTM-5.0.

International Search Report and Written Opinion from International Patent Application No. PCT/CN2020/094863 dated Aug. 28, 2020 (10 pages).

International Search Report and Written Opinion from International Patent Application No. PCT/CN2020/094864 dated Sep. 23, 2020 (11 pages).

International Search Report and Written Opinion from International Patent Application No. PCT/CN2020/094865 dated Aug. 27, 2020 (10 pages).

International Search Report and Written Opinion from International Patent Application No. PCT/CN2020/097373 dated Sep. 14, 2020 (10 pages).

Zhang et al. "CE4: History-based Motion Vector Prediction (Test 4.4.7)," Joint Video Experts Team (JVET) of ITU-T SG 16 WP 3 and ISO/IEC JTC 1/SC 29/WG 11 12th Meeting: Maaco, CN, Oct. 3-12, 2018, document JVET-L0266, 2018.

Extended European Search Report from European Patent Application No. 20818889.6 dated Oct. 28, 2022 (16 pages).

Zhang et al. "CE4-Related: Restrictions on History-based Motion Vector Prediction," Joint Video Experts Team (JVET) of ITU-T SG 16 WP 3 and ISO/IEC JTC 1/SC 29/WG 11 13th Meeting: Marrakech, MA, Jan. 9-18, 2018, document JVET-M0272, 2019.

Chen et al. "Algorithm Description for Versatile Video Coding and Test Model 5 (VTM5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0340, 2019 (cited in JP2021-572490 OA dated Feb. 21, 2023).

* cited by examiner

FIG. 16

MOTION CANDIDATE LIST CONSTRUCTION FOR VIDEO CODING

CROSS REFERENCE TO RELATED APPLICATIONS

This application is a continuation of International Patent Application No. PCT/CN2020/094865, filed on Jun. 8, 2020, which claims the priority to and benefits of International Patent Application No. PCT/CN2019/090409 filed on Jun. 6, 2019, International Patent Application No. PCT/CN2019/092438 filed on Jun. 22, 2019, and International Patent Application No. PCT/CN2019/105180 filed on Sep. 10, 2019. All the aforementioned patent applications are hereby incorporated by reference in their entireties.

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments to perform coding or decoding of video bitstreams intra block copy partitioning techniques at the sub-block level.

In one example aspect, a method of video processing is disclosed. The method includes determining, for a conversion between a current block of a video and a bitstream representation of the video, that the current block is split into multiple sub-blocks. At least one of the multiple blocks is coded using a modified intra-block copy (IBC) coding technique that uses reference samples from one or more video regions from a current picture of the current block. The method also includes performing the conversion based on the determining.

In another example aspect, a method of video processing is disclosed. The method includes determining, for a conversion between a current block of a video and a bitstream representation of the video, that the current block is split into multiple sub-blocks. Each of the multiple sub-blocks is coded in the coded representation using a corresponding coding technique according to a pattern. The method also includes performing the conversion based on the determining.

In another example aspect, a method of video processing is disclosed. The method includes determining, for a conversion between a current block of a video and a bitstream representation of the video, an operation associated with a list of motion candidates based on a condition related to a characteristic of the current block. The list of motion candidates is constructed for a coding technique or based on information from previously processed blocks of the video. The method also includes performing the conversion based on the determining.

In another example aspect, a method of video processing is disclosed. The method includes determining, for a conversion between a current block of a video and a bitstream representation of the video, that the current block coded using an inter coding technique based on temporal information is split into multiple sub-blocks. At least one of the multiple blocks is coded using a modified intra-block copy (IBC) coding technique that uses reference samples from one or more video regions from a current picture that includes the current block. The method also includes performing the conversion based on the determining.

In another example aspect, a method of video processing is disclosed. The method includes determining to use a sub-block intra block copy (sbIBC) coding mode in a conversion between a current video block in a video region and a bitstream representation of the current video block in which the current video block is split into multiple sub-blocks and each sub-block is coded based on reference samples from the video region, wherein sizes of the sub-blocks are based on a splitting rule and performing the conversion using the sbIBC coding mode for the multiple sub-blocks.

In another example aspect, a method of video processing is disclosed. The method includes determining to use a sub-block intra block copy (sbIBC) coding mode in a conversion between a current video block in a video region and a bitstream representation of the current video block in which the current video block is split into multiple sub-blocks and each sub-block is coded based on reference samples from the video region and performing the conversion using the sbIBC coding mode for the multiple sub-blocks, wherein the conversion includes determining an initialized motion vector (initMV) for a given sub-block, identifying a reference block from the initMV, and deriving motion vector (MV) information for the given sub-block using MV information for the reference block.

In another example aspect, a method of video processing is disclosed. The method includes determining to use a sub-block intra block copy (sbIBC) coding mode in a conversion between a current video block in a video region and a bitstream representation of the current video block in which the current video block is split into multiple sub-blocks and each sub-block is coded based on reference samples from the video region and performing the conversion using the sbIBC coding mode for the multiple sub-blocks, wherein the conversion includes generating a sub-block IBC candidate.

In another example aspect, a method of video processing is disclosed. The method includes performing a conversion between a bitstream representation of a current video block and the current video block that is divided into multiple sub-blocks, wherein the conversion includes processing a first sub-block of the multiple sub-blocks using a sub-block intra block coding (sbIBC) mode and a second sub-block of the multiple sub-blocks using an intra coding mode.

In another example aspect, a method of video processing is disclosed. The method includes performing a conversion between a bitstream representation of a current video block and the current video block that is divided into multiple sub-blocks, wherein the conversion includes processing all sub-blocks of the multiple sub-blocks using an intra coding mode.

In another example aspect, a method of video processing is disclosed. The method includes performing a conversion between a bitstream representation of a current video block and the current video block that is divided into multiple sub-blocks, wherein the conversion includes processing all of the multiple sub-blocks using a palette coding mode in which a palette of representative pixel values is used for coding each sub-block.

In another example aspect, a method of video processing is disclosed. The method includes performing a conversion between a bitstream representation of a current video block and the current video block that is divided into multiple sub-blocks, wherein the conversion includes processing a first sub-block of the multiple sub-blocks using a palette mode in which a palette of representative pixel values is used for coding the first sub-block and a second sub-block of the multiple sub-blocks using an intra block copy coding mode.

In another example aspect, a method of video processing is disclosed. The method includes performing a conversion between a bitstream representation of a current video block and the current video block that is divided into multiple sub-blocks, wherein the conversion includes processing a first sub-block of the multiple sub-blocks using a palette mode in which a palette of representative pixel values is used for coding the first sub-block and a second sub-block of the multiple sub-blocks using an intra coding mode.

In another example aspect, a method of video processing is disclosed. The method includes performing a conversion between a bitstream representation of a current video block and the current video block that is divided into multiple sub-blocks, wherein the conversion includes processing a first sub-block of the multiple sub-blocks using a sub-block intra block coding (sbIBC) mode and a second sub-block of the multiple sub-blocks using an inter coding mode.

In another example aspect, a method of video processing is disclosed. The method includes performing a conversion between a bitstream representation of a current video block and the current video block that is divided into multiple sub-blocks, wherein the conversion includes processing a first sub-block of the multiple sub-blocks using a sub-block intra coding mode and a second sub-block of the multiple sub-blocks using an inter coding mode.

In another example aspect, a method of video processing is disclosed. The method includes making a decision to use the method recited in any of above claims for encoding the current video block into the bitstream representation; and including information indicative of the decision in the bitstream representation at a decoder parameter set level or a sequence parameter set level or a video parameter set level or a picture parameter set level or a picture header level or a slice header level or a tile group header level or a largest coding unit level or a coding unit level or a largest coding unit row level or a group of LCU level or a transform unit level or a prediction unit level or a video coding unit level.

In another example aspect, a method of video processing is disclosed. The method includes making a decision to use the method recited in any of above claims for encoding the current video block into the bitstream representation based on an encoding condition; and performing the encoding using the method recited in any of the above claims, wherein the condition is based on one or more of: a position of coding unit, prediction unit, transform unit, the current video block or a video coding unit of the current video block.

In another example aspect, a method of video processing is disclosed. The method includes determining to use an intra block copy mode and an inter prediction mode for conversion between blocks in a video region and a bitstream representation of the video region; and performing the conversion using the intra block copy mode and the inter prediction mode for a block in the video region.

In another example aspect, a method of video processing is disclosed. The method includes performing, during a conversion between a current video block and a bitstream representation of the current video block, a motion candidate list construction process depending and/or a table update process for updating history-based motion vector predictor tables, based on a coding condition, and performing the conversion based on the motion candidate list construction process and/or the table update process.

In another example aspect, the above-described methods may be implemented by a video decoder apparatus that comprises a processor.

In another example aspect, the above-described methods may be implemented by a video encoder apparatus that comprises a processor.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIG. 16 shows an example of motion vector storage.

DETAILED DESCRIPTION

Figure 1:
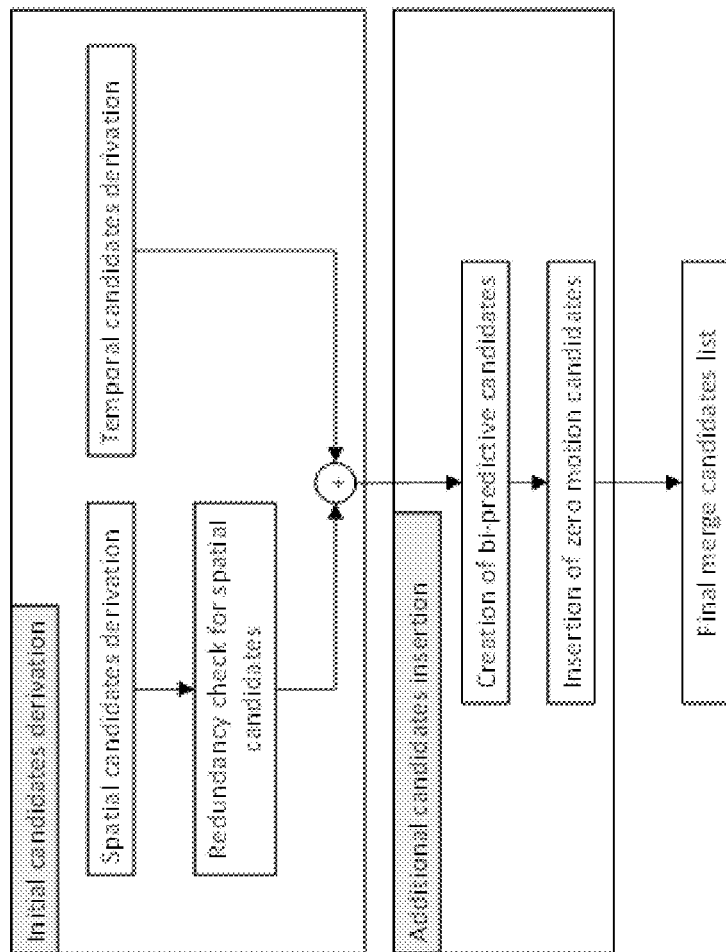
FIG. 1 shows a derivation process for merge candidate list construction.

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This document is related to video coding technologies. Specifically, it is related to intra block copy (a.k.a current picture referencing, CPR) coding. It may be applied to the existing video coding standard like HEVC, or the standard (Versatile Video Coding) to be finalized. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM) In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Inter Prediction in HEVC/H.265

For inter-coded coding units (CUs), it may be coded with one prediction unit (PU), 2 PUs according to partition mode. Each inter-predicted PU has motion parameters for one or two reference picture lists. Motion parameters include a motion vector and a reference picture index. Usage of one of the two reference picture lists may also be signaled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signaled explicitly per each PU. Such a mode is named Advanced motion vector prediction (AMVP) in this disclosure.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

2.1.1 Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 can be from past and future pictures in terms of capturing/display order.

2.1.2 Merge Mode 2.1.2.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
Step 1.1: Spatial candidates derivation
Step 1.2: Redundancy check for spatial candidates
Step 1.3: Temporal candidates derivation
Step 2: Additional candidates insertion
Step 2.1: Creation of bi-predictive candidates
Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.2.2 Spatial Candidates Derivation

Figure 2:
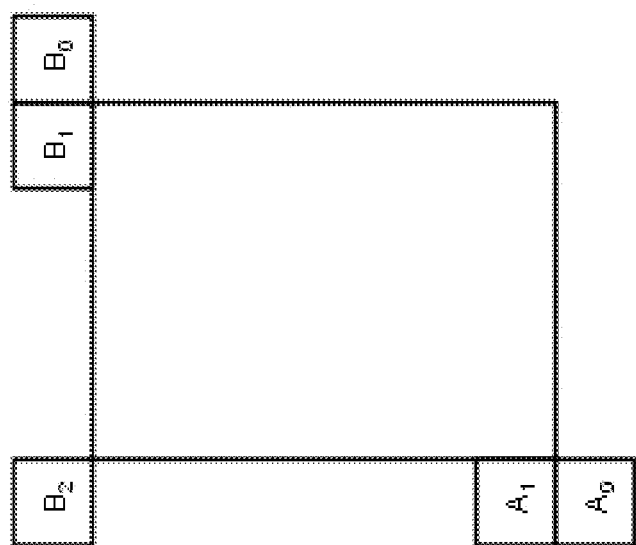
FIG. 2 shows an example of positions of spatial merge candidates.
Figure 3:
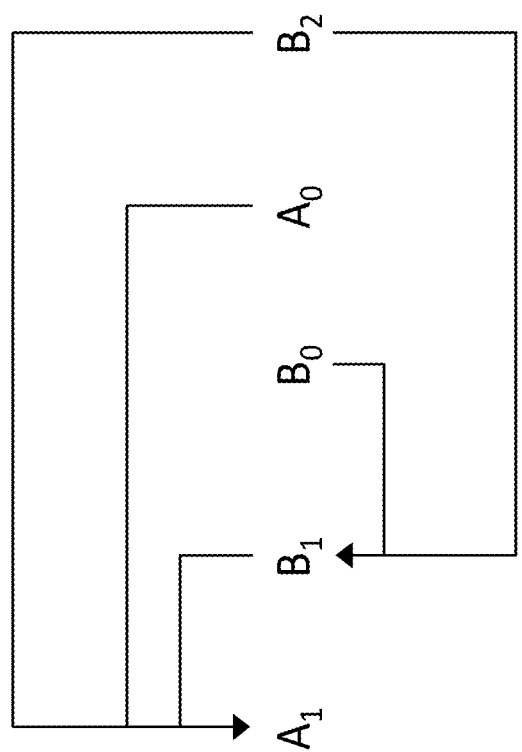
FIG. 3 shows an example of candidate pairs considered for redundancy check of spatial merge candidates.
Figure 4:
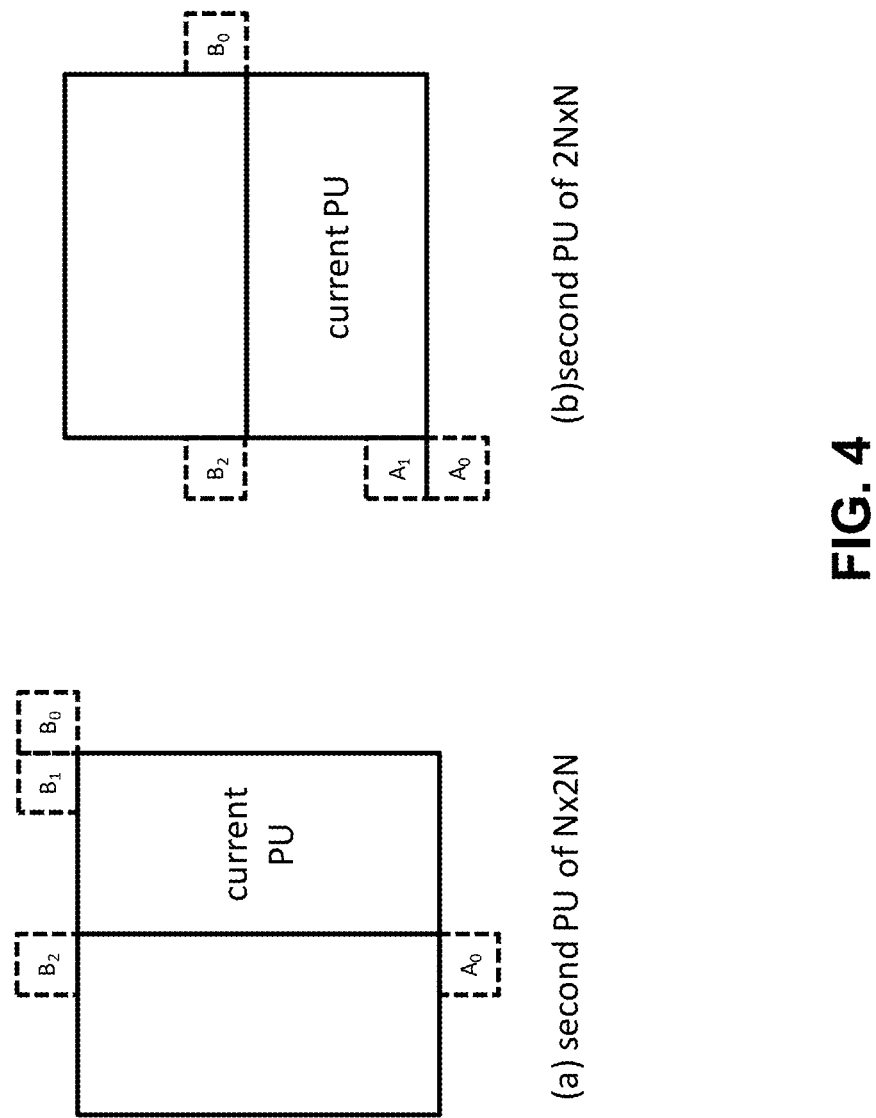
FIG. 4 shows an example positions for the second PU of N×2N and 2N×N partitions.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.1.2.3 Temporal Candidates Derivation

Figure 5:
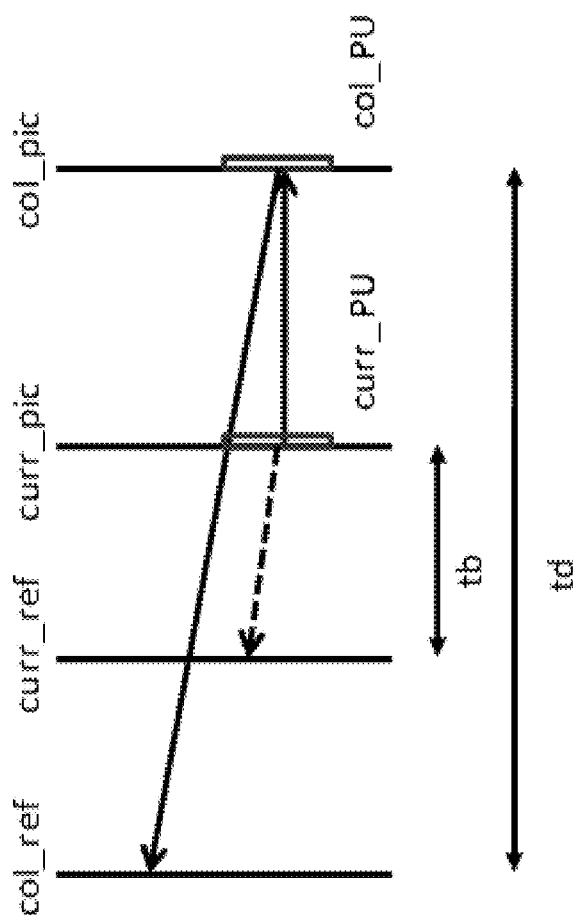
FIG. 5 shows examples of illustration of motion vector scaling for temporal merge candidate.

In this step, only one candidate is added to the list. Particularly, in the derivation of this temporal merge candidate, a scaled motion vector is derived based on co-located PU in a co-located picture. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

2.1.2.4 Co-Located Picture and Co-Located PU

When TMVP is enabled (e.g., slice_temporal_mvp_enabled_flag is equal to 1), the variable ColPic representing the col-located picture is derived as follows:

If current slice is B slice and the signalled collocated_from_l0_flag is equal to 0, ColPic is set equal to RefPicList1[collocated_ref_idx].

Otherwise (slice_type is equal to B and collocated_from_l0_flag is equal to 1, or slice_type is equal to P), ColPic is set equal to RefPicList0[collocated_ref_idx].

Here collocated_ref_idx and collocated_from_l0_flag are two syntax elements which may be signalled in slice header.

Figure 6:
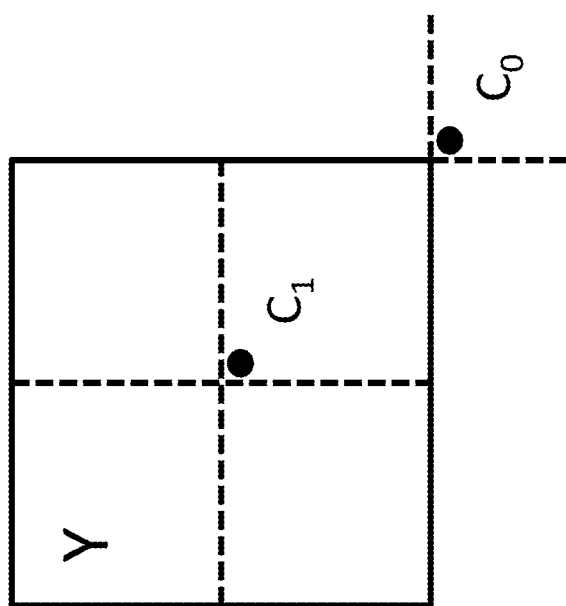
FIG. 6 shows an example of candidate positions for temporal merge candidate, C0 and C1.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current coding tree unit (CTU aka. LCU, largest coding unit) row, position $C_1$ is used. Otherwise, position $C_0$ is used in the derivation of the temporal merge candidate.

Related syntax elements are described as follows:

7.3.6.1 General Slice Segment Header Syntax

| | Descriptor |
|---|---|
| slice_segment_header( ) { | |
|   first_slice_segment_in_pic_flag | u(1) |
|   ... | |
|   if( slice_type = = P || slice_type = = B ) { | |
|     num_ref_idx_active_override_flag | u(1) |
|     if( num_ref_idx_active_override_flag ) { | |
|       num_ref_idx_l0_active_minus1 | ue(v) |
|       if( slice_type = = B ) | |
|         num_ref idx_l1_active_minus1 | ue(v) |
|     } | |
|   ... | |
|   if( slice_temporal_mvp_enabled_flag ) { | |
|     if( slice type = = B ) | |
|       collocated_from_l0_flag | u(1) |
|     if( ( collocated_from_l0_flag && num_ref_idx_l0_active_minus1 > 0 ) || | |
|       ( !collocated_from_l0_flag && num_ref_idx_l1_active_minus1 > 0 ) ) | |
|       collocated ref idx | ue(v) |
|   } | |
|   ... | |
|   byte_alignment( ) | |
| } | |

2.1.2.5 Derivation of MVs for the TMVP Candidate

More specifically, the following steps are performed in order to derive the TMVP candidate:

(1) set reference picture list X=0, target reference picture to be the reference picture with index equal to 0 (e.g., curr_ref) in list X. Invoke the derivation process for collocated motion vectors to get the MV for list X pointing to curr_ref.

(2) if current slice is B slice, set reference picture list X=1, target reference picture to be the reference picture with index equal to 0 (e.g., curr_ref) in list X. Invoke the derivation process for collocated motion vectors to get the MV for list X pointing to Curr_ref.

The derivation process for collocated motion vectors is described in the next sub-section.

2.1.2.5.1 Derivation Process for Collocated Motion Vectors

For the co-located block, it may be intra or inter coded with uni-prediction or bi-prediction. If it is intra coded, TMVP candidate is set to be unavailable.

If it is uni-prediction from list A, the motion vector of list A is scaled to the target reference picture list X.

If it is bi-prediction and the target reference picture list is X, the motion vector of list A is scaled to the target reference picture list X, and A is determined according to the following rules:

If none of reference pictures has a greater POC values compared to current picture, A is set equal to X.

Otherwise, A is set equal to collocated_from_l0_flag.

Some related descriptions are included as follows:

8.5.3.2.9 Derivation Process for Collocated Motion Vectors

Inputs to this process are:

a variable currPb specifying the current prediction block, a variable colPb specifying the collocated prediction block inside the collocated picture specified by ColPic, a luma location (xColPb, yColPb) specifying the top-left sample of the collocated luma prediction block specified by colPb relative to the top-left luma sample of the collocated picture specified by ColPic, a reference index refIdxLX, with X being 0 or 1.

Outputs of this process are:

the motion vector prediction mvLXCol, the availability flag availableFlagLXCol.

The variable currPic specifies the current picture.

The arrays predFlagL0Col[x][y], mvL0Col[x][y], and refIdxL0Col[x][y] are set equal to PredFlagL0[x][y], MvL0[x][y], and RefIdxL0[x][y], respectively, of the collocated picture specified by ColPic, and the arrays predFlagL1Col[x][y], mvL1Col[x][y], and refIdxL1Col[x][y] are set equal to PredFlagL1[x][y], MvL1[x][y], and RefIdxL1[x][y], respectively, of the collocated picture specified by ColPic.

The variables mvLXCol and availableFlagLXCol are derived as follows:

If colPb is coded in an intra prediction mode, both components of mvLXCol are set equal to 0 and availableFlagLXCol is set equal to 0.

Otherwise, the motion vector mvCol, the reference index refIdxCol, and the reference list identifier listCol are derived as follows:

If predFlagL0Col[xColPb][yColPb] is equal to 0, mvCol, refIdxCol, and listCol are set equal to mvL1Col[xColPb][yColPb], refIdxL1Col[xColPb][yColPb], and L1, respectively.

Otherwise, if predFlagL0Col[xColPb][yColPb] is equal to 1 and predFlagL1Col[xColPb][yColPb] is equal to 0, mvCol, refIdxCol, and listCol are set equal to mvL0Col[xColPb][yColPb], refIdxL0Col[xColPb][yColPb], and L0, respectively.

Otherwise (predFlagL0Col[xColPb][yColPb] is equal to 1 and predFlagL1Col[xColPb][yColPb] is equal to 1), the following assignments are made:

If NoBackwardPredFlag is equal to 1, mvCol, refIdxCol, and listCol are set equal to mvLXCol[xColPb][yColPb], refIdxLXCol[xColPb][yColPb], and LX, respectively.

Otherwise, mvCol, refIdxCol, and listCol are set equal to mvLNCol[xColPb][yColPb], refIdxLNCol[xColPb][yColPb], and LN, respectively, with N being the value of collocated_from_l0_flag.

and mvLXCol and availableFlagLXCol are derived as follows:

If LongTermRefPic(currPic, currPb, refIdxLX, LX) is not equal to LongTermRefPic(ColPic, colPb, refIdxCol, listCol), both components of mvLXCol are set equal to 0 and availableFlagLXCol is set equal to 0.

Otherwise, the variable availableFlagLXCol is set equal to 1, refPicListCol[refIdxCol] is set to be the picture with reference index refIdxCol in the reference picture list listCol of the slice containing prediction block colPb in the collocated picture specified by ColPic, and the following applies:

$$colPocDiff = DiffPicOrderCnt(ColPic, refPicListCol[refIdxCol]) \quad (2-1)$$

$$currPocDiff = DiffPicOrderCnt(currPic, RefPicListX[refIdxLX]) \quad (2-2)$$

If RefPicListX[refIdxLX] is a long-term reference picture, or colPocDiff is equal to currPocDiff, mvLXCol is derived as follows:

$$mvLXCol = mvCol \quad (2-3)$$

Otherwise, mvLXCol is derived as a scaled version of the motion vector mvCol as follows:

$$tx = (16384 + (Abs(td)td) >> 1))/td \quad (2-4)$$

$$distScaleFactor = Clip3(-4096, 4095, (tb*tx+32) >> 6) \quad (2-5)$$

$$mvLXCol = Clip3(-32768, 32767, Sign(distScaleFactor*mvCol)*((Abs(distScaleFactor*mvCol)+127) >> 8)) \quad (2-6)$$

where td and tb are derived as follows:

$$td = Clip3(-128, 127, colPocDiff) \quad (2-7)$$

$$tb = Clip3(-128, 127, currPocDiff) \quad (2-8)$$

Definition of NoBackwardPredFlag is:

The variable NoBackwardPredFlag is derived as follows:

If DiffPicOrderCnt(aPic, CurrPic) is less than or equal to 0 for each picture aPic in RefPicList0 or RefPicList1 of the current slice, NoBackwardPredFlag is set equal to 1.

Otherwise, NoBackwardPredFlag is set equal to 0.

2.1.2.6 Additional Candidates Insertion

Figure 7:
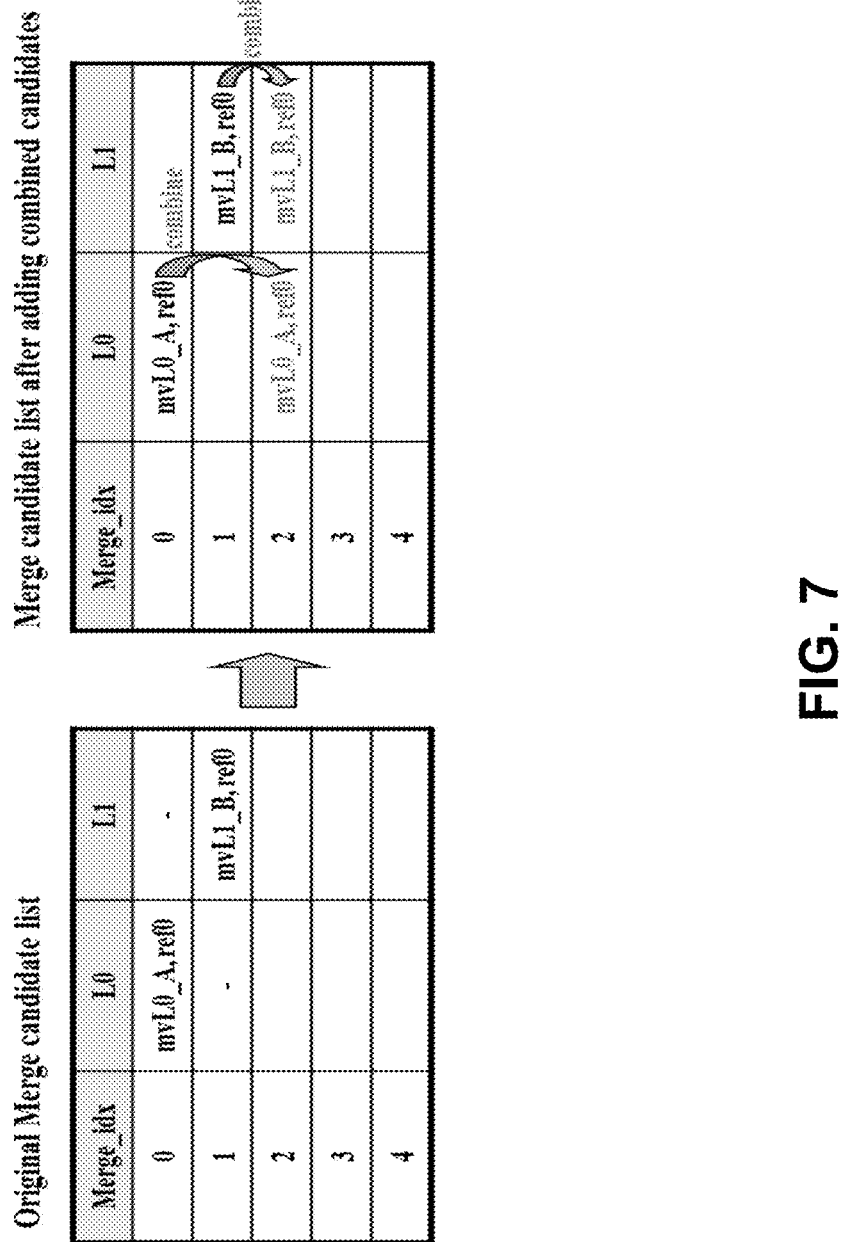
FIG. 7 shows example of combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. Finally, no redundancy check is performed on these candidates.

2.1.3 AMVP

AMVP exploits spatial-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (see FIG. 8). In the following sections, details about derivation process of motion vector prediction candidate are provided.

2.1.3.1 Derivation of AMVP Candidates

Figure 8:
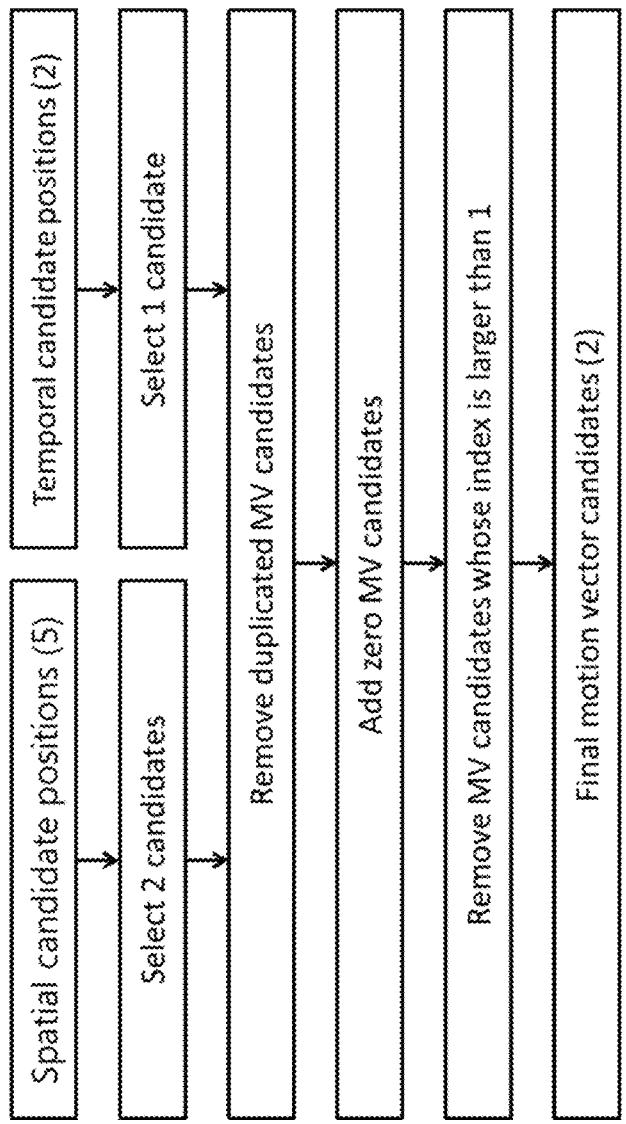
FIG. 8 shows examples of derivation process for motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No Spatial Scaling
(1) Same reference picture list, and same reference picture index (same POC)
(2) Different reference picture list, but same reference picture (same POC)

Spatial Scaling
(3) Same reference picture list, but different reference picture (different POC)
(4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
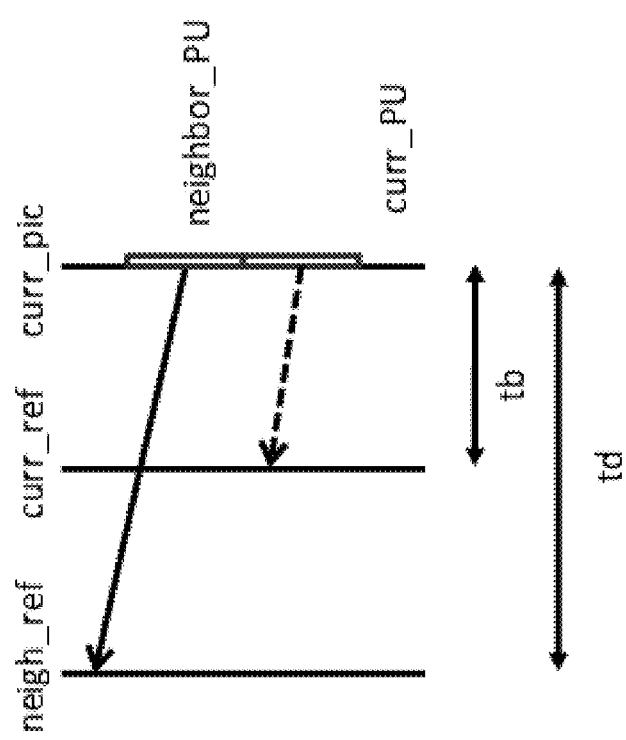
FIG. 9 shows an example illustration of motion vector scaling for spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.3.3 Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2 Inter Prediction Methods in VVC

There are several new coding tools for inter prediction improvement, such as Adaptive Motion Vector difference Resolution (AMVR) for signaling MVD, Merge with Motion Vector Differences (MMVD), Triangular prediction mode (TPM), Combined intra-inter prediction (CIIP), Advanced TMVP (ATMVP, aka SbTMVP), affine prediction mode, Generalized Bi-Prediction (GBI), Decoder-side Motion Vector Refinement (DMVR) and Bi-directional Optical flow (BIO, a.k.a BDOF).

There are three different merge list construction processes supported in VVC:

(1) Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.

(2) Regular merge list: For inter-coded blocks, one merge list construction process is shared. Here, the spatial/temporal merge candidates, HMVP, pairwise merge candidates and zero motion candidates may be inserted in order. Regular merge list size is signaled in slice header, and maximum value is 6. MMVD, TPM, CLIP rely on the regular merge list.

(3) IBC merge list: it is done in a similar way as the regular merge list.

Similarly, there are three AMVP lists supported in VVC:
(1) Affine AMVP candidate list
(2) Regular AMVP candidate list
(3) IBC AMVP candidate list: the same construction process as the IBC merge list.

2.2.1 Coding Block Structure in VVC

In VVC, a Quad-Tree/Binary Tree/Ternary-Tree (QT/BT/TT) structure is adopted to divide a picture into square or rectangle blocks.

Besides QT/BT/TT, separate tree (a.k.a. Dual coding tree) is also adopted in VVC for I-frames. With separate tree, the coding block structure are signaled separately for the luma and chroma components.

In addition, the CU is set equal to PU and TU, except for blocks coded with a couple of specific coding methods (such as intra sub-partition prediction wherein PU is equal to TU, but smaller than CU, and sub-block transform for inter-coded blocks wherein PU is equal to CU, but TU is smaller than PU).

2.2.2 Affine Prediction Mode

Figure 10:
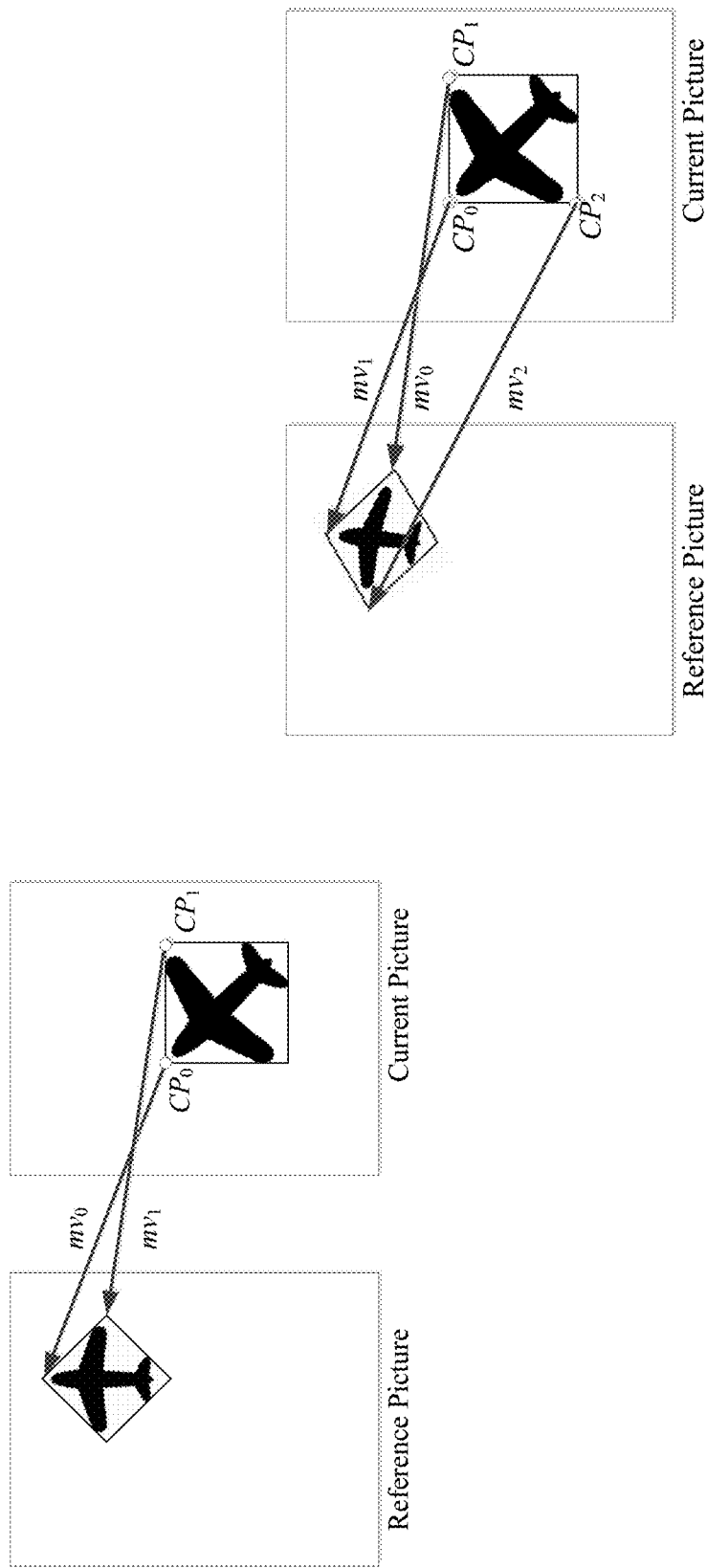
FIG. 10 shows an example simplified affine motion model for 4-parameter affine mode (left) and 6-parameter affine model (right).

In HEVC, only translation motion model is applied for motion compensation prediction (MCP). While in the real world, there are many kinds of motion, e.g. zoom in/out, rotation, perspective motions and the other irregular motions. In VVC, a simplified affine transform motion compensation prediction is applied with 4-parameter affine model and 6-parameter affine model. As shown FIG. 10 the affine motion field of the block is described by two control point motion vectors (CPMVs) for the 4-parameter affine model and 3 CPMVs for the 6-parameter affine model.

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and j) in equation (2) respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad (1)$$

-continued $$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad (2)$$

where $(mv^h_0, mv^h_0)$ is motion vector of the top-left corner control point, and $(mv^h_1, mv^h_1)$ is motion vector of the top-right corner control point and $(mv^h_2, mv^h_2)$ is motion vector of the bottom-left corner control point, all of the three motion vectors are called control point motion vectors (CPMV), (x, y) represents the coordinate of a representative point relative to the top-left sample within current block and $(mv^h(x,y), mv^v(x,y))$ is the motion vector derived for a sample located at (x, y). The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (e.g., 4×4 in VTM), the representative point is utilized to derive the motion vector for the whole sub-block.

Figure 11:
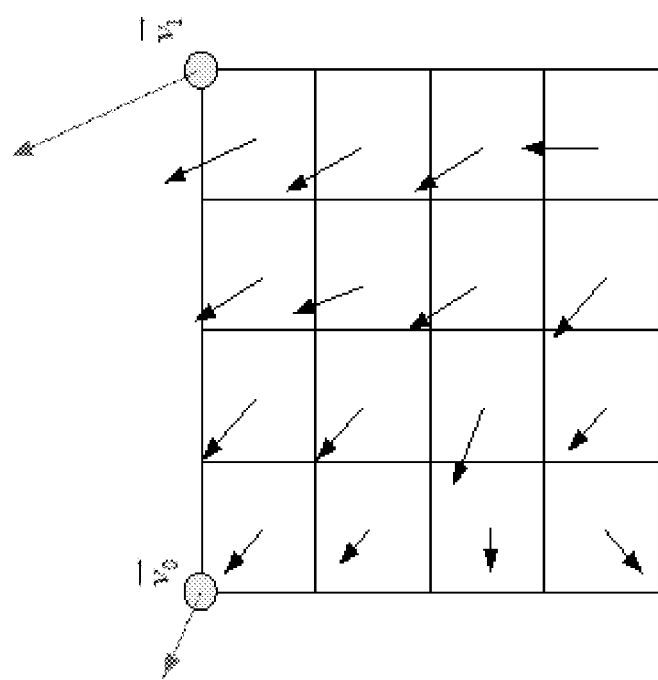
FIG. 11 shows an example of affine motion vector field per sub-block.

In order to further simplify the motion compensation prediction, sub-block based affine transform prediction is applied. To derive motion vector of each M×N (both M and N are set to 4 in current VVC) sub-block, the motion vector of the center sample of each sub-block, as shown in FIG. 11, is calculated according to Equation (1) and (2), and rounded to 1/16 fraction accuracy. Then the motion compensation interpolation filters for 1/16-pel are applied to generate the prediction of each sub-block with derived motion vector. The interpolation filters for 1/16-pel are introduced by the affine mode.

After MCP, the high accuracy motion vector of each sub-block is rounded and saved as the same accuracy as the normal motion vector.

2.2.3 MERGE for Whole Block 2.2.3.1 Merge List Construction of Translational Regular Merge Mode 2.2.3.1.1 History-Based Motion Vector Prediction (HMVP)

Different from the merge list design, in VVC, the history-based motion vector prediction (HMVP) method is employed.

Figure 12:
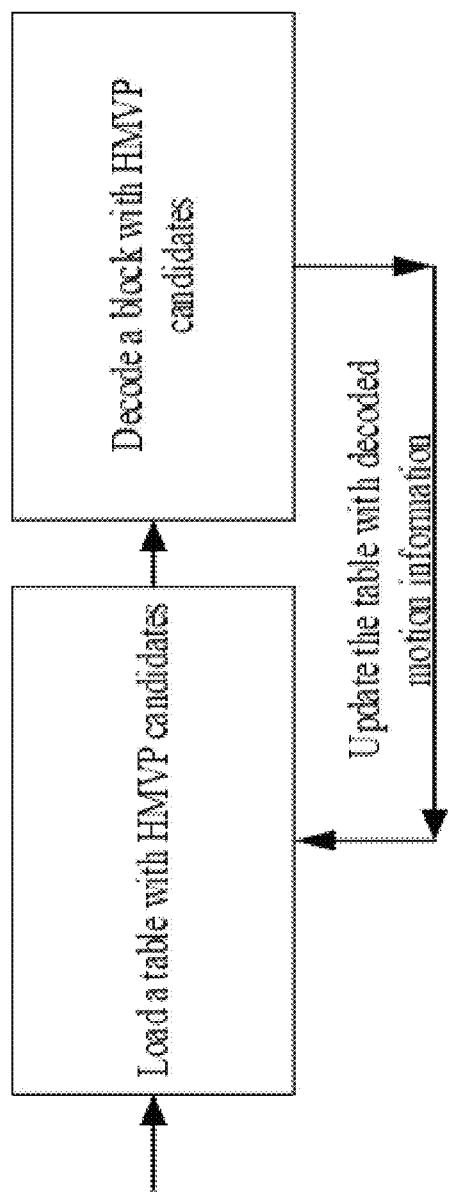
FIG. 12 shows an example Candidates position for affine merge mode.

In HMVP, the previously coded motion information is stored. The motion information of a previously coded block is defined as an HMVP candidate. Multiple HMVP candidates are stored in a table, named as the HMVP table, and this table is maintained during the encoding/decoding process on-the-fly. The HMVP table is emptied when starting coding/decoding a new tile/LCU row/a slice. Whenever there is an inter-coded block and non-sub-block, non-TPM mode, the associated motion information is added to the last entry of the table as a new HMVP candidate. The overall coding flow is depicted in FIG. 12.

2.2.3.1.2 Regular Merge List Construction Process

Figure 13:
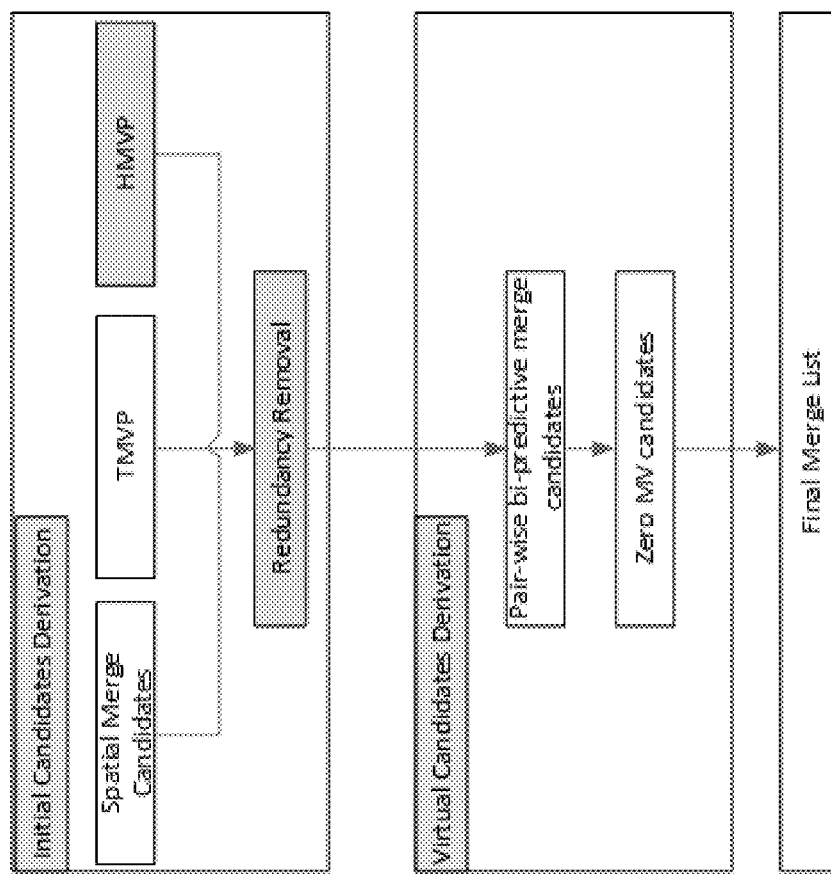
FIG. 13 shows an example of Modified merge list construction process.

The construction of the regular merge list (for translational motion) can be summarized according to the following sequence of steps:
 Step 1: Derivation of spatial candidates
 Step 2: Insertion of HMVP candidates
 Step 3: Insertion of pairwise average candidates
 Step 4: default motion candidates HMVP candidates can be used in both AMVP and merge candidate list construction processes. FIG. 13 depicts the modified merge candidate list construction process. When the merge candidate list is not full after the TMVP candidate insertion, HMVP candidates stored in the HMVP table can be utilized to fill in the merge candidate list. Considering that one block usually has a higher correlation with the nearest neighbouring block in terms of motion information, the HMVP candidates in the table are inserted in a descending order of indices. The last entry in the table is firstly added to the list, while the first entry is added in the end. Similarly, redundancy removal is applied on the HMVP candidates. Once the total number of available merge candidates reaches the maximal number of merge candidates allowed to be signaled, the merge candidate list construction process is terminated.

It is noted that all the spatial/temporal/HMVP candidate shall be coded with non-IBC mode. Otherwise, it is not allowed to be added to the regular merge candidate list.

HMVP table contains up to 5 regular motion candidates and each of them is unique.

2.2.3.1.2.1 Pruning Processes

A candidate is only added to the list if the corresponding candidate used for redundancy check has not the same motion information. Such comparison process is called pruning process.

The pruning process among the spatial candidates is dependent on the usage of TPM for current block.

When current block is coded without TPM mode (e.g., regular merge, MMVD, CIIP), the HEVC pruning process (e.g., five pruning) for the spatial merge candidates is utilized.

2.2.4 Triangular Prediction Mode (TPM)

In VVC, a triangle partition mode is supported for inter prediction. The triangle partition mode is only applied to CUs that are 8×8 or larger and are coded in merge mode but not in MMVD or CIIP mode. For a CU satisfying these conditions, a CU-level flag is signalled to indicate whether the triangle partition mode is applied or not.

Figure 14:
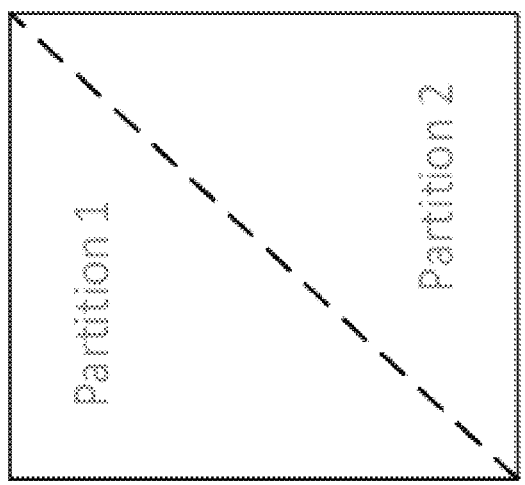
FIG. 14 shows an example of triangle partition based inter prediction.
Figure 14:
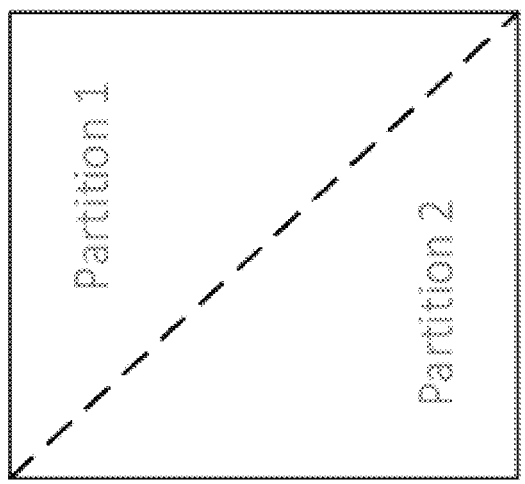

When this mode is used, a CU is split evenly into two triangle-shaped partitions, using either the diagonal split or the anti-diagonal split, as depicted in FIG. 14. Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU.

If the CU-level flag indicates that the current CU is coded using the triangle partition mode, a flag indicating the direction of the triangle partition (diagonal or anti-diagonal), and two merge indices (one for each partition) are further signalled. After predicting each of the triangle partitions, the sample values along the diagonal or anti-diagonal edge are adjusted using a blending processing with adaptive weights. This is the prediction signal for the whole CU and transform and quantization process will be applied to the whole CU as in other prediction modes. Finally, the motion field of a CU predicted using the triangle partition mode is stored in 4×4 units.

The regular merge candidate list is re-used for triangle partition merge prediction with no extra motion vector pruning. For each merge candidate in the regular merge candidate list, one and only one of its L0 or L1 motion vector is used for triangle prediction. In addition, the order of selecting the L0 vs. L1 motion vector is based on its merge index parity. With this scheme, the regular merge list can be directly used.

2.2.4.1 Merge List Construction Process for TPM

In some embodiments, the regular merge list construction process can include the following modifications:

(1) How to do the pruning process is dependent on the usage of TPM for current block If the current block is not coded with TPM, the HEVC 5 pruning applied to spatial merge candidates is invoked Otherwise (if the current block is coded with TPM), full pruning is applied when adding a new spatial merge candidates. That is, B1 is compared to A1; B0 is compared to A1 and B1; A0 is compared to A1, B1, and B0; B2 is compared to A1, B1, A0, and B0.

(2) The condition on whether to check of motion information from B2 is dependent on the usage of TPM for current block If the current block is not coded with TPM, B2 is accessed and checked only when there are less than 4 spatial merge candidates before checking B2.

Otherwise (if the current block is coded with TPM), B2 is always accessed and checked regardless how many available spatial merge candidates before adding B2.

2.2.4.2 Adaptive Weighting Process

After predicting each triangular prediction unit, an adaptive weighting process is applied to the diagonal edge between the two triangular prediction units to derive the final prediction for the whole CU. Two weighting factor groups are defined as follows:

$1^{st}$ weighting factor group: {7/8, 6/8, 4/8, 2/8, 1/8} and {7/8, 4/8, 1/8} are used for the luminance and the chrominance samples, respectively;

$2^{nd}$ weighting factor group: {7/8, 6/8, 5/8, 4/8, 3/8, 2/8, 1/8} and {6/8, 4/8, 2/8} are used for the luminance and the chrominance samples, respectively.

Weighting factor group is selected based on the comparison of the motion vectors of two triangular prediction units. The $2^{nd}$ weighting factor group is used when any one of the following condition is true:

the reference pictures of the two triangular prediction units are different from each other absolute value of the difference of two motion vectors' horizontal values is larger than 16 pixels.

absolute value of the difference of two motion vectors' vertical values is larger than 16 pixels.

Figure 15:
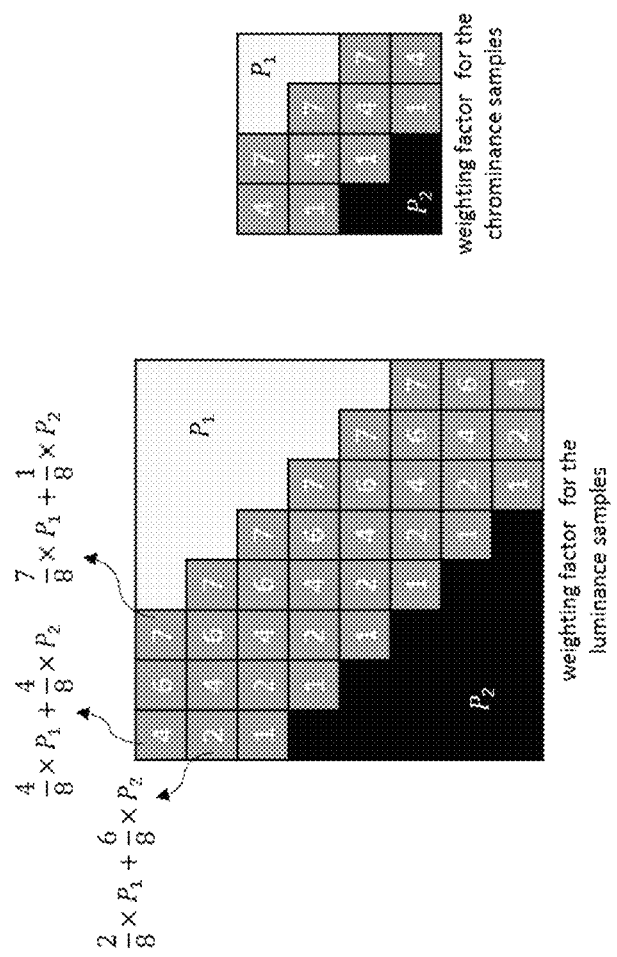
FIG. 15 shows an example of a CU applying the $1^{st}$ weighting factor group.
Figure 17:
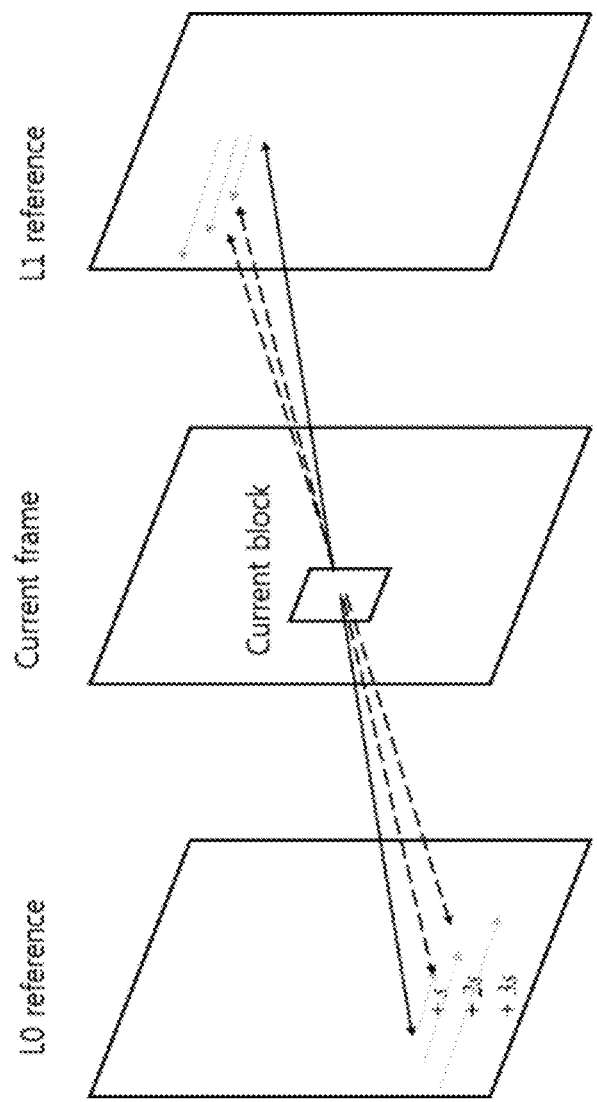
FIG. 17 shows an example of ultimate motion vector expression (UMVE) search process.
Figure 18:
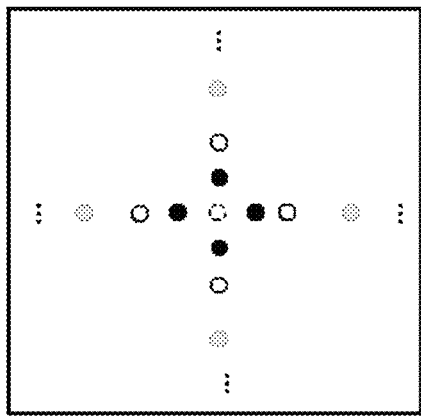
FIG. 18 shows an example of UMVE search points.
Figure 18:
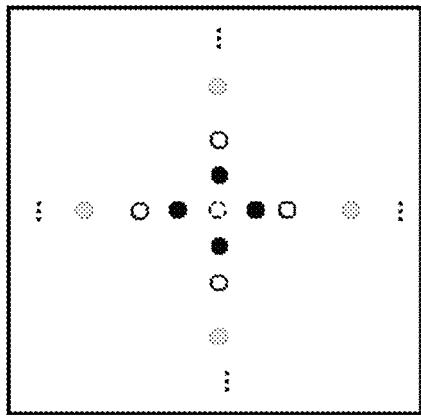

Otherwise, the $1^{st}$ weighting factor group is used. An example is shown in FIG. 15.

2.2.4.3 Motion Vector Storage

Figure 16:
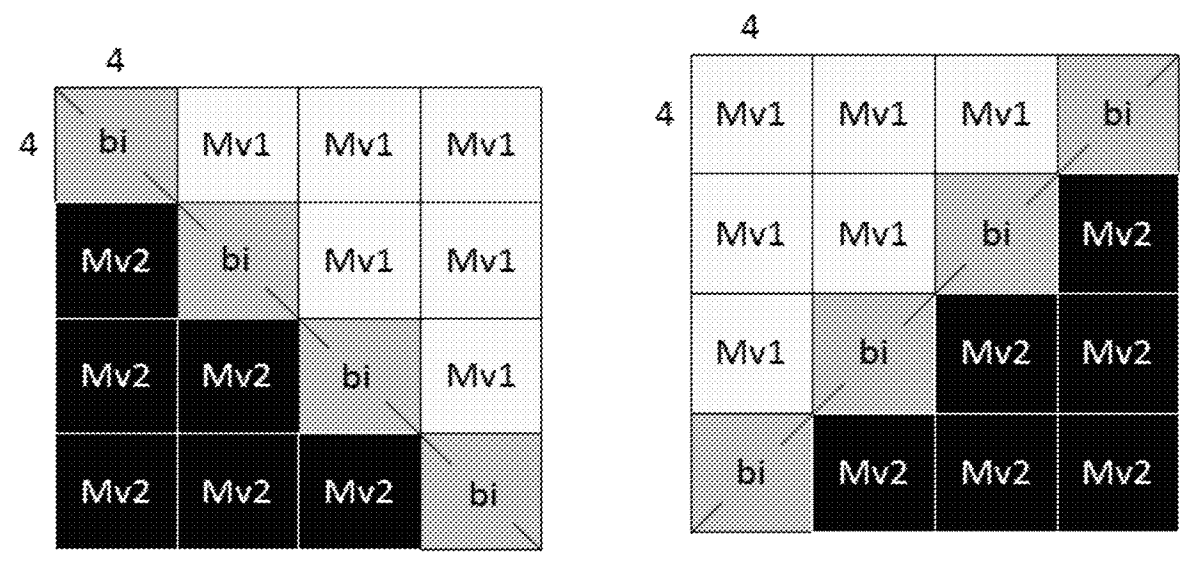

The motion vectors (Mv1 and Mv2 in FIG. 16) of the triangular prediction units are stored in 4×4 grids. For each 4×4 grid, either uni-prediction or bi-prediction motion vector is stored depending on the position of the 4×4 grid in the CU. As shown in FIG. 16, uni-prediction motion vector, either Mv1 or Mv2, is stored for the 4×4 grid located in the non-weighted area (that is, not located at the diagonal edge). On the other hand, a bi-prediction motion vector is stored for the 4×4 grid located in the weighted area. The bi-prediction motion vector is derived from Mv1 and Mv2 according to the following rules:

(1) In the case that Mv1 and Mv2 have motion vector from different directions (L0 or L1), Mv1 and Mv2 are simply combined to form the bi-prediction motion vector.

(2) In the case that both Mv1 and Mv2 are from the same L0 (or L1) direction,

If the reference picture of Mv2 is the same as a picture in the L1 (or L0) reference picture list, Mv2 is scaled to the picture. Mv1 and the scaled Mv2 are combined to form the bi-prediction motion vector.

If the reference picture of Mv1 is the same as a picture in the L1 (or L0) reference picture list, Mv1 is scaled to the picture. The scaled Mv1 and Mv2 are combined to form the bi-prediction motion vector.

Otherwise, only Mv1 is stored for the weighted area.

2.2.4.4 Syntax Tables, Semantics and Decoding Process for Merge Mode

The added changes are highlighted in underlined bold faced italics. The deletions are marked with [[ ]].

7.3.5.1 General Slice Header Syntax

| | Descriptor |
|---|---|
| slice_header( ) { | |
|   slice_pic_parameter_set_id | ue(v) |
|   if( rect_slice_flag \|\| NumBricksInPic > 1 ) | |
|     slice_address | u(v) |
|   if( !rect_slice_flag && !single_brick_per_slice_flag ) | |
|     num_bricks_in_slice_minus1 | ue(v) |
|   slice_type | ue(v) |
|   ... | |
|   *if( slice_type != I )* { | |
|     if( sps_temporal_mvp_enabled_flag ) | |
|       slice_temporal_mvp_enabled_flag | u(1) |
|     if( slice_type = = B ) | |
|       mvd_l1_zero_flag | u(1) |
|     if( cabac_init_present_flag ) | |
|       cabac_init_flag | u(1) |
|     if( slice_temporal_mvp_enabled_flag ) { | |
|       if( slice_type = = B ) | |
|         collocated_from_l0_flag | u(1) |
|     } | |
|     if( ( weighted_pred_flag && slice_type = = P ) \|\| | |
|       ( weighted_bipred_flag && slice_type = = B ) ) | |
|       pred_weight_table( ) | |
|     *six_minus_max_num_merge_cand* | ue(v) |
|     *if( sps_affine_enabled_flag )* | |
|       *five_minus_max_num_subblock_merge_cand* | *ue(v)* |
|     *if( sps_fpel_mmvd_enabled_flag )* | |
|       *slice_fpel_mmvd_enabled_flag* | *u(1)* |
|     *if( sps_triangle_enabled_flag && MaxNumMergeCand >= 2 )* | |
|       *max_num_merge_cand_minus_max_num_triangle_cand* | *ue(v)* |
|   *} else if ( sps_ibc_enabled_flag )* | |
|     *six_minus_max_num_merge_cand* | ue(v) |
|   slice_qp_delta | se(v) |
|   if( pps_slice_chroma_qp_offsets_present_flag ) { | |
|     slice_cb_qp_offset | se(v) |
|     slice_cr_qp_offset | se(v) |
|   } | |
|   ... | |
|   byte_alignment( ) | |
| } | |

7.3.7.5 Coding Unit Syntax

| | Descriptor |
|---|---|
| coding_unit( x0, y0, cbWidth, cbHeight, treeType ) { | |
|   if( slice_type != I \|\| sps_ibc_enabled_flag ) { | |

-continued

| | Descriptor |
|---|---|
| if( treeType != DUAL_TREE_CHROMA && <br> !( cbWidth = = 4 && cbHeight = = 4 && !sps_ibc_enabled_flag ) ) <br>    cu_skip_flag[ x0 ][ y0 ] <br> if( cu_skip_flag[ x0 ][ y0 ]= = 0 && slice_type != I <br> && !( cbWidth = = 4 && cbHeight = = 4 ) ) <br>    pred_mode_flag <br> if( ( ( slice_type = = I && cu_skip_flag[ x0 ][ y0 ] = =0) \|\| <br>   ( slice_type != I && ( CuPredMode[ x0 ][ y0 ] != MODE _INTRA \|\| <br>   ( cbWidth = = 4 && cbHeight = = 4 && cu_skip_flag[ x0 ][ y0 ] = = 0 ) ) ) ) && <br>   sps_ibc_enabled_flag && ( cbWidth != 128 \|\| cbHeight != 128 ) ) <br>    pred_mode_ibc_flag <br> } <br> if( CuPredMode[ x0 ][ y0 ] = = MODE_INTRA ) { <br> ... <br>   } <br> } else if( treeType != DUAL_TREE_CHROMA ) {/* MODE_INTER or MODE_IBC */ <br>   if( cu_skip_flag[ x0 ][ y0 ] = = 0) <br>    general_merge_flag[ x0 ][ y0 ] <br>   if( general_merge_flag[ x0 ][ y0 ] ) { <br>    merge_data( x0, y0, cbWidth, cbHeight ) <br>   <u>} else if ( Cu PredMode[ x0 ][ y0 ] = = MODE_IBC ) {</u> <br>     <u>mvd_coding (x0, y0, 0, 0 )</u> <br>     <u>mvp_l0_flag[ x0 ][ y0 ]</u> <br>     <u>if( sps_amvr_enabled_flag &&</u> <br>       <u>( MvdL0[ x0 ][ y0 ][ 0 ] != 0 \|\| MvdL0[ x0 ][ y0 ][ 1 ] != 0 )) {</u> <br>       <u>amvr_precision_flag[ x0 ][ y0 ]</u> <br>     <u>}</u> <br>   } else { <br>    if( slice_type = = B ) <br>     inter_pred_idc[ x0 ][ y0 ] <br>    if( sps_affine_enabled_flag && cbWidth >= 16 && cbHeight >= 16 ) { <br>     inter_affine_flag[ x0 ][ y0 ] <br>     if( sps_affine_type_flag && inter_affine_flag[ x0 ][ y0 ] ) <br>      cu_affine_type_flag[ x0 ][ y0 ] <br>    } <br>    if( sps_smvd_enabled_flag && inter_pred_idc[ x0 ][ y0 ] = = PRED_BI && <br>    !inter_affine_flag[ x0 ][ y0 ] && RefIdxSymL0 > -1 && RefIdxSymL1 > -1 ) <br>     sym_mvd_flag[ x0 ][ y0 ] <br> ... <br>  } <br> } | <br><br>ae(v)<br><br><br>ae(v)<br><br><br><br><br><br>ae(v)<br><br><br><br><br><br>ae(v)<br><br><br><br><u>ae(v)</u><br><br><br><u>ae(v)</u><br><br><br><br>ae(v)<br><br>ae(v)<br><br>ae(v)<br><br><br><br>ae(v) |

7.3.7.7 Merge Data Syntax

| | Descriptor |
|---|---|
| merge_data( x0, y0, cbWidth, cbHeight) { <br>   <u>if ( CuPredMode[ x0 ][ y0 ] = = MODE_IBC ) {</u> <br>     <u>if( MaxNum MergeCand > 1 )</u> <br>       <u>merge_idx[ x0 ][ y0 ]</u> <br>   <u>} else {</u> <br>   if( sps_mmvd_enabled_flag \|\| cbWidth * cbHeight != 32 ) <br>    regular_merge_flag[ x0 ][ y0 ] <br>   if ( regular_merge_flag[ x0 ][ y0 ] = = 1 ){ <br>    if( MaxNumMergeCand > 1 ) <br>     merge_idx[ x0 ][ y0 ] <br>   } else { <br>    if( sps_mmvd_enabled_flag && cbWidth * cbHeight != 32 ) <br>     mmvd_merge_flag[ x0 ][ y0 ] <br>    if( mmvd_merge_flag[ x0 ][ y0 ] = = 1 ) { <br>     if( MaxNumMergeCand > 1 ) <br>      mmvd_cand_flag[ x0 ][ y0 ] <br>     mmvd_distance_idx[ x0 ][ y0 ] <br>     mmvd_direction_idx[ x0 ][ y0 ] <br>    } else { <br>     if( MaxNumSubblockMergeCand > 0 && cbWidth >= 8 && cbHeight >= 8 ) <br>      merge_subblock_flag[x0 ][ y0 ] <br>     if( merge_subblock_flag[ x0 ][ y0 ] = = 1 ) { <br>      if( MaxNumSubblockMergeCand > 1 ) <br>       merge_subblock_idx[ x0 ][ y0 ] <br>     } else { <br>      if( sps_ciip_enabled_flag && cu_skip_flag[ x0 ][ y0 ] = = 0 && | <br><br><br><u>ae(v)</u><br><br><br>ae(v)<br><br><br><br>ae(v)<br><br><br><br>ae(v)<br><br><br>ae(v)<br>ae(v)<br>ae(v)<br><br><br>ae(v)<br><br><br>ae(v) |

| | Descriptor |
|---|---|
|          ( cbWidth * cbHeight) >= 64 && cbWidth < 128 && cbHeight < 128 ) { | |
|             ciip_flag[ x0 ][ y0 ] | ae(v) |
|             if( ciip_flag[ x0 ][ y0 ] && MaxNumMergeCand > 1 ) | |
|                merge_idx[ x0 ][ y0 ] | ae(v) |
|          } | |
|          if( MergeTriangleFlag[ x0 ][ y0 ] ) { | |
|             merge_triangle_split_dir[ x0 ][ y0 ] | ae(v) |
|             merge_triangle_idx0[ x0 ][ y0 ] | ae(v) |
|             merge_triangle_idx1[ x0 ][ y0 ] | ae(v) |
|          } | |
|       } | |
|    } | |
|    } | |
| } | |
| } | |

7.4.6.1 General Slice Header Semantics six_minus_max_num_merge_cand specifies the maximum number of merging motion vector prediction (MW) candidates supported in the slice subtracted from 6. The maximum number of merging MW candidates, MaxNumMergeCand is derived as follows:

$$MaxNumMergeCand = 6 - six\_minus\_max\_num\_merge\_cand \quad (7\text{-}57)$$

The value of MaxNumMergeCand shall be in the range of 1 to 6, inclusive.

five_minus_max_num_subblock_merge_cand specifies the maximum number of subblock-based merging motion vector prediction (MW) candidates supported in the slice subtracted from 5. When five_minus_max_num_subblock_merge_cand is not present, it is inferred to be equal to 5−sps_sbtmvp_enabled_flag. The maximum number of subblock-based merging MW candidates, MaxNumSubblockMergeCand is derived as follows:

$$MaxNumSubblockMergeCand = 5 - five\_minus\_max\_num\_subblock\_merge\_cand \quad (7\text{-}58)$$

The value of MaxNumSubblockMergeCand shall be in the range of 0 to 5, inclusive.

7.4.8.5 Coding Unit Semantics pred_mode_flag equal to 0 specifies that the current coding unit is coded in inter prediction mode. pred_mode_flag equal to 1 specifies that the current coding unit is coded in intra prediction mode.

When pred_mode_flag is not present, it is inferred as follows:
    If cbWidth is equal to 4 and cbHeight is equal to 4, pred_mode_flag is inferred to be equal to 1.
    Otherwise, pred_mode_flag is inferred to be equal to 1 when decoding an I slice, and equal to 0 when decoding a P or B slice, respectively.

The variable CuPredMode[x][y] is derived as follows for x=x0 . . . x0+cbWidth−1 and y=y0 . . . y0+cbHeight−1:
    If pred_mode_flag is equal to 0, CuPredMode[x][y] is set equal to MODE_INTER.
    Otherwise (pred_mode_flag is equal to 1), CuPredMode[x][y] is set equal to MODE_INTRA.

pred_mode_ibc_flag equal to 1 specifies that the current coding unit is coded in IBC prediction mode. pred_mode_ibc_flag equal to 0 specifies that the current coding unit is not coded in IBC prediction mode.

When pred_mode_ibc_flag is not present, it is inferred as follows:

If cu_skip_flag[x0][y0] is equal to 1, and cbWidth is equal to 4, and cbHeight is equal to 4, pred_mode_ibc_flag is inferred to be equal 1.
    Otherwise, if both cbWidth and cbHeight are equal to 128, pred_mode_ibc_flag is inferred to be equal to 0.
    Otherwise, pred_mode_ibc_flag is infered to be equal to the value of sps_ibc_enabled_flag when decoding an I slice, and 0 when decoding a P or B slice, respectively.

When pred_mode_ibc_flag is equal to 1, the variable CuPredMode[x][y] is set to be equal to MODE_IBC for x=x0 . . . x0+cbWidth−1 and y=y0 . . . y0+cbHeight−1.

general_merge_flag[x0][y0] specifies whether the inter prediction parameters for the current coding unit are inferred from a neighbouring inter-predicted partition. The array indices x0, y0 specify the location (x0, y0) of the top-left luma sample of the considered coding block relative to the top-left luma sample of the picture.

When general_merge_flag[x0][y0] is not present, it is inferred as follows:
    If cu_skip_flag[x0][y0] is equal to 1, general_merge_flag [x0][y0] is inferred to be equal to 1.
    Otherwise, general_merge_flag[x0][y0] is inferred to be equal to 0.

mvp_l0_flag[x0][y0] specifies the motion vector predictor index of list 0 where x0, y0 specify the location (x0, y0) of the top-left luma sample of the considered coding block relative to the top-left luma sample of the picture. When mvp_l0_flag[x0][y0] is not present, it is inferred to be equal to 0.

mvp_l1_flag[x0][y0] has the same semantics as mvp_l0_flag, with l0 and list 0 replaced by l1 and list 1, respectively.

inter_pred_idc[x0][y0] specifies whether list0, list1, or bi-prediction is used for the current coding unit according to Table 7-10. The array indices x0, y0 specify the location (x0, y0) of the top-left luma sample of the considered coding block relative to the top-left luma sample of the picture.

TABLE 7-10

Name association to inter prediction mode

| inter_pred_idc | Name of inter_pred_idc | | |
|---|---|---|---|
| | (cbWidth + cbHeight) > 12 | (cbWidth + cbHeight) == 12 | (cbWidth + cbHeight) == 8 |
| 0 | PRED_L0 | PRED_L0 | n.a. |
| 1 | PRED_L1 | PRED_L1 | n.a. |
| 2 | PRED_BI | n.a. | n.a. |

When inter_pred_idc[x0][y0] is not present, it is inferred to be equal to PRED_L0.

7.4.8.7 Merge Data Semantics regular_merge_flag[x0][y0] equal to 1 specifies that regular merge mode is used to generate the inter prediction parameters of the current coding unit. The array indices x0, y0 specify the location (x0, y0) of the top-left luma sample of the considered coding block relative to the top-left luma sample of the picture.

When regular_merge_flag[x0][y0] is not present, it is inferred as follows:
  If all the following conditions are true, regular_merge_flag[x0][y0] is inferred to be equal to 1:
    sps_mmvd_enabled_flag is equal to 0.
    general_merge_flag[x0][y0] is equal to 1.
    cbWidth*cbHeight is equal to 32.
  Otherwise, regular_merge_flag[x0][y0] is inferred to be equal to 0.

mmvd_merge_flag[x0][y0] equal to 1 specifies that merge mode with motion vector difference is used to generate the inter prediction parameters of the current coding unit. The array indices x0, y0 specify the location (x0, y0) of the top-left luma sample of the considered coding block relative to the top-left luma sample of the picture.

When mmvd_merge_flag[x0][y0] is not present, it is inferred as follows:
  If all the following conditions are true, mmvd_merge_flag[x0][y0] is inferred to be equal to 1:
    sps_mmvd_enabled_flag is equal to 1.
    general_merge_flag[x0][y0] is equal to 1.
    cbWidth*cbHeight is equal to 32.
    regular_merge_flag[x0][y0] is equal to 0.
  Otherwise, mmvd_merge_flag[x0][y0] is inferred to be equal to 0.

mmvd_cand_flag[x0][y0] specifies whether the first (0) or the second (1) candidate in the merging candidate list is used with the motion vector difference derived from mmvd_distance_idx[x0][y0] and mmvd_direction_idx[x0][y0]. The array indices x0, y0 specify the location (x0, y0) of the top-left luma sample of the considered coding block relative to the top-left luma sample of the picture.

When mmvd_cand_flag[x0][y0] is not present, it is inferred to be equal to 0.

mmvd_distance_idx[x0][y0] specifies the index used to derive MmvdDistance[x0][y0] as specified in Table 7-12. The array indices x0, y0 specify the location (x0, y0) of the top-left luma sample of the considered coding block relative to the top-left luma sample of the picture.

TABLE 7-12

Specification of MmvdDistance [x0][y0] based on mmvd_distance_idx[x0][y0].

| mmvd distance idx[x0][y0] | MmvdDistance[x0][y0] | |
|---|---|---|
| | slice_fpel_mmvd_enabled_flag == 0 | slice_fpel_mmvd_enabled_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 | mmvd_direction_idx[x0][y0] specifies index used to derive MmvdSign[x0][y0] as specified in Table 7-13. The array indices x0, y0 specify the location (x0, y0) of the top-left luma sample of the considered coding block relative to the top-left luma sample of the picture.

TABLE 7-13

Specification of MmvdSign[x0][y0] based on mmvd_direction_idx[x0][y0]

| mmvd_direction_idx[x0][y0] | MmvdSign[x0][y0][0] | MmvdSign[x0][y0][1] |
|---|---|---|
| 0 | +1 | 0 |
| 1 | −1 | 0 |
| 2 | 0 | +1 |
| 3 | 0 | −1 |

Both components of the merge plus MVD offset MmvdOffset[x0][y0] are derived as follows:

MmvdOffset[x0][y0][0]=(MmvdDistance[x0][y0]<<2)
*MmvdSign[x0][y0][0](7-124)

MmvdOffset[x0][y0][1]=(MmvdDistance[x0][y0]<<2)
*MmvdSign[x0][y0][1](7-125)

merge_subblock_flag[x0][y0] specifies whether the subblock-based inter prediction parameters for the current coding unit are inferred from neighbouring blocks. The array indices x0, y0 specify the location (x0, y0) of the top-left luma sample of the considered coding block relative to the top-left luma sample of the picture. When merge_subblock_flag[x0][y0] is not present, it is inferred to be equal to 0.

merge_subblock_idx[x0][y0] specifies the merging candidate index of the subblock-based merging candidate list where x0, y0 specify the location (x0, y0) of the top-left luma sample of the considered coding block relative to the top-left luma sample of the picture.

When merge_subblock_idx[x0][y0] is not present, it is inferred to be equal to 0.

ciip_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture.

When ciip_flag[x0][y0] is not present, it is inferred to be equal to 0.

When ciip_flag[x0][y0] is equal to 1, the variable IntraPredModeY[x][y] with x=xCb . . . xCb+cbWidth−1 and y=yCb . . . yCb+cbHeight−1 is set to be equal to INTRA_PLANAR.

The variable MergeTriangleFlag[x0][y0], which specifies whether triangular shape based motion compensation is used to generate the prediction samples of the current coding unit, when decoding a B slice. is derived as follows:
  If all the following conditions are true, MergeTriangleFlag[x0][y0] is set equal to 1:
    sps_triangle_enabled_flag is equal to 1.
    slice_type is equal to B.
    general_merge_flag[x0][y0] is equal to 1.
    MaxNumTriangleMergeCand is greater than or equal to 2.
    cbWidth*cbHeight is greater than or equal to 64.
    regular_merge_flag[x0][y0] is equal to 0.
    mmvd_merge_flag[x0][y0] is equal to 0.
    merge_subblock_flag[x0][y0] is equal to 0.
    ciip_flag[x0][y0] is equal to 0.
  Otherwise, MergeTriangleFlag[x0][y0] is set equal to 0.

merge_triangle_split_dir[x0][y0] specifies the splitting direction of merge triangle mode. The array indices x0, y0 specify the location (x0, y0) of the top-left luma sample of the considered coding block relative to the top-left luma sample of the picture.
When merge_triangle_split_dir[x0][y0] is not present, it is inferred to be equal to 0.
merge_triangle_idx0[x0][y0] specifies the first merging candidate index of the triangular shape based motion compensation candidate list where x0, y0 specify the location (x0, y0) of the top-left luma sample of the considered coding block relative to the top-left luma sample of the picture.
When merge_triangle_idx0[x0][y0] is not present, it is inferred to be equal to 0.
merge_triangle_idx1[x0][y0] specifies the second merging candidate index of the triangular shape based motion compensation candidate list where x0, y0 specify the location (x0, y0) of the top-left luma sample of the considered coding block relative to the top-left luma sample of the picture.
When merge_triangle_idx1[x0][y0] is not present, it is inferred to be equal to 0.
merge_idx[x0][y0] specifies the merging candidate index of the merging candidate list where x0, y0 specify the location (x0, y0) of the top-left luma sample of the considered coding block relative to the top-left luma sample of the picture.
When merge_idx[x0][y0] is not present, it is inferred as follows:
  If mmvd_merge_flag[x0][y0] is equal to 1, merge_idx[x0][y0] is inferred to be equal to mmvd_cand_flag[x0][y0].
  Otherwise (mmvd_merge_flag[x0][y0] is equal to 0), merge_idx[x0][y0] is inferred to be equal to 0.

2.2.4.4.1 Decoding Process
In some embodiments, the decoding process is defined as follows:
8.5.2.2 Derivation Process for Luma Motion Vectors for Merge Mode
This process is only invoked when general_merge_flag[xCb][yCb] is equal to 1, where (xCb, yCb) specify the top-left sample of the current luma coding block relative to the top-left luma sample of the current picture.
Inputs to this process are:
  a luma location (xCb, yCb) of the top-left sample of the current luma coding block relative to the top-left luma sample of the current picture,
  a variable cbWidth specifying the width of the current coding block in luma samples,
  a variable cbHeight specifying the height of the current coding block in luma samples.
Outputs of this process are:
  the luma motion vectors in 1/16 fractional-sample accuracy mvL0 [0][0] and mvL1[0][0],
  the reference indices refIdxL0 and refIdxL1,
  the prediction list utilization flags predFlagL0[0][0] and predFlagL1[0][0],
  the bi-prediction weight index bcwIdx.
  the merging candidate list mergeCandList.
The bi-prediction weight index bcwIdx is set equal to 0.
The motion vectors mvL0 [0][0] and mvL1[0][0], the reference indices refIdxL0 and refIdxL1 and the prediction utilization flags predFlagL0[0][0] and predFlagL1[0][0] are derived by the following ordered steps:
  1. The derivation process for spatial merging candidates from neighbouring coding units as specified in clause 8.5.2.4 is invoked with the luma coding block location (xCb, yCb), the luma coding block width cbWidth, and the luma coding block height cbHeight as inputs, and the output being the availability flags availableFlag$A_0$, availableFlag$A_1$, availableFlag$B_0$, availableFlag$B_1$ and availableFlag$B_2$, the reference indices refIdxLX$A_0$, refIdxLX$A_1$, refIdxLX$B_0$, refIdxLX$B_1$ and refIdxLX$B_2$, the prediction list utilization flags predFlagLX$A_0$, predFlagLX$A_1$, predFlagLX$B_0$, predFlagLX$B_1$ and predFlagLX$B_2$, and the motion vectors mvLX$A_0$, mvLX$A_1$, mvLX$B_0$, mvLX$B_1$ and mvLX$B_2$, with X being 0 or 1, and the bi-prediction weight indices bcwIdx$A_0$, bcwIdx$A_1$, bcwIdx$B_0$, bcwIdx$B_1$, bcwIdx$B_2$.
  2. The reference indices, refIdxLXCol, with X being 0 or 1, and the bi-prediction weight index bcwIdxCol for the temporal merging candidate Col are set equal to 0.
  3. The derivation process for temporal luma motion vector prediction as specified in in clause 8.5.2.11 is invoked with the luma location (xCb, yCb), the luma coding block width cbWidth, the luma coding block height cbHeight and the variable refIdxL0Col as inputs, and the output being the availability flag availableFlagL0Col and the temporal motion vector mvL0Col. The variables availableFlagCol, predFlagL0Col and predFlagL1Col are derived as follows:

$$\text{availableFlagCol=availableFlagL0Col} \quad (8\text{-}263)$$

$$\text{predFlagL0Col=availableFlagL0Col} \quad (8\text{-}264)$$

$$\text{predFlagL1Col=0} \quad (8\text{-}265)$$

4. When slice_type is equal to B, the derivation process for temporal luma motion vector prediction as specified in clause 8.5.2.11 is invoked with the luma location (xCb, yCb), the luma coding block width cbWidth, the luma coding block height cbHeight and the variable refIdxL1Col as inputs, and the output being the availability flag availableFlagL1Col and the temporal motion vector mvL1Col. The variables availableFlagCol and predFlagL1Col are derived as follows:

$$\text{availableFlagCol=availableFlagL0Col}\|\text{availableFlagL1Col} \quad (8\text{-}266)$$

$$\text{predFlagL1Col=availableFlagL1Col} \quad (8\text{-}267)$$

5. The merging candidate list, mergeCandList, is constructed as follows:

$$i=0$$

$$\text{if(availableFlag}A_1)$$

$$\text{mergeCandList}[i\text{++}]=A_1$$

$$\text{if(availableFlag}B_1)$$

$$\text{mergeCandList}[i\text{++}]=B_1$$

$$\text{if(availableFlag}B_0)$$

$$\text{mergeCandList}[i\text{++}]=B_0$$

$$\text{if(availableFlag}A_0)$$

$$\text{mergeCandList}[i\text{++}]=A_0$$

$$\text{if(availableFlag}B_2)$$

$$\text{mergeCandList}[i\text{++}]=B_2$$

$$\text{if(availableFlagCol)}$$

$$\text{mergeCandList}[i\text{++}]=\text{Col} \quad (8\text{-}268)$$

6. The variable numCurrMergeCand and numOrigMergeCand are set equal to the number of merging candidates in the mergeCandList.
7. When numCurrMergeCand is less than (MaxNumMergeCand−1) and NumHmvpCand is greater than 0, the following applies:
    The derivation process of history-based merging candidates as specified in 8.5.2.6 is invoked with mergeCandList and numCurrMergeCand as inputs, and modified mergeCandList and numCurrMergeCand as outputs.
    numOrigMergeCand is set equal to numCurrMergeCand.
8. When numCurrMergeCand is less than MaxNumMergeCand and greater than 1, the following applies:
    The derivation process for pairwise average merging candidate specified in clause 8.5.2.4 is invoked with mergeCandList, the reference indices refIdxL0N and refIdxL1N, the prediction list utilization flags predFlagL0N and predFlagL1N, the motion vectors mvL0N and mvL1N of every candidate N in mergeCandList, and numCurrMergeCand as inputs, and the output is assigned to mergeCandList, numCurrMergeCand, the reference indices refIdxL0avgCand and refIdxL1avgCand, the prediction list utilization flags predFlagL0avgCand and predFlagL1avgCand and the motion vectors mvL0avgCand and mvL1avgCand of candidate avgCand being added into mergeCandList. The bi-prediction weight index bcwIdx of candidate avgCand being added into mergeCandList is set equal to 0.
    numOrigMergeCand is set equal to numCurrMergeCand.
9. The derivation process for zero motion vector merging candidates specified in clause 8.5.2.5 is invoked with the mergeCandList, the reference indices refIdxL0N and refIdxL1N, the prediction list utilization flags predFlagL0N and predFlagL1N, the motion vectors mvL0N and mvL1N of every candidate N in mergeCandList and numCurrMergeCand as inputs, and the output is assigned to mergeCandList, numCurrMergeCand, the reference indices refIdxL0zeroCand$_m$ and refIdxL1zeroCand$_m$, the prediction list utilization flags predFlagL0zeroCand$_m$ and predFlagL1zeroCand$_m$ and the motion vectors mvL0zeroCand$_m$ and mvL1zeroCand$_m$ of every new candidate zeroCand$_m$ being added into mergeCandList. The bi-prediction weight index bcwIdx of every new candidate zeroCand$_m$ being added into mergeCandList is set equal to 0. The number of candidates being added, numZeroMergeCand, is set equal to (numCurrMergeCand−numOrigMergeCand). When numZeroMergeCand is greater than 0, m ranges from 0 to numZeroMergeCand−1, inclusive.
10. The following assignments are made with N being the candidate at position merge_idx[xCb][yCb] in the merging candidate list mergeCandList (N=mergeCandList[merge_idx[xCb][yCb]]) and X being replaced by 0 or 1:

refIdxLX=refIdxLXN  (8-269)

predFlagLX[0][0]=predFlagLXN  (8-270)

mvLX[0][0][0]=mvLXN[0]  (8-271)

mvLX[0][0][1]=mvLXN[1]  (8-272)

bcwIdx=bcwIdxN  (8-273)

11. When mmvd_merge_flag[xCb][yCb] is equal to 1, the following applies:
    The derivation process for merge motion vector difference as specified in 8.5.2.7 is invoked with the luma location (xCb, yCb), the reference indices refIdxL0, refIdxL1 and the prediction list utilization flags predFlagL0[0][0] and predFlagL1[0][0] as inputs, and the motion vector differences mMvdL0 and mMvdL1 as outputs.
    The motion vector difference mMvdLX is added to the merge motion vectors mvLX for X being 0 and 1 as follows:

mvLX[0][0][0]+=mMvdLX[0]  (8-274)

mvLX[0][0][1]+=mMvdLX[1]  (8-275)

mvLX[0][0][0]=Clip3(−2$^{17}$,2$^{17}$−1,mvLX[0][0][0])  (8-276)

mvLX[0][0][1]=Clip3(−2$^{17}$,2$^{17}$−1,mvLX[0][0][1])  (8-277)

2.2.5 MMVD

In some embodiments, ultimate motion vector expression (UMVE, also known as MMVD) is presented. UMVE is used for either skip or merge modes with a motion vector expression method.

UMVE re-uses merge candidate as same as those included in the regular merge candidate list in VVC. Among the merge candidates, a base candidate can be selected, and is further expanded by the motion vector expression method.

UMVE provides a new motion vector difference (MVD) representation method, in which a starting point, a motion magnitude and a motion direction are used to represent a MVD.

In some embodiments, a merge candidate list is used as is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 4

| Base candidate IDX | | | | |
|---|---|---|---|---|
| Base candidate IDX | 0 | 1 | 2 | 3 |
| N$^{th}$ MVP | 1$^{st}$ MVP | 2$^{nd}$ MVP | 3$^{rd}$ MVP | 4$^{th}$ MVP |

If the number of base candidate is equal to 1, Base candidate IDX is not signaled.

Distance index is motion magnitude information. Distance index indicates the pre-defined distance from the starting point information. Pre-defined distance is as follows:

TABLE 5

| Distance IDX | | | | | | | | |
|---|---|---|---|---|---|---|---|---|
| Distance IDX | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 6

| | Direction IDX | | | |
|---|---|---|---|---|
| Direction IDX | 00 | 01 | 10 | 11 |
| x-axis | + | − | N/A | N/A |
| y-axis | N/A | N/A | + | − |

UMVE flag is singnaled right after sending a skip flag or merge flag. If skip or merge flag is true, UMVE flag is parsed. If UMVE flage is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In current common test condition, either the first or the second merge candidate in the merge candidate list can be selected as the base candidate.

UMVE is also known as Merge with MV Differences (MMVD).

2.2.6 Combined Intra-Inter Prediction (CIIP)

In some embodiments, multi-hypothesis prediction is proposed, wherein combined intra and inter prediction is one way to generate multiple hypotheses.

When the multi-hypothesis prediction is applied to improve intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from only one intra prediction mode, e.g., planar mode. The weights applied to the prediction block from intra and inter prediction are determined by the coded mode (intra or non-intra) of two neighboring blocks (A1 and B1).

2.2.7 MERGE for Sub-Block-Based Technologies

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes ATMVP candidate and affine merge candidates.

The sub-block merge candidate list is filled with candidates in the following order:

1. ATMVP candidate (maybe available or unavailable);
2. Affine merge lists (including Inherited Affine candidates; and Constructed Affine candidates)
3. Padding as zero MV 4-parameter affine model 2.2.7.1 ATMVP (Aka Sub-Block Temporal Motion Vector Predictor, SbTMVP)

Basic idea of ATMVP is to derive multiple sets of temporal motion vector predictors for one block. Each sub-block is assigned with one set of motion information. When an ATMVP merge candidate is generated, the motion compensation is done in 8×8 level instead of the whole block level.

In current design, ATMVP predicts the motion vectors of the sub-CUs within a CU in two steps which are described in the following two sub-sections respectively.

2.2.7.1.1 Derivation of Initialized Motion Vector

Denote the initialized motion vector by tempMv. When block A1 is available and non-intra coded (e.g., coded with inter or IBC mode), the following is applied to derive the initialized motion vector.

If all of the following conditions are true, tempMv is set equal to the motion vector of block A1 from list 1, denoted by $mvL1A_1$:

Reference picture index of list 1 is available (not equal to −1), and it has the same POC value as the collocated picture (e.g., DiffPicOrderCnt(ColPic, RefPicList[1][refIdxL1$A_1$]) is equal to 0), All reference pictures are with no larger POC compared to the current picture (e.g., DiffPicOrderCnt(aPic, currPic) is less than or equal to 0 for every picture aPic in every reference picture list of the current slice), Current slice is equal to B slice, collocated_from_l0_flag is equal to 0.

Otherwise if all of the following conditions are true, tempMv is set equal to the motion vector of block A1 from list 0, denoted by $mvL0A_1$:

Reference picture index of list 0 is available (not equal to −1), it has the same POC value as the collocated picture (e.g., DiffPicOrderCnt(ColPic, RefPicList[0][refIdxL0$A_1$]) is equal to 0).

Otherwise, zero motion vector is used as the initialized MV.

A corresponding block (with center position of current block plus the rounded MV, clipped to be in certain ranges in necessary) is identified in the collocated picture signaled at the slice header with the initialized motion vector.

If the block is inter-coded, then go to the $2^{nd}$ step. Otherwise, the ATMVP candidate is set to be NOT available.

2.2.7.1.2 Sub-CU Motion Derivation

The second step is to split the current CU into sub-CUs and obtain the motion information of each sub-CU from the block corresponding to each sub-CU in the collocated picture.

If the corresponding block for a sub-CU is coded with inter mode, the motion information is utilized to derive the final motion information of current sub-CU by invoking the derivation process for collocated MVs which is not different with the process for conventional TMVP process. Basically, if the corresponding block is predicted from the target list X for uni-prediction or bi-prediction, the motion vector is utilized; otherwise, if it is predicted from list Y (Y=1−X) for uni or bi-prediction and NoBackwardPredFlag is equal to 1, MV for list Y is utilized. Otherwise, no motion candidate can be found.

If the block in the collocated picture identified by the initialized MV and location of current sub-CU is intra or IBC coded, or no motion candidate can be found as described above, the following further apply:

Denote the motion vector used to fetch the motion field in the collocated picture $R_{col}$ as $MV_{col}$. To minimize the impact due to MV scaling, the MV in the spatial candidate list used to derive $MV_{col}$ is selected in the following way: if the reference picture of a candidate MV is the collocated picture, this MV is selected and used as $MV_{col}$ without any scaling. Otherwise, the MV having a reference picture closest to the collocated picture is selected to derive $MV_{col}$ with scaling.

The example decoding process for collocated motion vectors derivation process is described as follows:

8.5.2.12 Derivation Process for Collocated Motion Vectors

Inputs to this process are:
- a variable currCb specifying the current coding block,
- a variable colCb specifying the collocated coding block inside the collocated picture specified by ColPic,
- a luma location (xColCb, yColCb) specifying the top-left sample of the collocated luma coding block specified by colCb relative to the top-left luma sample of the collocated picture specified by ColPic,
- a reference index refIdxLX, with X being 0 or 1,
- a flag indicating a subblock temporal merging candidate sbFlag.

Outputs of this process are:
- the motion vector prediction mvLXCol in 1/16 fractional-sample accuracy,
- the availability flag availableFlagLXCol.

The variable currPic specifies the current picture.

The arrays predFlagL0Col[x][y], mvL0Col[x][y] and refIdxL0Col[x][y] are set equal to PredFlagL0[x][y], MvDmvrL0[x][y] and RefIdxL0[x][y], respectively, of the collocated picture specified by ColPic, and the arrays predFlagL1Col[x][y], mvL1Col[x][y] and refIdxL1Col[x][y] are set equal to PredFlagL1[x][y], MvDmvrL1[x][y] and RefIdxL1[x][y], respectively, of the collocated picture specified by ColPic.

The variables mvLXCol and availableFlagLXCol are derived as follows:

If colCb is coded in an intra or IBC prediction mode, both components of mvLXCol are set equal to 0 and availableFlagLXCol is set equal to 0.

Otherwise, the motion vector mvCol, the reference index refIdxCol and the reference list identifier listCol are derived as follows:

If sbFlag is equal to 0, availableFlagLXCol is set to 1 and the following applies:

If predFlagL0Col[xColCb][yColCb] is equal to 0, mvCol, refIdxCol and listCol are set equal to mvL1Col[xColCb][yColCb], refIdxL1Col[xColCb][yColCb] and L1, respectively.

Otherwise, if predFlagL0Col[xColCb][yColCb] is equal to 1 and predFlagL1Col[xColCb][yColCb] is equal to 0, mvCol, refIdxCol and listCol are set equal to mvL0Col[xColCb][yColCb], refIdxL0Col[xColCb][yColCb] and L0, respectively.

Otherwise (predFlagL0Col[xColCb][yColCb] is equal to 1 and predFlagL1Col[xColCb][yColCb] is equal to 1), the following assignments are made:

If NoBackwardPredFlag is equal to 1, mvCol, refIdxCol and listCol are set equal to mvLXCol[xColCb][yColCb], refIdxLXCol[xColCb][yColCb] and LX, respectively.

Otherwise, mvCol, refIdxCol and listCol are set equal to mvLNCol[xColCb][yColCb], refIdxLNCol[xColCb][yColCb] and LN, respectively, with N being the value of collocated_from_l0_flag.

Otherwise (sbFlag is equal to 1), the following applies:

If PredFlagLXCol[xColCb][yColCb] is equal to 1, mvCol, refIdxCol, and listCol are set equal to mvLXCol[xColCb][yColCb], refIdxLXCol[xColCb][yColCb] and LX, respectively, availableFlagLXCol is set to 1.

Otherwise (PredFlagLXCol[xColCb][yColCb] is equal to 0), the following applies:

If DiffPicOrderCnt(aPic, currPic) is less than or equal to 0 for every picture aPic in every reference picture list of the current slice and PredFlagLYCol[xColCb][yColCb] is equal to 1, mvCol, refIdxCol, and listCol are set to mvLYCol[xColCb][yColCb], refIdxLYCol[xColCb][yColCb] and LY, respectively, with Y being equal to !X where X being the value of X this process is invoked for. availableFlagLXCol is set to 1.

Both the components of mvLXCol are set to 0 and availableFlagLXCol is set equal to 0.

When availableFlagLXCol is equal to TRUE, mvLXCol and availableFlagLXCol are derived as follows:

If LongTermRefPic(currPic, currCb, refIdxLX, LX) is not equal to LongTermRefPic(ColPic, colCb, refIdxCol, listCol), both components of mvLXCol are set equal to 0 and availableFlagLXCol is set equal to 0.

Otherwise, the variable availableFlagLXCol is set equal to 1, refPicList[listCol][refIdxCol] is set to be the picture with reference index refIdxCol in the reference picture list listCol of the slice containing coding block colCb in the collocated picture specified by ColPic, and the following applies:

colPocDiff=DiffPicOrderCnt(ColPic,refPicList[listCol][refIdxCol])  (8-402)

currPocDiff=DiffPicOrderCnt(currPic,RefPicList[X][refIdxLX])  (8-403)

The temporal motion buffer compression process for collocated motion vectors as specified in clause 8.5.2.15 is invoked with mvCol as input, and the modified mvCol as output.

If RefPicList[X][refIdxLX] is a long-term reference picture, or colPocDiff is equal to currPocDiff, mvLXCol is derived as follows:

mvLXCol=mvCol  (8-404)

Otherwise, mvLXCol is derived as a scaled version of the motion vector mvCol as follows:

tx=(16384+(Abs(td)td)>>1))/td  (8-405)

distScaleFactor=Clip3(4096,4095,(tb*tx+32)>>6)  (8-406)

mvLXCol=Clip3(131072,131071,
 (distScaleFactor*mvCol+128−
 (distScaleFactor*mvCol>=0))>>8))  (8-407)

where td and tb are derived as follows:

td=Clip3(−128,127,colPocDiff)  (8-408)

tb=Clip3(−128,127,currPocDiff)  (8-409)

2.2.8 Refinement of Motion Information 2.2.8.1 Decoder-Side Motion Vector Refinement (DMVR)

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined.

Figure 19:
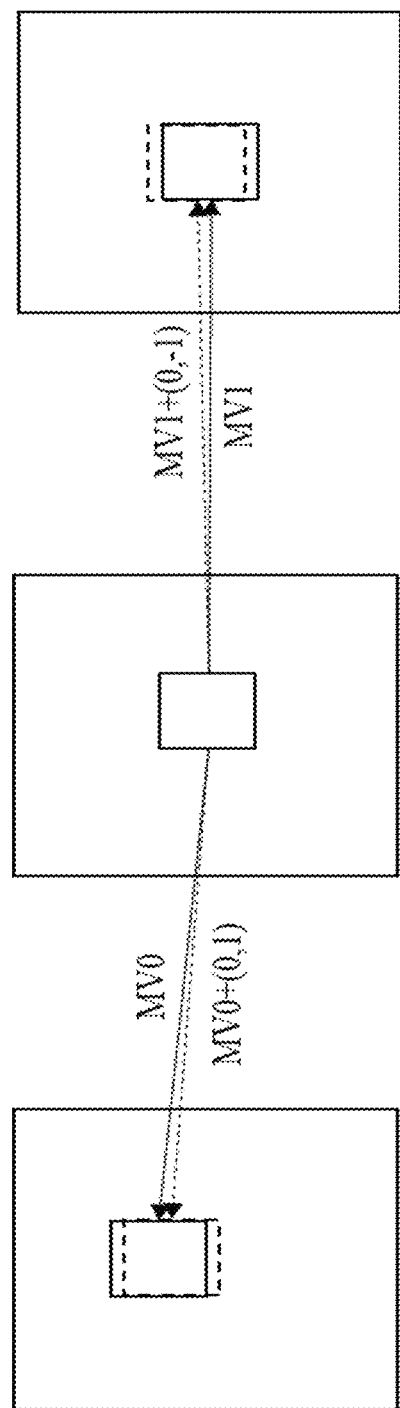
FIG. 19 shows an example of MVD (0, 1) mirrored between list 0 and list 1 in DMVR

For DMVR in VVC, MVD mirroring between list 0 and list 1 is assumed as shown in FIG. 19 and bilateral matching is performed to refine the MVs, e.g., to find the best MVD among several MVD candidates. Denote the MVs for two reference picture lists by MVL0(L0X, L0Y), and MVL1 (L1X, L1Y). The MVD denoted by (MvdX, MvdY) for list 0 that can minimize the cost function (e.g., SAD) is defined as the best MVD. For the SAD function, it is defined as the SAD between the reference block of list 0 derived with a motion vector (L0X+MvdX, L0Y+MvdY) in the list 0 reference picture and the reference block of list 1 derived with a motion vector (L1X-MvdX, L1Y-MvdY) in the list 1 reference picture.

Figure 20:
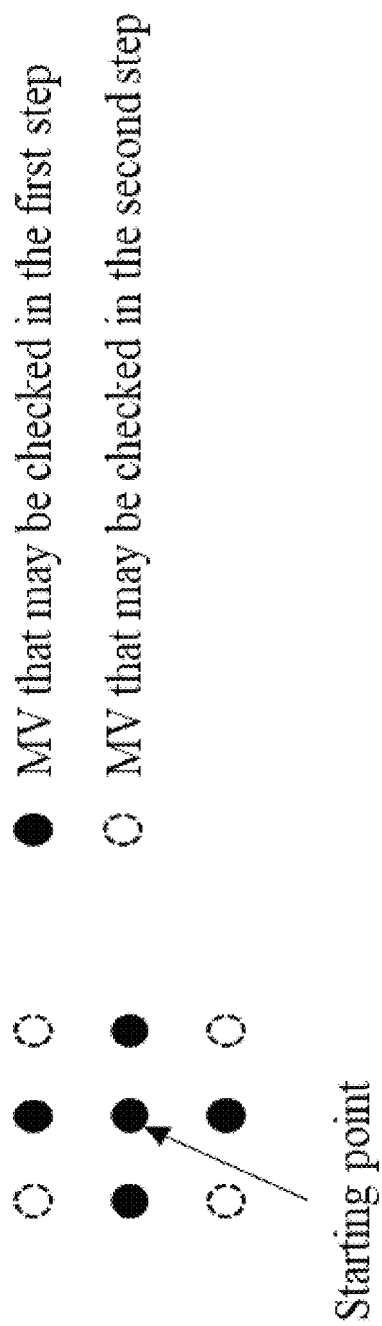
FIG. 20 shows MVs that may be checked in one iteration.

The motion vector refinement process may iterate twice. In each iteration, at most 6 MVDs (with integer-pel precision) may be checked in two steps, as shown in FIG. 20. In the first step, MVD (0, 0), (−1, 0), (1, 0), (0, −1), (0, 1) are checked. In the second step, one of the MVD (−1, −1), (−1, 1), (1, −1) or (1, 1) may be selected and further checked. Suppose function Sad(x, y) returns SAD value of the MVD (x, y). The MVD, denoted by (MvdX, MvdY), checked in the second step is decided as follows:

```
MvdX = −1;
MvdY = −1;
If (Sad(1, 0) < Sad(−1, 0))
    MvdX = 1;
If (Sad(0, 1) < Sad(0, −1))
    MvdY = 1;
```

In the first iteration, the starting point is the signaled MV, and in the second iteration, the starting point is the signaled MV plus the selected best MVD in the first iteration. DMVR applies only when one reference picture is a preceding picture and the other reference picture is a following picture, and the two reference pictures are with same picture order count distance from the current picture.

To further simplify the process of DMVR, in some embodiments, the adopted DMVR design has the following main features:

Early termination when (0,0) position SAD between list0 and list1 is smaller than a threshold.
Early termination when SAD between list0 and list1 is zero for some position.
Block sizes for DMVR: W*H>=64 && H>=8, wherein W and H are the width and height of the block.
Split the CU into multiple of 16×16 sub-blocks for DMVR of CU size>16*16. If only width or height of the CU is larger than 16, it is only split in vertical or horizontal direction.
Reference block size (W+7)*(H+7) (for luma).
25 points SAD-based integer-pel search (e.g. (+−) 2 refinement search range, single stage)
Bilinear-interpolation based DMVR.
"Parametric error surface equation" based sub-pel refinement. This procedure is performed only when the minimum SAD cost is not equal to zero and the best MVD is (0, 0) in the last MV refinement iteration.
Luma/chroma MC w/reference block padding (if needed).
Refined MVs used for MC and TMVPs only.

2.2.8.1.1 Usage of DMVR

When the following conditions are all true, DMVR may be enabled:

DMVR enabling flag in the SPS (e.g., sps_dmvr_enabled_ flag) is equal to 1
TPM flag, inter-affine flag and subblock merge flag (either ATMVP or affine merge), MMVD flag are all equal to 0
Merge flag is equal to 1
Current block is bi-predicted, and POC distance between current picture and reference picture in list 1 is equal to the POC distance between reference picture in list 0 and current picture
The current CU height is greater than or equal to 8
Number of luma samples (CU width*height) is greater than or equal to 64

2.2.8.1.2 "Parametric Error Surface Equation" Based Sub-Pel Refinement

The method is summarized below:

1. The parametric error surface fit is computed only if the center position is the best cost position in a given iteration.
2. The center position cost and the costs at (−1,0), (0,−1), (1,0) and (0,1) positions from the center are used to fit a 2-D parabolic error surface equation of the form $$E(x,y)=A(x-x_0)^2+B(y-y_0)^2+C$$

where $(x_0, y_0)$ corresponds to the position with the least cost and C corresponds to the minimum cost value. By solving the 5 equations in 5 unknowns, $(x_0, y_0)$ is computed as:

$$x_0=(E(-1,0)-E(1,0))/(2(E(-1,0)+E(1,0)-2E(0,0)))$$

$$y_0=(E(0,-1)-E(0,1))/(2((E(0,-1)+E(0,1)-2E(0,0)))$$

$(x_0, y_0)$ can be computed to any required sub-pixel precision by adjusting the precision at which the division is performed (e.g. how many bits of quotient are computed). For $\frac{1}{16}^{th}$-pel accuracy, just 4-bits in the absolute value of the quotient needs to be computed, which lends itself to a fast-shifted subtraction-based implementation of the 2 divisions required per CU.

3. The computed $(x_0, y_0)$ are added to the integer distance refinement MV to get the sub-pixel accurate refinement delta MV.

2.3 Intra Block Copy

Figure 21:
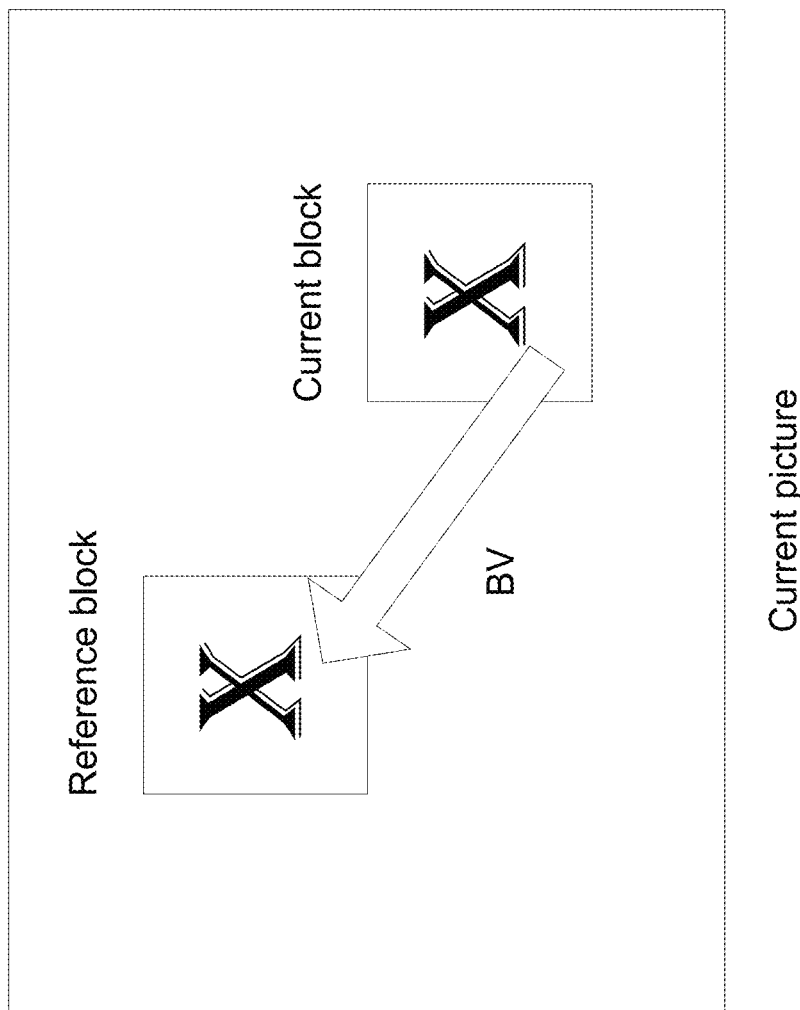
FIG. 21 is an example of intra block copy.

Intra block copy (IBC), a.k.a. current picture referencing, has been adopted in HEVC Screen Content Coding extensions (HEVC-SCC) and the current VVC test model (VTM-4.0). IBC extends the concept of motion compensation from inter-frame coding to intra-frame coding. As demonstrated in FIG. 21, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.3.1 IBC in VVC Test Model (VTM4.0)

In the current VVC test model, e.g. VTM-4.0 design, the whole reference block should be with the current coding tree unit (CTU) and does not overlap with the current block. Thus, there is no need to pad the reference or prediction block. The IBC flag is coded as a prediction mode of the current CU. Thus, there are totally three prediction modes, MODE_INTRA, MODE_INTER and MODE_IBC for each CU.

2.3.1.1 IBC Merge Mode

In IBC merge mode, an index pointing to an entry in the IBC merge candidates list is parsed from the bitstream. The construction of the IBC merge list can be summarized according to the following sequence of steps:

Step 1: Derivation of spatial candidates
Step 2: Insertion of HMVP candidates
Step 3: Insertion of pairwise average candidates In the derivation of spatial merge candidates, a maximum of four merge candidates are selected among candidates located in the positions depicted in $A_1$, $B_1$, $B_0$, $A_0$ and $B_2$ as depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is not coded with IBC mode. After candidate at position $A_1$ is added, the insertion of the remaining candidates is subject to a redundancy check which ensures that candidates with same motion information are excluded from the list so that coding efficiency is improved.

After insertion of the spatial candidates, if the IBC merge list size is still smaller than the maximum IBC merge list size, IBC candidates from HMVP table may be inserted. Redundancy check are performed when inserting the HMVP candidates.

Finally, pairwise average candidates are inserted into the IBC merge list.

When a reference block identified by a merge candidate is outside of the picture, or overlaps with the current block, or outside of the reconstructed area, or outside of the valid area restricted by some constrains, the merge candidate is called invalid merge candidate.

It is noted that invalid merge candidates may be inserted into the IBC merge list.

2.3.1.2 IBC AMVP Mode

In IBC AMVP mode, an AMVP index point to an entry in the IBC AMVP list is parsed from the bitstream. The construction of the IBC AMVP list can be summarized according to the following sequence of steps:

Step 1: Derivation of spatial candidates
Check $A_0$, $A_1$ until an available candidate is found.
Check $B_0$, $B_1$, $B_2$ until an available candidate is found.
Step 2: Insertion of HMVP candidates
Step 3: Insertion of zero candidates After insertion of the spatial candidates, if the IBC AMVP list size is still smaller than the maximum IBC AMVP list size, IBC candidates from HMVP table may be inserted.

Finally, zero candidates are inserted into the IBC AMVP list.

2.3.1.3 Chroma IBC Mode

In the current VVC, the motion compensation in the chroma IBC mode is performed at sub block level. The chroma block will be partitioned into several sub blocks. Each sub block determines whether the corresponding luma block has a block vector and the validity if it is present. There is encoder constrain in the current VTM, where the chroma IBC mode will be tested if all sub blocks in the current chroma CU have valid luma block vectors. For example, on a YUV 420 video, the chroma block is N×M and then the collocated luma region is 2N×2M. The sub block size of a chroma block is 2×2. There are several steps to perform the chroma mv derivation then the block copy process.

(1) The chroma block will be first partitioned into (N>>1) *(M>>1) sub blocks.

(2) Each sub block with a top left sample coordinated at (x, y) fetches the corresponding luma block covering the same top-left sample which is coordinated at (2x, 2y).

(3) The encoder checks the block vector(bv) of the fetched luma block. If one of the following conditions is satisfied, the by is considered as invalid.

a. A by of the corresponding luma block is not existing.
b. The prediction block identified by a by is not reconstructed yet.
c. The prediction block identified by a by is partially or fully overlapped with the current block.

(4) The chroma motion vector of a sub block is set to the motion vector of the corresponding luma sub block.

The IBC mode is allowed at the encoder when all sub blocks find a valid by.

2.3.2 Recent Progress for IBC 2.3.2.1 Single BV List

In some embodiments, the BV predictors for merge mode and AMVP mode in IBC share a common predictor list, which consist of the following elements:

(1) 2 spatial neighboring positions (A1, B1 as in FIG. 2)
(2) 5 HMVP entries
(3) Zero vectors by default The number of candidates in the list is controlled by a variable derived from the slice header. For merge mode, up to first 6 entries of this list can be used; for AMVP mode, the first 2 entries of this list can be used. And the list conforms with the shared merge list region requirement (shared the same list within the SMR).

In addition to the above-mentioned BV predictor candidate list, the pruning operations between HMVP candidates and the existing merge candidates (A1, B1) can be simplified. In the simplification there will be up to 2 pruning operations since it only compares the first HMVP candidate with spatial merge candidate(s).

2.3.2.2 Size Restriction of IBC

In some embodiments, syntax constraint for disabling 128×128 IBC mode can be explicitly used on top of the current bitstream constraint in the previous VTM and VVC versions, which makes presence of IBC flag dependent on CU size<128×128.

2.3.2.3 Shared Merge List for IBC

To reduce the decoder complexity and support parallel encoding, in some embodiments, the same merging candidate list for all leaf coding units (CUs) of one ancestor node in the CU split tree can be shared for enabling parallel processing of small skip/merge-coded CUs. The ancestor node is named merge sharing node. The shared merging candidate list is generated at the merge sharing node pretending the merge sharing node is a leaf CU.

More specifically, the following may apply:

If the block has luma samples no larger than 32, and split to 2 4×4 child blocks, sharing merge lists between very small blocks (e.g. two adjacent 4×4 blocks) is used.

If the block has luma samples larger than 32, however, after a split, at least one child block is smaller than the threshold (32), all child blocks of that split share the same merge list (e.g. 16×4 or 4×16 split ternary or 8×8 with quad split).

Such a restriction is only applied to IBC merge mode.

3. Problems Solved by Embodiments

One block may be coded with the IBC mode. However, different sub-regions within the block may be with different content. How to further explore the correlation to the previously coded blocks within current frame needs to be studied.

4. Examples of Embodiments

In this document, intra block copy (IBC) may not be limited to the current IBC technology, but may be interpreted as the technology that using the reference samples within the current slice/tile/brick/picture/other video unit (e.g., CTU row) excluding the conventional intra prediction methods.

To solve the problem mentioned above, sub-block-based IBC (sbIBC) coding method is proposed. In sbIBC, a current IBC-coded video block (e.g., CU/PU/CB/PB) is divided into a plurality of sub-blocks. Each of the sub-blocks may have a size smaller than a size of the video block. For each respective sub-block from the plurality of sub-blocks, the video coder may identify a reference block for the respective sub-block in current picture/slice/tile/brick/tile group. The video coder may use motion parameters of the identified reference block for the respective sub-block to determine motion parameters for the respective sub-block.

In addition, it is not restricted that IBC only is applied to uni-prediction coded blocks. Bi-prediction may be also supported with both two reference pictures are the current picture. Alternatively, bi-prediction with one from the current picture and the other one from a different picture may be supported as well. In yet another example, multiple hypothesis may be also applied.

The listing below should be considered as examples to explain general concepts. These techniques should not be interpreted in a narrow way. Furthermore, these techniques can be combined in any manner. Neighboring blocks A0, A1, B0, B1, and B2 are shown in FIG. 2.
1. In sbIBC, one block with size equal to M×N may be split to more than one sub-block.
   a. In one example, the sub-block size is fixed to be L×K, e.g., L=K=4.
   b. In one example, the sub-block size is fixed to be the minimum coding unit/prediction unit/transform unit/the unit for motion information storage.
   c. In one example, one block may be split to multiple sub-blocks with different sizes or with equal sizes.
   d. In one example, indication of the sub-block size may be signaled.
   e. In one example, indication of the sub-block size may be changed from block to block, e.g., according to block dimensions.
   f. In one example, the sub-block size must be in a form of (N1×minW)×(N2×minH), wherein minW×minH represents the minimum coding unit/prediction unit/transform unit/the unit for motion information storage, and N1 and N2 are positive integers.
   g. In one example, the sub-block dimensions may depend on the color formats and/or color components.
      i. For example, the sub-block sizes for different color components may be different.
         1) Alternatively, sub-block sizes for different color components may be the same.
      ii. For example, a 2L×2K sub-block of the luma component may correspond to a L×K sub-block of a chroma component when the color format is 4:2:0.
         1) Alternatively, four 2L×2K sub-block of the luma component may correspond to a 2L×2K sub-block of a chroma component when the color format is 4:2:0.
      iii. For example, a 2L×2K sub-block of the luma component may correspond to a 2L×K sub-block of a chroma component when the color format is 4:2:2.
         1) Alternatively, Two 2L×2K sub-block of the luma component may correspond to a 2L×2K sub-block of a chroma component when the color format is 4:2:2.
      iv. For example, a 2L×2K sub-block of the luma component may correspond to a 2L×2K sub-block of a chroma component when the color format is 4:4:4.
   h. In one example, the MV of a sub-block of a first color component may be derived from one corresponding sub-block or plurality of corresponding sub-blocks of a second color component.
      i. For example, the MV of a sub-block of a first color component may be derived as the average MV of the plurality of corresponding sub-blocks of a second color component.
      ii. Alternatively, furthermore, the above methods may be applied when single tree is utilized.
      iii. Alternatively, furthermore, the above methods may be applied when for certain block sizes, such as 4×4 chroma blocks.
   i. In one example, the sub-block size may be dependent on the coded mode, such as IBC merge/AMVP mode.
   j. In one example, the sub-block may be non-rectangular, such as triangular/wedgelet.
2. Two stages, including the identification of a corresponding reference block with an initialized motion vector (denoted as initMV) and the derivation of one or multiple motion vectors for a sub-CU according to the reference block, are utilized to obtain the motion information of a sub-CU, at least one reference picture of which is equal to the current picture.
   a. In one example, the reference block may be in the current picture.
   b. In one example, the reference block may be in a reference picture.
      i. For example, it may be in the collocated reference picture.
      ii. For example, it may be in a reference picture identified by using the motion information of the collocated block or neighboring blocks of the collocated block.

Stage 1.a on settings of initMV (vx, vy)
   c. In one example, the initMV may be derived from one or multiple neighboring blocks (adjacent or non-adjacent) of the current block or current sub-block.

i. The neighboring block can be one in the same picture.
   1) Alternatively, it can be one in a reference picture.
      a. For example, it may be in the collocated reference picture.
      b. For example, it may be identified by using the motion information of the collocated block or neighboring blocks of the collocated block.
   ii. In one example, it may be derived from a neighbouring block Z.
      1) For example, initMV may be set equal to a MV stored in the neighbouring block Z. E.g., neighbouring block Z may be block A1.
   iii. In one example, it may be derived from multiple blocks checked in order.
      1) In one example, the first identified motion vector associated with the current picture as a reference picture from the checked blocks may be set to be the initMV.
d. In one example, the initMV may be derived from a motion candidate list.
   i. In one example, it may be derived from the k-th (e.g., $1^{st}$) candidate in the IBC candidate list.
      1) In one example, the IBC candidate list is the merge/AMVP candidate list.
      2) In one example, the IBC candidate list different from the existing IBC merge candidate list construction process may be utilized, such as using different spatial neighboring blocks.
   ii. In one example, it may be derived from the k-th (e.g., $1^{st}$) candidate in the IBC HMVP table.
e. In one example, it may be derived based on the current block's position.
f. In one example, it may be derived depending on the current block's dimensions.
g. In one example, it may be set to default values.
h. In one example, indications of the initMV may be signaled in a video unit level, such as tile/slice/picture/brick/CTU row/CTU/CTB/CU/PU/TU etc. al.
i. The initial MV may be different for two different sub-blocks within current block.
j. how to derive the initial MV may be changed from block to block, from tile to tile, from slice to slice, etc. al.

Stage 1.b on identification of corresponding reference block of a sub-CU using initMV
k. In one example, the initMV may be firstly converted to 1-pel integer precision and the converted MV may be utilized to identify the corresponding block of a sub-block. Denote the converted MV denoted by (vx', vy').
   i. In one example, if (vx, vy) are in the F-pel inter precision, the converted MV denoted by (vx', vy') may be set to (vx*F, vy*F) (e.g., F=2 or 4).
   ii. Alternatively, (vx', vy') is directly set equal to (vx, vy).
l. Suppose the top-left position of one sub-block is (x, y) and sub-block size is K×L. The corresponding block of the sub-block is set to the CU/CB/PU/PB covering the coordinate (x+offsetX+vx', y+offsetY+vy') wherein offsetX and offsetY are utilized to indicate the selected coordinate relative to current sub-block.
   i. In one example, offsetX and/or offsetY are set to 0.
   ii. In one example, offsetX may be set to (L/2) or (L/2+1) or (L/2−1) wherein L may be the sub-block' width.
   iii. In one example, offsetY may be set to (K/2) or (K/2+1) or (K/2−1) wherein K may be the sub-block' height.
   iv. Alternatively, the horizontal and/or vertical offset may be further clipped to a range, such as within picture/slice/tile/brick boundary/IBC reference area etc. al.

Stage 2 on derivation of sub-block's motion vector (denoted by subMV (subMVx, subMVy) using motion information of the identified corresponding reference block
m. A subMV of a sub-block is derived from the motion information of the corresponding block.
   i. In one example, if the corresponding block has a motion vector pointing to the current picture, subMV is set equal to the MV.
   ii. In one example, if the corresponding block has a motion vector pointing to the current picture, subMV is set equal to the MV plus the initMV.
n. The derived subMV may be further clipped to a given range or clipped to make sure it is pointing to the IBC reference area.
o. In a conformance bit-stream, the derived subMV must be a valid MV of IBC for the sub-block.

3. One or multiple IBC candidates with sub-block motion vectors may be generated, which may be denoted as sub-block IBC candidates.
4. A sub-block IBC candidate may be inserted to the sub-block merge candidate which include ATMVP, affine merge candidates.
   a. In one example, it may be added before all other sub-block merge candidates.
   b. In one example, it may be added after the ATMVP candidate.
   c. In one example, it may be added after the inherited affine candidates or the constructed affine candidate.
   d. In one example, it may be added to the IBC merge/AMVP candidate list
      i. Alternatively, whether to add it may depend on the mode information of current block. For example, if it is IBC AMVP mode, it may not be added.
   e. Which candidate list to be added may depend on the partitioning structure, e.g., dual tree or single tree.
   f. Alternatively, multiple sub-block IBC candidates may be inserted to the sub-block merge candidate.
5. IBC sub-block motion (e.g., AMVP/merge) candidate list may be constructed with at least one sub-block IBC candidate.
   a. Alternatively, one or multiple sub-block IBC candidates may be inserted to the IBC sub-block merge candidate, e.g., using different initialized MVs.
   b. Alternatively, furthermore, whether to construct the IBC sub-block motion candidate list or the existing IBC AMVP/merge candidate list may be signaled by an indicator, or derived on-the-fly.
   c. Alternatively, furthermore, an index to the IBC sub-block merge candidate list may be signaled if current block is coded with IBC merge mode.
   d. Alternatively, furthermore, an index to the IBC sub-block AMVP candidate list may be signaled if current block is coded with IBC AMVP mode.
      i. Alternatively, furthermore, the signaled/derived MVD for the IBC AMVP mode may be applied to one or multiple sub-blocks.

6. The reference block of a sub-block and the sub-block may belong to the same color component.

Extended of sbIBC by mixed usage of other tools applied to different sub-blocks in the same block 7. One block may be split to multiple sub-blocks with at least one coded with IBC and at least one coded with intra mode.
   a. In one example, for a sub-block, a motion vector may not be derived. Instead, one or multiple intra prediction modes may be derived for a sub-block.
   b. Alternatively, palette mode or/and palette table may be derived.
   c. In one example, one intra prediction mode may be derived for the entire block.
8. One block may be split to multiple sub-blocks with all sub-blocks coded with intra mode.
9. One block may be split to multiple sub-blocks with all sub-blocks coded with palette mode.
10. One block may be split to multiple sub-blocks with at least one sub-block coded with IBC mode and at least one coded with palette mode.
11. One block may be split to multiple sub-blocks with at least one sub-block coded with intra mode and at least one coded with palette mode.
12. One block may be split to multiple sub-blocks with at least one sub-block coded with IBC mode and at least one coded with inter mode.
13. One block may be split to multiple sub-blocks with at least one sub-block coded with intra mode and at least one coded with inter mode.

Interactions with other tools

14. When one or multiple of the above methods are applied, the IBC HMVP table may not be updated.
    a. Alternatively, one or multiple of the motion vectors for IBC-coded sub-regions may be used to update the IBC HMVP table.
15. When one or multiple of the above methods are applied, the non-IBC HMVP table may not be updated.
    b. Alternatively, one or multiple of the motion vectors for inter-coded sub-regions may be used to update the non-IBC HMVP table.
16. The in-loop filtering process (e.g., deblocking procedure) may depend on the usage of above methods.
    a. In one example, sub-blocks boundary may be filtered when one or multiple of the above methods are applied.
       a. Alternatively, sub-blocks boundary may be filtered when one or multiple of the above methods are applied.
    b. In one example, blocks coded with above methods may be treated in a similar way as the conventional IBC coded blocks. 17. Certain coding methods (e.g., sub-block transform, affine motion prediction, multiple reference line intra prediction, matrix-based intra prediction, symmetric MVD coding, merge with MVD decoder side motion derivation/refinement, bi-directional optimal flow, reduced secondary transform, multiple transform set, etc.) may be disabled for blocks coded with one or multiple of the above methods.
18. Indication of usage of the above methods and/or sub-block sizes may be signaled in sequence/picture/slice/tile group/tile/brick/CTU/CTB/CU/PU/TU/other video unit-level or derived on-the-fly.
    a. In one example, one or multiple of the above method may be treated as a special IBC mode.
    i. Alternatively, furthermore, if one block is coded as IBC mode, further indications of using conventional whole-block based IBC method or sbIBC may be signaled or derived.
    ii. In one example, the subsequent IBC-coded blocks may utilize the motion information of the current sbIBC-coded block as a MV predictor.
       1. Alternatively, the subsequent IBC-coded blocks may be disallowed to utilize the motion information of the current sbIBC-coded block as a MV predictor.
    b. In one example, sbIBC may be indicated by a candidate index to a motion candidate list.
       i. In one example, a specific candidate index is assigned to a sbIBC coded block.
    c. In one example, the IBC candidate may be classified into two categories: one for whole block coding, and the other for sub-block coding. Whether one block is coded with the sbIBC mode may depend on the category of an IBC candidate.

Usage of the tools

19. Whether and/or how to apply the above methods may depend on the following information:
    a. A message signaled in the DPS/SPS/VPS/PPS/APS/picture header/slice header/tile group header/Largest coding unit (LCU)/Coding unit (CU)/LCU row/group of LCUs/TU/PU block/Video coding unit
    b. Position of CU/PU/TU/block/Video coding unit
    c. Block dimension of current block and/or its neighboring blocks
    d. Block shape of current block and/or its neighboring blocks
    e. The intra mode of the current block and/or its neighboring blocks
    f. The motion/block vectors of its neighboring blocks
    g. Indication of the color format (such as 4:2:0, 4:4:4)
    h. Coding tree structure
    i. Slice/tile group type and/or picture type
    j. Color component (e.g. may be only applied on chroma components or luma component)
    k. Temporal layer ID
    l. Profiles/Levels/Tiers of a standard Ideas related to merge list construction process and IBC usage 20. IBC mode may be used together with inter prediction mode for blocks in inter-coded pictures/slices/tile groups/tiles.
    a. In one example, for IBC AMVP mode, syntax elements may be signaled to indicate whether the current block is predicted both from the current picture and a reference picture not identical to the current picture (denoted as a temporal reference picture).
       i. Alternatively, furthermore, if the current block is also predicted from a temporal reference picture, syntax elements may be signaled to indicate which temporal reference picture is used and its associated MVP index, MVD, MV precision etc.
       ii. In one example, for IBC AMVP mode, one reference picture list may only include the current picture, and the other reference picture list may only include temporal reference pictures.
    b. In one example, for IBC merge mode, motion vectors and reference pictures may be derived from neighboring blocks.
       i. For example, if a neighboring block is only predicted from the current picture, then the derived motion information from the neighbouring block may only refer to the current picture.
    ii. For example, if a neighboring block is predicted both from the current picture and a temporal reference picture, then the derived motion information may refer to both the current picture and a temporal reference picture.
        1) Alternatively, the derived motion information may only refer to the current picture.
    iii. For example, if a neighboring block is predicted only from a temporal reference pictures, it may be considered as "invalid" or "unavailable" when constructing IBC merge candidates.
  c. In one example, fixed weighting factor may be assigned to reference blocks from current picture and reference blocks from temporal reference picture for bi-prediction.
    i. Alternatively, furthermore, the weighting factor may be signaled.
21. The motion candidate list construction process (e.g., regular merge list, IBC merge/AMVP list, sub-block merge list, IBC sub-block candidate list) and/or whether to/how to update HMVP tables may depend on the block dimensions and/or merge sharing conditions. Denote a block's width and height as W and H, respectively. Condition C may depend on block dimension and/or coded information.
  a. The motion candidate list construction process (e.g., regular merge list, IBC merge/AMVP list, sub-block merge list, IBC sub-block candidate list) and/or whether to/how to update HMVP tables may depend on condition C.
  b. In one example, condition C may depend on the coded information of current block and/or its neighboring (adjacent or non-adjacent) blocks.
  c. In one example, condition C may depend on the merge sharing conditions.
  d. In one example, condition C may depend on the block dimension of current block, and/or block dimension of neighboring (adjacent or non-adjacent) blocks and/or coded modes of current and/or neighboring blocks.
  e. In one example, derivation of spatial merge candidates is skipped if condition C is satisfied.
  f. In one example, derivation of candidates from spatial neighboring (adjacent or non-adjacent) blocks is skipped if condition C is satisfied.
  g. In one example, derivation of candidates from certain spatial neighboring (adjacent or non-adjacent) blocks (e.g., block B2) is skipped if condition C is satisfied.
  h. In one example, derivation of HMVP candidates is skipped if condition C is satisfied.
  i. In one example, derivation of pairwise merge candidates is skipped if condition C is satisfied.
  j. In one example, number of maximum pruning operations is reduced or set to 0 if condition C is satisfied.
    i. Alternatively, furthermore, the pruning operations among spatial merge candidates may be reduced or removed.
    ii. Alternatively, furthermore, the pruning operations among HMVP candidates and other merge candidates may be reduced or removed.
  k. In one example, updating of HMVP candidates is skipped if condition C is satisfied.
    i. In one example, HMVP candidates may be directly added to motion list without being pruned.
  l. In one example, default motion candidates (e.g., zero motion candidate in IBC merge/AVMP list) is not added if condition C is satisfied.
  m. In one example, different checking order (e.g, from the first to the last instead of from last to the first) and/or different number of HMVP candidates to be checked/added when condition C is satisfied.
  n. In one example, condition C may be satisfied when W*H is greater or no smaller than a threshold (e.g., 1024).
  o. In one example, condition C may be satisfied when W and/or H is greater or no smaller than a threshold (e.g., 32).
  p. In one example, condition C may be satisfied when W is greater or no smaller than a threshold (e.g., 32).
  q. In one example, condition C may be satisfied when H is greater or no smaller than a threshold (e.g., 32).
  r. In one example, condition C may be satisfied when W*H is greater or no smaller than a threshold (e.g., 1024) and current block is coded with IBC AMVP and/or merge mode.
  s. In one example, condition C may be satisfied when W*H is smaller or no greater than a threshold (e.g., 16 or 32 or 64) and current block is coded with IBC AMVP and/or merge mode.
    i. Alternatively, furthermore, when condition C is satisfied, the IBC motion list construction process may include candidates from spatial neighboring blocks (e.g., A1, B1) and default candidates. That is, insertion of HMVP candidates is skipped.
    ii. Alternatively, furthermore, when condition C is satisfied, the IBC motion list construction process may include candidates from HMVP candidates from the IBC HMVP table and default candidates. That is, insertion of candidates from spatial neighboring blocks is skipped.
    iii. Alternatively, furthermore, the updating of IBC HMVP tables is skipped after decoding a block with condition C satisfied.
    iv. Alternatively, condition C may be satisfied when one/some/all of the following cases are true:
        1) When W*H is equal to or no greater than T1 (e.g., 16) and current block is coded with IBC AMVP and/or merge mode
        2) When W is equal to T2 and H is equal to T3 (e.g., T2=4, T3=8), its above block is available and size equal to A×B; and both current block and its above block are coded with a certain mode
            a. Alternatively, when W is equal to T2 and H is equal to T3 (e.g., T2=4, T3=8), its above block is available, in the same CTU and size equal to A×B, and both current block and its above block are coded with the same mode
            b. Alternatively, when W is equal to T2 and H is equal to T3 (e.g., T2=4, T3=8), its above block is available and size equal to A×B, and both current block and its above block are coded with the same mode
            c. Alternatively, when W is equal to T2 and H is equal to T3 (e.g., T2=4, T3=8), its above block is unavailable
            d. Alternatively, when W is equal to T2 and H is equal to T3 (e.g., T2=4, T3=8), its above block is unavailable or above block is outside the current CTU 3) When W is equal to T4 and H is equal to T5 (e.g., T4=8, T5=4), its left block is available and size equal to A×B; both current block and its left block are coded with a certain mode
   a. Alternatively, when W is equal to T4 and H is equal to T5 (e.g., T4=8, T5=4), its left block is unavailable
4) When W*H is no greater than T1 (e.g., 32), current block is coded with IBC AMVP and/or merge mode; both its above and left neighboring blocks are available, and size equal to A×B, and are coded with a certain mode.
   a. When W*H is no greater than T1 (e.g., 32), current block is coded with a certain mode; its left neighboring block is available, size equal to A×B and IBC coded; and its above neighboring block is available, within the same CTU and size equal to A×B and coded with the same mode.
   b. When W*H is no greater than T1 (e.g., 32), current block is coded with a certain mode; its left neighboring block is unavailable; and its above neighboring block is available, within the same CTU and size equal to A×B and coded with the same mode.
   c. When W*H is no greater than T1 (e.g., 32), current block is coded with a certain mode; its left neighboring block is unavailable; and its above neighboring block is unavailable.
   d. When W*H is no greater than T1 (e.g., 32), current block is coded with a certain mode; its left neighboring block is available, size equal to A×B and coded with same mode; and its above neighboring block is unavailable.
   e. When W*H is no greater than T1 (e.g., 32), current block is coded with a certain mode; its left neighboring block is unavailable; and its above neighboring block is unavailable or outside the current CTU.
   f. When W*H is no greater than T1 (e.g., 32), current block is coded with a certain mode; its left neighboring block is available, size equal to A×B and coded with same mode; and its above neighboring block is unavailable or outside the current CTU.
5) In above examples, the 'certain mode' is the IBC mode.
6) In above examples, the 'certain mode' is the Inter mode.
7) In above examples, the 'A×B' may be set to 4×4.
8) In above examples, 'the neighboring block size equal to A×B' may be replaced by 'the neighboring block size is no greater than or no smaller than A×B'.
9) In above examples, above and left neighboring blocks are the two which are accessed for spatial merge candidate derivation.
   a. In one example, suppose the coordinate of the top-left sample in current block is (x, y), the left block is the one covering (x−1, y+H−1).
   b. In one example, suppose the coordinate of the top-left sample in current block is (x, y), the left block is the one covering (x+W−1, y−1).
t. The thresholds mentioned above may be pre-defined or signaled.
   i. Alternatively, furthermore, the thresholds may be dependent on coding information of a block, such as coded mode.
u. In one example, condition C is satisfied when the current block is under a shared node and current block is coded with IBC AMVP and/or merge mode.
   i. Alternatively, furthermore, when condition C is satisfied, the IBC motion list construction process may include candidates from spatial neighboring blocks (e.g., A1, B1) and default candidates. That is, insertion of HMVP candidates is skipped.
   ii. Alternatively, furthermore, when condition C is satisfied, the IBC motion list construction process may include candidates from HMVP candidates from the IBC HMVP table and default candidates. That is, insertion of candidates from spatial neighboring blocks is skipped.
   iii. Alternatively, furthermore, the updating of IBC HMVP tables is skipped after decoding a block with condition C satisfied.
v. In one example, the condition C may be adaptively changed, such as according to coding information of a block.
   i. In one example, condition C may be defined based on the coded mode (IBC or non-IBC mode), block dimension.
w. Whether to apply the above methods may depend on the coding information of a block, such as whether it is IBC coded block or not.
   i. In one example, when the block is IBC coded, the above method may be applied.

IBC motion list
22. It is proposed that motion candidates in IBC HMVP tables are stored in integer pel precision instead of 1/16-pel precision.
   a. In one example, all the motion candidates are stored in 1-pel precision.
   b. In one example, when using the motion information from spatial neighboring (adjacent or non-adjacent) blocks, and/or from IBC HMVP tables, rounding process of MVs are skipped.
23. It is proposed that the IBC motion list may only contain motion candidates from one or more IBC HMVP tables.
   a. Alternatively, furthermore, the signaling of a candidate in the IBC motion list may depend on the number of available HMVP candidates in a HMVP table.
   b. Alternatively, furthermore, the signaling of a candidate in the IBC motion list may depend on the maximum number of HMVP candidates in a HMVP table.
   c. Alternatively, the HMVP candidates in the HMVP tables are added to the list in order without pruning.
      i. In one example, the order is based on the ascending order of entry index to the tables.
      ii. In one example, the order is based on the descending order of entry index to the tables.
      iii. In one example, the first N entries in the table may be skipped.
      iv. In one example, the last N entries in the table may be skipped.
      v. In one example, an entry with invalid BV(s) may be skipped.
      vi.
   d. Alternatively, furthermore, motion candidates derived from the HMVP candidates from one or multiple HMVP tables may be further modified, such as by adding an offset to the horizontal vector and/or adding an offset to the vertical vector.
   i. An HMVP candidate with invalid BV(s) may be modified to provide valid BV(s).
  e. Alternatively, furthermore, default motion candidates may be added after or before one or multiple HMVP candidates.
  f. How to/whether to add HMVP candidates into an IBC motion list may depend on the dimensions of the block.
    i. For example, the IBC motion list may only contain motion candidates from one or multiple HMVP tables when the block dimensions (W and H representing width and height) satisfy a condition C.
      1) In one example, condition C is W<=T1 and H<=T2, e.g. T1=T2=4.
      2) In one example, condition C is W<=T1 or H<=T2, e.g. T1=T2=4.
      3) In one example, condition C is W*H<=T, e.g. T=16.

5. Embodiments

The added changes are highlighted in underlined bold faced italics. The deletions are marked with [[ ]].

5.1 Embodiment #1

No update of HMVP tables when current block is under the shared node. And only use a single IBC HMVP table for blocks under the shared node.
7.4.8.5 Coding Unit Semantics
[[When all the following conditions are true, the history-based motion vector predictor list for the shared merging candidate list region is updated by setting NumHmvpSmrIbcCand equal to NumHmvpIbcCand, and setting HmvpSmrIbcCandList[i] equal to HmvpIbcCandList[i] for i=0 . . . . NumHmvpIbcCand−1:
  IsInSmr[x0][y0] is equal to TRUE.
  SmrX[x0][y0] is equal to x0.
  SmrY[x0][y0] is equal to y0.]]
8.6.2 Derivation Process for Motion Vector Components for IBC Blocks
8.6.2.1 General
Inputs to this process are:
  a luma location (xCb, yCb) of the top-left sample of the current luma coding block relative to the top-left luma sample of the current picture,
  a variable cbWidth specifying the width of the current coding block in luma samples,
  a variable cbHeight specifying the height of the current coding block in luma samples.
Outputs of this process are:
  the luma motion vector in 1/16 fractional-sample accuracy mvL.
The luma motion vector mvL is derived as follows:
  The derivation process for IBC luma motion vector prediction as specified in clause 8.6.2.2 is invoked with the luma location (xCb, yCb), the variables cbWidth and cbHeight inputs, and the output being the luma motion vector mvL.
  When general_merge_flag[xCb][yCb] is equal to 0, the following applies:
    1. The variable mvd is derived as follows:

$$mvd[0]=MvdL0[xCb][yCb][0] \quad (8\text{-}883)$$

$$mvd[1]=MvdL0[xCb][yCb][1] \quad (8\text{-}884)$$

2. The rounding process for motion vectors as specified in clause 8.5.2.14 is invoked with mvX set equal to mvL, rightShift set equal to MvShift+2, and leftShift set equal to MvShift+2 as inputs and the rounded mvL as output.
   3. The luma motion vector mvL is modified as follows:

$$u[0]=(mvL[0]+mvd[0]+2^{18})\% \ 2^{18} \quad (8\text{-}885)$$

$$mvL[0]=(u[0]>=2^{17})?(u[0]-2^{18}):u[0] \quad (8\text{-}886)$$

$$u[1]=(mvL[1]+mvd[1]+2^{18})\% \ 2^{18} \quad (8\text{-}887)$$

$$mvL[1]=(u[1]>=2^{17})?(u[1]-2^{18}):u[1] \quad (8\text{-}888)$$

NOTE 1—The resulting values of mvL[0] and mvL[1] as specified above will always be in the range of $-2^{17}$ to $2^{17}-1$, inclusive.
*When IsInSmr[ xCb ][ yCb ] is false,* The updating process for the history-based motion vector predictor list as specified in clause 8.6.2.6 is invoked with luma motion vector mvL.
The top-left location inside the reference block (xRefTL, yRefTL) and the bottom-right location inside the reference block (xRefBR, yRefBR) are derived as follows:

$$(xRefTL,yRefTL)=(xCb+(mvL[0]>>4),yCb+(mvL[1]>>4)) \quad (8\text{-}889)$$

$$(xRefBR,yRefBR)=(xRefTL+cbWidth-1,yRefTL+cbHeight-1) \quad (8\text{-}890)$$

It is a requirement of bitstream conformance that the luma motion vector mvL shall obey the following constraints:
8.6.2.4 Derivation Process for IBC History-Based Motion Vector Candidates
Inputs to this process are:
  a motion vector candidate list mvCandList,
  the number of available motion vector candidates in the list numCurrCand.
Outputs to this process are:
  the modified motion vector candidate list mvCandList,
  [[a variable isInSmr specifying whether the current coding unit is inside a shared merging candidate region,]]
  the modified number of motion vector candidates in the list numCurrCand.
The variables isPrunedA$_1$ and isPrunedB$_1$ are set both equal to FALSE.
The array smrHmvpIbcCandList and the variable smrNumHmvpIbcCand are derived as follows:

$$[[smr]]HmvpIbcCandList=[[isInSmr?HmvpSmrIbcCandList:]]HmvpIbcCandList \quad (8\text{-}906)$$

$$[[smr]]NumHmvpIbcCand=[[isInSmr?NumHmvpSmrIbcCand:]]NumHmvpIbcCand \quad (8\text{-}907)$$

For each candidate in smrHmvpIbcCandList[hMvpIdx] with index hMvpIdx=1 . . . [[smr]]NumHmvpIbcCand, the following ordered steps are repeated until numCurrCand is equal to MaxNumMergeCand:
  1. The variable sameMotion is derived as follows:
    If all of the following conditions are true for any motion vector candidate N with N being A$_1$ or B$_1$, sameMotion and isPrunedN are both set equal to TRUE:
      hMvpIdx is less than or equal to 1.
      The candidate [[smr]]HmvpIbcCandList[[[smr]]NumHmvpIbcCand−hMvpIdx] is equal to the motion vector candidate N.
      isPrunedN is equal to FALSE.
    Otherwise, sameMotion is set equal to FALSE.

2. When sameMotion is equal to FALSE, the candidate [[smr]]HmvpIbcCandList[[[smr]]NumHmvpIbcCand−hMvpIdx] is added to the motion vector candidate list as follows:

mvCandList[numCurrCand++]=[[smr]]HmvpIbcCandList[[[smr]]NumHmvpIbcCand−hMvpIdx]  (8-908)

5.2 Embodiment #2

Remove checking of spatial merge/AMVP candidates in the IBC motion list construction process when block size satisfies certain conditions, such as Width*Height<K. In the following description, the threshold K can be pre-defined, as such 16.

7.4.8.2 Coding Tree Unit Semantics
The CTU is the root node of the coding tree structure.
[[The array IsInSmr[x][y] specifying whether the sample at (x, y) is located inside a shared merging candidate list region, is initialized as follows for x=0 . . . CtbSizeY−1 and y=0 . . . CtbSizeY−1:

IsInSmr[x][y]=FALSE  (7-96)]]

7.4.8.4 Coding Tree Semantics
[[When all of the following conditions are true, IsInSmr[x][y] is set equal to TRUE for x=x0 . . . x0+cbWidth−1 and y=y0 . . . y0+cbHeight−1:
  IsInSmr[x0][y0] is equal to FALSE
  cbWidth*cbHeight/4 is less than 32
  treeType is not equal to DUAL_TREE_CHROMA
When IsInSmr[x0][y0] is equal to TRUE. the arrays SmrX[x][y], SmrY[x][y], SmrW[x][y] and SmrH[x][y] are derived as follows for x=x0 . . . x0+cbWidth−1 and y=y0 . . . y0+cbHeight−1:

SmrX[x][y]=x0  (7-98)

SmrY[x][y]=y0  (7-99)

SmrW[x][y]=cbWidth  (7-100)

SmrH[x][y]=cbHeight  (7-101)

When all of the following conditions are true, IsInSmr[x][y] is set equal to TRUE for x=x0 . . . x0+cbWidth−1 and y=y0 . . . y0+cbHeight−1:
  IsInSmr[x0][y0] is equal to FALSE
  One of the following conditions is true:
    mtt_split_cu_binaly_flag is equal to 1 and cbWidth*cbHeight/2 is less than 32
    mtt_split_cu_binaly_flag is equal to 0 and cbWidth*cbHeight/4 is less than 32
  treeType is not equal to DUAL_TREE_CHROMA
When IsInSmr[x0][y0] is equal to TRUE. the arrays SmrX[x][y], SmrY[x][y], SmrW[x][y] and SmrH[x][y are derived as follows for x=x0 . . . x0+cbWidth−1 and y=y0 . . . y0+cbHeight−1:

SmrX[x][y]=x0  (7-102)

SmrY[x][y]=y0  (7-103)

SmrW[x][y]=cbWidth  (7-104)

SmrH[x][y]=cbHeight  (7-105)]]

7.4.8.5 Coding Unit Semantics
[[When all the following conditions are true, the history-based motion vector predictor list for the shared merging candidate list region is updated by setting NumHmvpSmrIbcCand equal to NumHmvpIbcCand, and setting HmvpSmrIbcCandList[i] equal to HmvpIbcCandList[i] for i=0 . . . NumHmvpIbcCand−1:
  IsInSmr[x0][y0] is equal to TRUE.
  SmrX[x0][y0] is equal to x0.
  SmrY[x0][y0] is equal to y0.]]
The following assignments are made for x=x0 . . . x0+cbWidth−1 and y=y0 . . . y0+cbHeight−1:

CbPosX[x][y]=x0  (7-106)

CbPosY[x][y]=y0  (7-107)

CbWidth[x][y]=cbWidth  (7-108)

CbHeight[x][y]=cbHeight  (7-109)

8.6.2 Derivation Process for Motion Vector Components for IBC Blocks
8.6.2.1 General
Inputs to this process are:
  a luma location (xCb, yCb) of the top-left sample of the current luma coding block relative to the top-left luma sample of the current picture,
  a variable cbWidth specifying the width of the current coding block in luma samples,
  a variable cbHeight specifying the height of the current coding block in luma samples.
Outputs of this process are:
  the luma motion vector in 1/16 fractional-sample accuracy mvL.
The luma motion vector mvL is derived as follows:
  The derivation process for IBC luma motion vector prediction as specified in clause 8.6.2.2 is invoked with the luma location (xCb, yCb), the variables cbWidth and cbHeight inputs, and the output being the luma motion vector mvL.
  When general_merge_flag[xCb][yCb] is equal to 0, the following applies:
    4. The variable mvd is derived as follows:

mvd[0]=MvdL0[xCb][yCb][0]  (8-883)

mvd[1]=MvdL0[xCb][yCb][1]  (8-884)

5. The rounding process for motion vectors as specified in clause 8.5.2.14 is invoked with mvX set equal to mvL, rightShift set equal to MvShift+2, and leftShift set equal to MvShift+2 as inputs and the rounded mvL as output.
    6. The luma motion vector mvL is modified as follows:

$u[0]=(mvL[0]+mvd[0]+2^{18})\% 2^{18}$  (8-885)

$mvL[0]=(u[0]>=2^{17})?(u[0]-2^{18}):u[0]$  (8-886)

$u[1]=(mvL[1]+mvd[1]+2^{18})\% 2^{18}$  (8-887)

$mvL[1]=(u[1]>=2^{17})?(u[1]-2^{18}):u[1]$  (8-888)

NOTE 1—The resulting values of mvL[0] and mvL[1] as specified above will always be in the range of $-2^{17}$ to $2^{17}-1$, inclusive.

*When smr Width * smrHeight is larger than K,* The updating process for the history-based motion vector predictor list as specified in clause 8.6.2.6 is invoked with luma motion vector mvL.
The top-left location inside the reference block (xRefTL, yRefTL) and the bottom-right location inside the reference block (xRefBR, yRefBR) are derived as follows:

(xRefTL,yRefTL)=(xCb+(mvL[0]>>4),yCb+(mvL[1]>>4))  (8-889)

(xRefBR,yRefBR)=(xRefTL+cbWidth−1,yRefTL+
   cbHeight−1)            (8-890)

It is a requirement of bitstream conformance that the luma motion vector mvL shall obey the following constraints:
. . .

8.6.2.2 Derivation Process for IBC Luma Motion Vector Prediction

This process is only invoked when CuPredMode[xCb][yCb] is equal to MODE_IBC, where (xCb, yCb) specify the top-left sample of the current luma coding block relative to the top-left luma sample of the current picture.

Inputs to this process are:
   a luma location (xCb, yCb) of the top-left sample of the current luma coding block relative to the top-left luma sample of the current picture,
   a variable cbWidth specifying the width of the current coding block in luma samples,
   a variable cbHeight specifying the height of the current coding block in luma samples.

Outputs of this process are:
   the luma motion vectors in 1/16 fractional-sample accuracy mvL.

The variables xSmr, ySmr, smrWidth, smrHeight, and smrNumHmvpIbcCand are derived as follows:

xSmr=[[IsInSmr[xCb][yCb]?SmrX[xCb][yCb]:]]xCb            (8-895)

ySmr=[[IsInSmr[xCb][yCb]?SmrY[xCb][yCb]:]]yCb            (8-896)

smrWidth=[[IsInSmr[xCb][yCb]?SmrW[xCb][yCb]:]]
   cbWidth            (8-897)

smrHeight=[[IsInSmr[xCb][yCb]?SmrH[xCb][yCb]:]]
   cbHeight            (8-898)

smrNumHmvpIbcCand=[[IsInSmr[xCb][yCb]
   ?NumHmvpSmrIbcCand:]]NumHmvpIbcCand            (8-899)

The luma motion vector mvL is derived by the following ordered steps:
1. **_When smrWidth * smrHeight is larger than K,_** The derivation process for spatial motion vector candidates from neighbouring coding units as specified in clause 8.6.2.3 is invoked with the luma coding block location (xCb, yCb) set equal to (xSmr, ySmr), the luma coding block width cbWidth, and the luma coding block height cbHeight set equal to smrWidth and smrHeight as inputs, and the outputs being the availability flags availableFlagA$_1$, availableFlagB$_1$ and the motion vectors mvA$_1$ and mvB$_1$.
2. **_When smrWidth * smrHeight is larger than K,_** The motion vector candidate list, mvCandList, is constructed as follows:

i=0 if(availableFlagA$_1$)

mvCandList[i++]=mvA$_1$ if(availableFlagB$_1$)

mvCandList[i++]=mvB$_1$            (8-900)

3. When smrWidth*smrHeight is larger than K, The variable numCurrCand is set equal to the number of merging candidates in the mvCandList.
4. When numCurrCand is less than MaxNumMergeCand and smrNumHmvpIbcCand is greater than 0, the derivation process of IBC history-based motion vector candidates as specified in 8.6.2.4 is invoked with mvCandList, isInSmr set equal to IsInSmr[xCb][yCb], and numCurrCand as inputs, and modified mvCandList and numCurrCand as outputs.
5. When numCurrCand is less than MaxNumMergeCand, the following applies until numCurrCand is equal to MaxNumMergeCand:
   1. mvCandList[numCurrCand][0] is set equal to 0.
   2. mvCandList[numCurrCand][1] is set equal to 0.
   3. numCurrCand is increased by 1.
6. The variable mvIdx is derived as follows:

mvIdx=general_merge_flag[xCb][yCb]?merge_idx
      [xCb][yCb]: mvp_l0_flag[xCb][yCb]            (8-901)

7. The following assignments are made:

mvL[0]=mergeCandList[mvIdx][0]            (8-902)

mvL[1]=mergeCandList[mvIdx][1]            (8-903)

8.6.2.4 Derivation Process for IBC History-Based Motion Vector Candidates

Inputs to this process are:
   a motion vector candidate list mvCandList,
   the number of available motion vector candidates in the list numCurrCand.

Outputs to this process are:
   the modified motion vector candidate list mvCandList,
   [[a variable isInSmr specifying whether the current coding unit is inside a shared merging candidate region,]]
   the modified number of motion vector candidates in the list numCurrCand.

The variables isPrunedA$_1$ and isPrunedB$_1$ are set both equal to FALSE.

The array smrHmvpIbcCandList and the variable smrNumHmvpIbcCand are derived as follows:

[[smr]]HmvpIbcCandList=[[isInSmr?HmvpSmrIbc-
   CandList:]]HmvpIbcCandList            (8-906)

smrNumHmvpIbcCand=[[isInSmr?NumHmvpSm-
   rIbcCand:]]NumHmvpIbcCand            (8-907)

For each candidate in [[smr]]HmvpIbcCandList[hMvpIdx] with index hMvpIdx=1 . . . smrNumHmvpIbcCand, the following ordered steps are repeated until numCurrCand is equal to MaxNumMergeCand:
   1. The variable sameMotion is derived as follows:
      If **_smrWidth * smrHeight is larger than K_** all of the following conditions are true for any motion vector candidate N with N being A$_1$ or B$_1$, sameMotion and isPrunedN are both set equal to TRUE:
         hMvpIdx is less than or equal to 1.
         The candidate [[smr]]HmvpIbcCandList[[[smr]]NumHmvpIbcCand−hMvpIdx] is equal to the motion vector candidate N.
         isPrunedN is equal to FALSE.
      Otherwise, sameMotion is set equal to FALSE.
   2. When sameMotion is equal to FALSE, the candidate [[smr]]HmvpIbcCandList[smrNumHmvpIbcCand hMvpIdx] is added to the motion vector candidate list as follows:

mvCandList[numCurrCand++]=[[smr]]HmvpIbcCan-
         dList[[[smr]]NumHmvpIbcCand−hMvpIdx]            (8-908)

5.3 Embodiment #3

Remove checking of spatial merge/AMVP candidates in the IBC motion list construction process when block size satisfies certain conditions, such as current block is under the shared node, and no update of HMVP tables.

8.6.2.2 Derivation Process for IBC Luma Motion Vector Prediction

This process is only invoked when CuPredMode[xCb ][yCb] is equal to MODE_IBC, where (xCb, yCb) specify the top-left sample of the current luma coding block relative to the top-left luma sample of the current picture.

Inputs to this process are:
- a luma location (xCb, yCb) of the top-left sample of the current luma coding block relative to the top-left luma sample of the current picture,
- a variable cbWidth specifying the width of the current coding block in luma samples,
- a variable cbHeight specifying the height of the current coding block in luma samples.

Outputs of this process are:
- the luma motion vectors in 1/16 fractional-sample accuracy mvL.

The variables xSmr, ySmr, smrWidth, smrHeight, and smrNumHmvpIbcCand are derived as follows:

$$xSmr=[[IsInSmr[xCb][yCb]?SmrX[xCb][yCb]:]]xCb \quad (8\text{-}895)$$

$$ySmr=[[IsInSmr[xCb][yCb]?SmrY[xCb][yCb]:]]yCb \quad (8\text{-}896)$$

$$smrWidth=[[IsInSmr[xCb][yCb]?SmrW[xCb][yCb]:]]cbWidth \quad (8\text{-}897)$$

$$smrHeight=[[IsInSmr[xCb][yCb]?SmrH[xCb][yCb]:]]cbHeight \quad (8\text{-}898)$$

$$smrNumHmvpIbcCand=[[IsInSmr[xCb][yCb]?NumHmvpSmrIbcCand:]]NumHmvpIbcCand \quad (8\text{-}899)$$

The luma motion vector mvL is derived by the following ordered steps:

1. When IsInSmr[ xCb ][ yCb ] is false, The derivation process for spatial motion vector candidates from neighboring coding units as specified in clause 8.6.2.3 is invoked with the luma coding block location (xCb, yCb) set equal to (xSmr, ySmr), the luma coding block width cbWidth, and the luma coding block height cbHeight set equal to smrWidth and smrHeight as inputs, and the outputs being the availability flags availableFlagA$_1$, availableFlagB$_1$ and the motion vectors mvA$_1$ and mvB$_1$.

2. When IsInSmr[ xCb ][ yCb ] is false, The motion vector candidate list, mvCandList, is constructed as follows:

i=0 if(availableFlagA$_1$)

mvCandList[i++]=mvA$_1$ if(availableFlagB$_1$)

mvCandList[i++]=mvB$_1$ \quad (8-900)

3. When IsInSmr[ xCb ][ yCb ] is false, The variable numCurrCand is set equal to the number of merging candidates in the mvCandList.

4. When numCurrCand is less than MaxNumMergeCand and smrNumHmvpIbcCand is greater than 0, the derivation process of IBC history-based motion vector candidates as specified in 8.6.2.4 is invoked with mvCandList, isInSmr set equal to IsInSmr[xCb][yCb], and numCurrCand as inputs, and modified mvCandList and numCurrCand as outputs.

5. When numCurrCand is less than MaxNumMergeCand, the following applies until numCurrCand is equal to MaxNumMergeCand:
   1. mvCandList[numCurrCand][0] is set equal to 0.
   2. mvCandList[numCurrCand][1] is set equal to 0.
   3. numCurrCand is increased by 1.

6. The variable mvIdx is derived as follows:

$$mvIdx=general\_merge\_flag[xCb][yCb]?merge\_idx[xCb][yCb]: mvp\_l0\_flag[xCb][yCb] \quad (8\text{-}901)$$

7. The following assignments are made:

$$mvL[0]=mergeCandList[mvIdx][0] \quad (8\text{-}902)$$

$$mvL[1]=mergeCandList[mvIdx][1] \quad (8\text{-}903)$$

8.6.2.4 Derivation Process for IBC History-Based Motion Vector Candidates

Inputs to this process are:
- a motion vector candidate list mvCandList,
- the number of available motion vector candidates in the list numCurrCand.

Outputs to this process are:
- the modified motion vector candidate list mvCandList,
- [[a variable isInSmr specifying whether the current coding unit is inside a shared merging candidate region,]]
- the modified number of motion vector candidates in the list numCurrCand.

The variables isPrunedA$_1$ and isPrunedB$_1$ are set both equal to FALSE.

The array smrHmvpIbcCandList and the variable smrNumHmvpIbcCand are derived as follows:

$$[[smr]]HmvpIbcCandList=[[isInSmr?HmvpSmrIbcCandList:]]HmvpIbcCandList \quad (8\text{-}906)$$

$$[[smr]]NumHmvpIbcCand=[[isInSmr?NumHmvpSmrIbcCand:]]NumHmvpIbcCand \quad (8\text{-}907)$$

For each candidate in [[smr]]HmvpIbcCandList[hMvpIdx] with index hMvpIdx=1 ... [[smr]]NumHmvpIbcCand, the following ordered steps are repeated until numCurrCand is equal to MaxNumMergeCand:

3. The variable sameMotion is derived as follows:

If isInSmr is false and all of the following conditions are true for any motion vector candidate N with N being A$_1$ or B$_1$, sameMotion and isPrunedN are both set equal to TRUE:

hMvpIdx is less than or equal to 1.

The candidate [[smr]]HmvpIbcCandList[[smr]]NumHmvpIbcCand−hMvpIdx] is equal to the motion vector candidate N.

isPrunedN is equal to FALSE.

Otherwise, sameMotion is set equal to FALSE.

4. When sameMotion is equal to FALSE, the candidate [[smr]]HmvpIbcCandList[[[smr]]NumHmvpIbcCand−hMvpIdx] is added to the motion vector candidate list as follows:

$$mvCandList[numCurrCand++]=[[smr]]HmvpIbcCandList[[[smr]]NumHmvpIbcCand-hMvpIdx] \quad (8\text{-}908)$$

8.6.2 Derivation Process for Motion Vector Components for IBC Blocks

8.6.2.1 General

Inputs to this process are:
- a luma location (xCb, yCb) of the top-left sample of the current luma coding block relative to the top-left luma sample of the current picture,
- a variable cbWidth specifying the width of the current coding block in luma samples, a variable cbHeight specifying the height of the current coding block in luma samples.

Outputs of this process are:
the luma motion vector in 1/16 fractional-sample accuracy mvL.

The luma motion vector mvL is derived as follows:
The derivation process for IBC luma motion vector prediction as specified in clause 8.6.2.2 is invoked with the luma location (xCb, yCb), the variables cbWidth and cbHeight inputs, and the output being the luma motion vector mvL.

When general_merge_flag[xCb][yCb] is equal to 0, the following applies:
7. The variable mvd is derived as follows:

$$mvd[0]=MvdL0[xCb][yCb][0] \qquad (8\text{-}883)$$

$$mvd[1]=MvdL0[xCb][yCb][1] \qquad (8\text{-}884)$$

8. The rounding process for motion vectors as specified in clause 8.5.2.14 is invoked with mvX set equal to mvL, rightShift set equal to MvShift+2, and leftShift set equal to MvShift+2 as inputs and the rounded mvL as output.
9. The luma motion vector mvL is modified as follows:

$$u[0]=(mvL[0]+mvd[0]+2^{18})\% \, 2^{18} \qquad (8\text{-}885)$$

$$mvL[0]=(u[0]>=2^{17})?(u[0]-2^{18}):u[0] \qquad (8\text{-}886)$$

$$u[1]=(mvL[1]+mvd[1]+2^{18})\% \, 2^{18} \qquad (8\text{-}887)$$

$$mvL[1]=(u[1]>=2^{17})?(u[1]-2^{18}):u[1] \qquad (8\text{-}888)$$

NOTE 1—The resulting values of mvL[0] and mvL[1] as specified above will always be in the range of $-2^{17}$ to $2^{17}-1$, inclusive.

When IsInSmr[ xCb ][ yCb ] is false, The updating process for the history-based motion vector predictor list as specified in clause 8.6.2.6 is invoked with luma motion vector mvL.

The top-left location inside the reference block (xRefTL, yRefTL) and the bottom-right location inside the reference block (xRefBR, yRefBR) are derived as follows:

$$(xRefTL,yRefTL)=(xCb+(mvL[0]>>4),yCb+(mvL[1]>>4)) \qquad (8\text{-}889)$$

$$(xRefBR,yRefBR)=(xRefTL+cbWidth-1,yRefTL+cbHeight-1) \qquad (8\text{-}890)$$

It is a requirement of bitstream conformance that the luma motion vector mvL shall obey the following constraints:
. . .

5.4 Embodiment #4

Remove checking of spatial merge/AMVP candidates in the IBC motion list construction process when block size satisfies certain conditions, such as Width*Height<=K or Width=N, Height=4 and left neighboring block is 4×4 and coded in IBC mode or Width=4, Height=N and above neighboring block is 4×4 and coded in IBC mode, and no update of HMVP tables. In the following description, the threshold K can be pre-defined, as such 16, N can be pre-defined, as such 8.

7.4.9.2 Coding Tree Unit Semantics
The CTU is the root node of the coding tree structure.
The array IsAvailable[cIdx][x][y] specifying whether the sample at (x, y) is available for use in the derivation process for neighbouring block availability as specified in clause 6.4.4 is initialized as follows for cIdx=0 . . . 2, x=0 . . . CtbSizeY-1, and y=0 . . . CtbSizeY-1:

$$IsAvailable[cIdx][x][y]=FALSE \qquad (7\text{-}123)$$

[[The array IsInSmr[x][y] specifying whether the sample at (x, y) is located inside a shared merging candidate list region, is initialized as follows for x=0 . . . CtbSizeY-1 and y=0 . . . CtbSizeY-1:

$$IsInSmr[x][y]=FALSE \qquad (7\text{-}124)]]$$

7.4.9.4 Coding Tree Semantics
[[When all of the following conditions are true, IsInSmr[x][y] is set equal to TRUE for x=x0 . . . x0+cbWidth-1 and y=y0 . . . y0+cbHeight-1:
IsInSmr[x0][y0] is equal to FALSE
cbWidth*cbHeight/4 is less than 32
treeType is not equal to DUAL_TREE_CHROMA
When IsInSmr[x0][y0] is equal to TRUE. the arrays SmrX[x][y], SmrY[x][y], SmrW[x][y] and SmrH[x][y] are derived as follows for x=x0 . . . x0+cbWidth-1 and y=y0 . . . y0+cbHeight-1:

$$SmrX[x][y]=x0 \qquad (7\text{-}126)$$

$$SmrY[x][y]=y0 \qquad (7\text{-}127)$$

$$SmrW[x][y]=cbWidth \qquad (7\text{-}128)$$

$$SmrH[x][y]=cbHeight \qquad (7\text{-}129)]]$$

8.6.2 Derivation Process for Block Vector Components for IBC Blocks
8.6.2.1 General
Inputs to this process are:
a luma location (xCb, yCb) of the top-left sample of the current luma coding block relative to the top-left luma sample of the current picture,
a variable cbWidth specifying the width of the current coding block in luma samples,
a variable cbHeight specifying the height of the current coding block in luma samples.

Outputs of this process are:
the luma block vector in 1/16 fractional-sample accuracy bvL.

The luma block vector mvL is derived as follows:
The derivation process for IBC luma block vector prediction as specified in clause 8.6.2.2 is invoked with the luma location (xCb, yCb), the variables cbWidth and cbHeight inputs, and the output being the luma block vector bvL.

When general_merge_flag[xCb][yCb] is equal to 0, the following applies:
1. The variable bvd is derived as follows:

$$bvd[0]=MvdL0[xCb][yCb][0] \qquad (8\text{-}900)$$

$$bvd[1]=MvdL0[xCb][yCb][1] \qquad (8\text{-}901)$$

2. The rounding process for motion vectors as specified in clause 8.5.2.14 is invoked with mvX set equal to bvL, rightShift set equal to AmvrShift, and leftShift set equal to AmvrShift as inputs and the rounded bvL as output.
3. The luma block vector bvL is modified as follows:

$$u[0]=(bvL[0]+bvd[0]+2^{18})\% \, 2^{18} \qquad (8\text{-}902)$$

$$bvL[0]=(u[0]>=2^{17})?(u[0]-2^{18}):u[0] \qquad (8\text{-}903)$$

$$u[1]=(bvL[1]+bvd[1]+2^{18})\% \ 2^{18} \quad (8\text{-}904)$$

$$bvL[1]=(u[1]>=2^{17})?(u[1]-2^{18}): u[1] \quad (8\text{-}905)$$

NOTE 1—The resulting values of bvL[0] and bvL[1] as specified above will always be in the range of $-2^{17}$ to $2^{17}-1$, inclusive.

*The varaible IsIgrBlk is set to (cb Width × cbHeight is greater than K ? true: false).*
*If IsLgrBlk is true, when CbWidth is equal to N and CbHeight is equal to 4 and the left neighboring block is 4x4 and coded in IBC mode, IsLgrBlk is set to false.*
*If IsLgrBlk is true, when CbWidth is equal to 4 and CbHeight is equal to N and the above neighboring block is 4x4 and coded in IBC mode, IsLgrBlk is set to false.*
(or alternatively:

*The varaible IsIgrBlk is set to (cbWidth × cbHeight is greater than K ? true: false).*
*If IsLgrBlk is true, when CbWidth is equal to N and CbHeight is equal to 4 and the left neighboring block is 4x4 and coded in IBC mode, IsLgrBlk is set to false.*
*If IsLgrBlk is true, when CbWidth is equal to 4 and CbHeight is equal to N and the above neighboring block is avaiable, and it is 4x4 and coded in IBC mode, IsL grBlk is set to false.*)

When *IsLgrBlk is true* [[IsInSmr[xCb][yCb] is equal to false]], the updating process for the history-based block vector predictor list as specified in clause 8.6.2.6 is invoked with luma block vector bvL.

It is a requirement of bitstream conformance that the luma block vector bvL shall obey the following constraints:

CtbSizeY is greater than or equal to ((yCb+(bvL[1]>>4)) & (CtbSizeY−1))+cbHeight.

IbcVirBuf[0][(x+(bvL[0]>>4)) & (IbcVirBufWidth−1)] [(y+(bvL[1]>>4)) & (CtbSizeY−1)] shall not be equal to 1 for x=xCb . . . xCb+cbWidth−1 and y=yCb . . . yCb+cbHeight−1.

8.6.2.2 Derivation Process for IBC Luma Block Vector Prediction

This process is only invoked when CuPredMode[0][xCb][yCb] is equal to MODE_IBC, where (xCb, yCb) specify the top-left sample of the current luma coding block relative to the top-left luma sample of the current picture.

Inputs to this process are:
 a luma location (xCb, yCb) of the top-left sample of the current luma coding block relative to the top-left luma sample of the current picture,
 a variable cbWidth specifying the width of the current coding block in luma samples,
 a variable cbHeight specifying the height of the current coding block in luma samples.

Outputs of this process are:
 the luma block vector in 1/16 fractional-sample accuracy bvL.

[[The variables xSmr, ySmr, smrWidth, and smrHeight are derived as follows:

$$xSmr=IsInSmr[xCb][yCb]?SmrX[xCb][yCb]: xCb \quad (8\text{-}906)$$

$$ySmr=IsInSmr[xCb][yCb]?SmrY[xCb][yCb]: yCb \quad (8\text{-}907)$$

$$smrWidth=IsInSmr[xCb][yCb]?SmrW[xCb][yCb]: cbWidth \quad (8\text{-}908)$$

$$smrHeight=IsInSmr[xCb][yCb]?SmrH[xCb][yCb]: cbHeight \quad (8\text{-}909)]]$$

*The varaible IsIgrBlk is set to (cb Width × cb Height is greater than K ? true: false).*
*If IsLgrBlk is true, when Cb Width is equal to N and CbHeight is equal to 4 and the left neighboring block is 4x4 and coded in IBC mode, IsLgrBlk is set to false.*
*If IsLgrBlk is true, when CbWidth is equal to 4 and CbHeight is equal to N and the above neighboring block is 4x4 and coded in IBC mode, IsLgrBlk is set to false.*
(or alternatively:

*The varaible IsIgrBlk is set to (cb Width × cb Height is greater than K ? true: false).*
*If IsLgrBlk is true, when Cb Width is equal to N and CbHeight is equal to 4 and the left neighboring block is 4x4 and coded in IBC mode, IsLgrBlk is set to false.*
*If IsLgrBlk is true, when Cb Width is equal to 4 and Cb Height is equal to N and the above neighboring block is avaiable, and it is 4x4 and coded in IBC mode, IsLgrBlk is set to false.*)

The luma block vector bvL is derived by the following ordered steps:

1. *When IsIgr Blk is true,* The derivation process for spatial block vector candidates from neighbouring coding units as specified in clause 8.6.2.3 is invoked with the luma coding block location (xCb, yCb) set equal to (*xCb, yCb* [[xSmr, ySmr]]), the luma coding block width cbWidth, and the luma coding block height cbHeight set equal to [[smr]] *Cb* Width and [[smr]] *Cb* Height as inputs, and the outputs being the availability flags availableFlagA$_1$, availableFlagB$_1$ and the block vectors bvA$_1$ and bvB$_1$.

2. *When IsIgrBlk is true,* The block vector candidate list, bvCandList, is constructed as follows:

$i=0$ if(availableFlagA$_1$)

bvCandList[$i$++]=$bvA_1$ if(availableFlagB$_1$)

bvCandList[$i$++]=$bvB_1$ (8-910)

3. *When IsIgrBlk is true,* The variable numCurrCand is set equal to the number of merging candidates in the bvCandList.

4. When numCurrCand is less than MaxNumIbcMergeCand and NumHmvpIbcCand is greater than 0, the derivation process of IBC history-based block vector candidates as specified in 8.6.2.4 is invoked with bvCandList, *and IsL grBlk,* and numCurrCand as inputs, and modified bvCandList and numCurrCand as outputs.

5. When numCurrCand is less than MaxNumIbcMergeCand, the following applies until numCurrCand is equal to MaxNumIbcMergeCand:
 1. bvCandList[numCurrCand][0] is set equal to 0.
 2. bvCandList[numCurrCand][1] is set equal to 0.
 3. numCurrCand is increased by 1.

6. The variable bvIdx is derived as follows:

bvIdx=general_merge_flag[xCb][yCb]?merge_idx[xCb][yCb]: mvp_l0_flag[xCb][yCb] (8-911)

7. The following assignments are made:

$$bvL[0]=bvCandList[mvIdx][0] \qquad (8\text{-}912)$$

$$bvL[1]=bvCandList[mvIdx][1] \qquad (8\text{-}913)$$

8.6.2.3 Derivation Process for IBC Spatial Block Vector Candidates
Inputs to this process are:
  a luma location (xCb, yCb) of the top-left sample of the current luma coding block relative to the top-left luma sample of the current picture,
  a variable cbWidth specifying the width of the current coding block in luma samples,
  a variable cbHeight specifying the height of the current coding block in luma samples.
Outputs of this process are as follows:
  the availability flags availableFlagA$_1$ and availableFlagB$_1$ of the neighbouring coding units,
  the block vectors in 1/16 fractional-sample accuracy bvA$_1$, and bvB$_1$ of the neighbouring coding units,
For the derivation of availableFlagA$_1$ and mvA$_1$ the following applies:
  The luma location (xNbA$_1$, yNbA$_1$) inside the neighbouring luma coding block is set equal to (xCb−1, yCb+cbHeight−1).
  The derivation process for neighbouring block availability as specified in clause 6.4.4 is invoked with the current luma location (xCurr, yCurr) set equal to (xCb, yCb), the neighbouring luma location (xNbA$_1$, yNbA$_1$), checkPredModeY set equal to TRUE, and cIdx set equal to 0 as inputs, and the output is assigned to the block availability flag availableA$_1$.
  The variables availableFlagA$_1$ and bvA$_1$ are derived as follows:
    If availableA$_1$ is equal to FALSE, availableFlagA$_1$ is set equal to 0 and both components of bvA$_1$ are set equal to 0.
    Otherwise, availableFlagA$_1$ is set equal to 1 and the following assignments are made:

$$bvA_1=MvL0[xNbA_1][yNbA_1] \qquad (8\text{-}914)$$

For the derivation of availableFlagB$_1$ and bvB$_1$ the following applies:
  The luma location (xNbB$_1$, yNbB$_1$) inside the neighbouring luma coding block is set equal to (xCb+cbWidth−1, yCb−1).
  The derivation process for neighbouring block availability as specified in clause 6.4.4 is invoked with the current luma location (xCurr, yCurr) set equal to (xCb, yCb), the neighbouring luma location (xNbB$_1$, yNbB$_1$), checkPredModeY set equal to TRUE, and cIdx set equal to 0 as inputs, and the output is assigned to the block availability flag availableB$_1$.
  The variables availableFlagB$_1$ and bvB$_1$ are derived as follows:
    If one or more of the following conditions are true, availableFlagB$_1$ is set equal to 0 and both components of bvB$_1$ are set equal to 0:
      availableB$_1$ is equal to FALSE.
      availableA$_1$ is equal to TRUE and the luma locations (xNbA$_1$, yNbA$_1$) and (xNbB$_1$, yNbB$_1$) have the same block vectors.
    Otherwise, availableFlagB$_1$ is set equal to 1 and the following assignments are made:

$$bvB_1=MvL0[xNbB_1][yNbB_1] \qquad (8\text{-}915)$$

8.6.2.4 Derivation Process for IBC History-Based Block Vector Candidates
Inputs to this process are:
  a block vector candidate list bvCandList,
  [[a variable isInSmr specifying whether the current coding unit is inside a shared merging candidate region,]] _a variable to indicate non-small block IslgrBlk,_
  the number of available block vector candidates in the list numCurrCand.
Outputs to this process are:
  the modified block vector candidate list bvCandList,
  the modified number of motion vector candidates in the list numCurrCand.
The variables isPrunedA$_1$ and isPrunedB$_1$ are set both equal to FALSE.
For each candidate in [[smr]]HmvpIbcCandList[hMvpIdx] with index hMvpIdx=1. [[smr]]NumHmvpIbcCand, the following ordered steps are repeated until numCurrCand is equal to MaxNumIbcMergeCand:
  1. The variable sameMotion is derived as follows:
    If _IsLgrBlk is ture and_ all of the following conditions are true for any block vector candidate N with N being A$_1$ or B$_1$, sameMotion and isPrunedN are both set equal to TRUE:
      hMvpIdx is less than or equal to 1.
      The candidate HmvpIbcCandList[NumHmvpIbcCand hMvpIdx] is equal to the block vector candidate N.
      isPrunedN is equal to FALSE.
    Otherwise, sameMotion is set equal to FALSE.
  2. When sameMotion is equal to FALSE, the candidate HmvpIbcCandList[NumHmvpIbcCand−hMvpIdx] is added to the block vector candidate list as follows:

$$bvCandList[numCurrCand++]=HmvpIbcCandList\\ [NumHmvpIbcCand-hMvpIdx] \qquad (8\text{-}916)$$

5.5 Embodiment #5

Remove checking of spatial merge/AMVP candidates in the IBC motion list construction process and remove updating of HMVP tables when block size satisfies certain conditions, such as Width=N, Height=4 and left neighboring block is 4×4 and coded in IBC mode or Width=4, Height=N and above neighboring block is 4×4 and coded in IBC mode. In the following description, N can be pre-defined, as such 4 or 8.
7.4.9.2 Coding Tree Unit Semantics
The CTU is the root node of the coding tree structure.
The array IsAvailable[cIdx][x][y] specifying whether the sample at (x, y) is available for use in the derivation process for neighbouring block availability as specified in clause 6.4.4 is initialized as follows for cIdx=0 . . . 2, x=0 . . . CtbSizeY−1, and y=0 . . . CtbSizeY−1:

$$IsAvailable[cIdx][x][y]=FALSE \qquad (7\text{-}123)$$

[[The array IsInSmr[x][y] specifying whether the sample at (x, y) is located inside a shared merging candidate list region, is initialized as follows for x=0 . . . CtbSizeY−1 and y=0 . . . CtbSizeY−1:

$$IsInSmr[x][y]=FALSE \qquad (7\text{-}124)]]$$

7.4.9.4 Coding Tree Semantics
[[When all of the following conditions are true, IsInSmr[x][y] is set equal to TRUE for x=x0 . . . x0+cbWidth−1 and y=y0 . . . y0+cbHeight−1:

IsInSmr[x0][y0] is equal to FALSE
cbWidth*cbHeight/4 is less than 32
treeType is not equal to DUAL_TREE_CHROMA
When IsInSmr[x0][y0] is equal to TRUE. the arrays SmrX[x][y], SmrY[x][y], SmrW[x][y] and SmrH[x][y are derived as follows for x=x0 . . . x0+cbWidth−1 and y=y0 . . . y0+cbHeight−1:

$$SmrX[x][y]=x0 \quad (7\text{-}126)$$

$$SmrY[x][y]=y0 \quad (7\text{-}127)$$

$$SmrW[x][y]=cbWidth \quad (7\text{-}128)$$

$$SmrH[x][y]=cbHeight \quad (7\text{-}129)]]$$

8.6.2 Derivation Process for Block Vector Components for IBC Blocks
8.6.2.1 General
Inputs to this process are:
  a luma location (xCb, yCb) of the top-left sample of the current luma coding block relative to the top-left luma sample of the current picture,
  a variable cbWidth specifying the width of the current coding block in luma samples,
  a variable cbHeight specifying the height of the current coding block in luma samples.
Outputs of this process are:
  the luma block vector in 1/16 fractional-sample accuracy bvL.
The luma block vector mvL is derived as follows:
  The derivation process for IBC luma block vector prediction as specified in clause 8.6.2.2 is invoked with the luma location (xCb, yCb), the variables cbWidth and cbHeight inputs, and the output being the luma block vector bvL.
  When general_merge_flag[xCb][yCb] is equal to 0, the following applies:
  1. The variable bvd is derived as follows:

$$bvd[0]=MvdL0[xCb][yCb][0] \quad (8\text{-}900)$$

$$bvd[1]=MvdL0[xCb][yCb][1] \quad (8\text{-}901)$$

2. The rounding process for motion vectors as specified in clause 8.5.2.14 is invoked with mvX set equal to bvL, rightShift set equal to AmvrShift, and leftShift set equal to AmvrShift as inputs and the rounded bvL as output.
  3. The luma block vector bvL is modified as follows:

$$u[0]=(bvL[0]+bvd[0]+2^{18})\%\,2^{18} \quad (8\text{-}902)$$

$$bvL[0]=(u[0]>=2^{17})?(u[0]-2^{18}): u[0] \quad (8\text{-}903)$$

$$u[1]=(bvL[1]+bvd[1]+2^{18})\%\,2^{18} \quad (8\text{-}904)$$

$$bvL[1]=(u[1]>=2^{17})?(u[1]-2^{18}): u[1] \quad (8\text{-}905)$$

NOTE 1—The resulting values of bvL[0] and bvL[1] as specified above will always be in the range of $-2^{17}$ to $2^{17}-1$, inclusive.
*The varaible IslgrBlk is set to true, when one of following conditions is true.*
  *When CbWidth is equal to N and CbHeight is equal to 4 and the left neighboring block is 4x4 and coded in IBC mode.*
  *When CbWidth is equal to 4 and Cb Height is equal to N and the above neighboring block is 4x4 and coded in IBC mode.*
*Otherwise, IsLgrBlk is set to false.*

(or alternatively:
*The varaible IslgrBlk is set to ( Cb Width * Cb Height > 16 ? true: false), and the following are further checked:*
*If IsLgrBlk is true, when Cb Width is equal to N and Cb Height is equal to 4 and the left neighboring block is 4x4 and coded in IBC mode, IsLgrBlk is set to false.*
*If IsLgrBlk is true, when Cb Width is equal to 4 and CbHeight is equal to N and the above neighboring block is 4x4 and coded in IBC mode, IsLgrBlk is set to false.*)
When *IsLgrBlk is true* [[IsInSmr[xCb][yCb] is equal to false]], the updating process for the history-based block vector predictor list as specified in clause 8.6.2.6 is invoked with luma block vector bvL.
It is a requirement of bitstream conformance that the luma block vector bvL shall obey the following constraints:
  CtbSizeY is greater than or equal to ((yCb+(bvL[1]>>4)) & (CtbSizeY−1))+cbHeight.
  IbcVirBuf[ ][(x+(bvL[0]>>4)) & (IbcVirBufWidth−1)] [(y+(bvL[1]>>4)) & (CtbSizeY−1)] shall not be equal to −1 for x=xCb . . . xCb+cbWidth−1 and y=yCb . . . yCb+cbHeight−1.
8.6.2.2 Derivation Process for IBC Luma Block Vector Prediction
This process is only invoked when CuPredMode[0][xCb][yCb] is equal to MODE_IBC, where (xCb, yCb) specify the top-left sample of the current luma coding block relative to the top-left luma sample of the current picture. Inputs to this process are:
  a luma location (xCb, yCb) of the top-left sample of the current luma coding block relative to the top-left luma sample of the current picture,
  a variable cbWidth specifying the width of the current coding block in luma samples,
  a variable cbHeight specifying the height of the current coding block in luma samples.
Outputs of this process are:
  the luma block vector in 1/16 fractional-sample accuracy bvL.
[[The variables xSmr, ySmr, smrWidth, and smrHeight are derived as follows:

$$xSmr=IsInSmr[xCb][yCb]?SmrX[xCb][yCb]: xCb \quad (8\text{-}906)$$

$$ySmr=IsInSmr[xCb][yCb]?SmrY[xCb][yCb]: yCb \quad (8\text{-}907)$$

$$smrWidth=IsInSmr[xCb][yCb]?SmrW[xCb][yCb]: cbWidth \quad (8\text{-}908)$$

$$smrHeight=IsInSmr[xCb][yCb]?SmrH[xCb][yCb]: cbHeight \quad (8\text{-}909)]]$$

*The varaible IslgrBlk is set to true, when one of following conditions is true.*
  *When Cb Width is equal to N and Cb Height is equal to 4 and the left neighboring block is 4x4 and coded in IBC mode.*
  *When Cb Width is equal to 4 and CbHeight is equal to N and the above neighboring block is 4x4 and coded in IBC mode.*
*Otherwise, IsLgrBlk is set to false.*

(or alternatively:

*The varaible IslgrBlk is set to ( Cb Width * Cb Height > 16 ? true: false), and the following are further checked:*
*If IsLgrBlk is true, when Cb Width is equal to N and CbHeight is equal to 4 and the left neighboring block is 4x4 and coded in IBC mode, IsLgrBlk is set to false.*
*If IsLgrBlk is true, when Cb Width is equal to 4 and Cb Height is equal to N and the above neighboring block is 4x4 and coded in IBC mode, IsLgrBlk is set to false.)*

The luma block vector bvL is derived by the following ordered steps:

1. _When IslgrBlk is true,_ The derivation process for spatial block vector candidates from neighbouring coding units as specified in clause 8.6.2.3 is invoked with the luma coding block location (xCb, yCb) set equal to (xCb, yCb[[xSmr, ySmr]]), the luma coding block width cbWidth, and the luma coding block height cbHeight set equal to [[smr]]CbWidth and [[smr]] CbHeight as inputs, and the outputs being the availability flags availableFlagA$_1$, availableFlagB$_1$ and the block vectors bvA$_1$ and bvB$_1$.
2. _When IslgrBlk is true,_ The block vector candidate list, bvCandList, is constructed as follows:

i=0 if(availableFlagA$_1$)

bvCandList[i++]=bvA$_1$ if(availableFlagB$_1$)

bvCandList[i++]=bvB$_1$       (8-910)

3. _When IslgrBlk is true,_ The variable numCurrCand is set equal to the number of merging candidates in the bvCandList.
4. When numCurrCand is less than MaxNumIbcMergeCand and NumHmvpIbcCand is greater than 0, the derivation process of IBC history-based block vector candidates as specified in 8.6.2.4 is invoked with bvCandList, and _and IsL grBlk,_ and numCurrCand as inputs, and modified bvCandList and numCurrCand as outputs.
5. When numCurrCand is less than MaxNumIbcMergeCand, the following applies until numCurrCand is equal to MaxNumIbcMergeCand:
    1. bvCandList[numCurrCand][0] is set equal to 0.
    2. bvCandList[numCurrCand][1] is set equal to 0.
    3. numCurrCand is increased by 1.
6. The variable bvIdx is derived as follows:

bvIdx=general_merge_flag[xCb][yCb]?merge_idx [xCb][yCb]: mvp_l0_flag[xCb][yCb]       (8-911)

7. The following assignments are made:

bvL[0]=bvCandList[mvIdx][0]       (8-912)

bvL[1]=bvCandList[mvIdx][1]       (8-913)

8.6.2.3 Derivation Process for IBC Spatial Block Vector Candidates
Inputs to this process are:
  a luma location (xCb, yCb) of the top-left sample of the current luma coding block relative to the top-left luma sample of the current picture,
  a variable cbWidth specifying the width of the current coding block in luma samples,
  a variable cbHeight specifying the height of the current coding block in luma samples.

Outputs of this process are as follows:
  the availability flags availableFlagA$_1$ and availableFlagB$_1$ of the neighbouring coding units,
  the block vectors in 1/16 fractional-sample accuracy bvA$_1$, and bvB$_1$ of the neighbouring coding units, For the derivation of availableFlagA$_1$ and mvA$_1$ the following applies:
  The luma location (xNbA$_1$, yNbA$_1$) inside the neighbouring luma coding block is set equal to (xCb−1, yCb+ cbHeight−1).
  The derivation process for neighbouring block availability as specified in clause 6.4.4 is invoked with the current luma location (xCurr, yCurr) set equal to (xCb, yCb), the neighbouring luma location (xNbA$_1$, yNbA$_1$), checkPredModeY set equal to TRUE, and cIdx set equal to 0 as inputs, and the output is assigned to the block availability flag availableA$_1$.
  The variables availableFlagA$_1$ and bvA$_1$ are derived as follows:
    If availableA$_1$ is equal to FALSE, availableFlagA$_1$ is set equal to 0 and both components of bvA$_1$ are set equal to 0.
    Otherwise, availableFlagA$_1$ is set equal to 1 and the following assignments are made:

$bvA_1 = MvL0[xNbA_1][yNbA_1]$       (8-914)

For the derivation of availableFlagB$_1$ and bvB$_1$ the following applies:
  The luma location (xNbB$_1$, yNbB$_1$) inside the neighbouring luma coding block is set equal to (xCb+cbWidth−1, yCb−1).
  The derivation process for neighbouring block availability as specified in clause 6.4.4 is invoked with the current luma location (xCurr, yCurr) set equal to (xCb, yCb), the neighbouring luma location (xNbB$_1$, yNbB$_1$), checkPredModeY set equal to TRUE, and cIdx set equal to 0 as inputs, and the output is assigned to the block availability flag availableB$_1$.
  The variables availableFlagB$_1$ and bvB$_1$ are derived as follows:
    If one or more of the following conditions are true, availableFlagB$_1$ is set equal to 0 and both components of bvB$_1$ are set equal to 0:
      availableB$_1$ is equal to FALSE.
      availableA$_1$ is equal to TRUE and the luma locations (xNbA$_1$, yNbA$_1$) and (xNbB$_1$, yNbB$_1$) have the same block vectors.
    Otherwise, availableFlagB$_1$ is set equal to 1 and the following assignments are made:

$bvB_1 = MvL0[xNbB_1][yNbB_1]$       (8-915)

8.6.2.4 Derivation Process for IBC History-Based Block Vector Candidates
Inputs to this process are:
  a block vector candidate list bvCandList,
  [[a variable isInSmr specifying whether the current coding unit is inside a shared merging candidate region,]]
  *a variable to indicate non-small block IslgrBlk,*
  the number of available block vector candidates in the list numCurrCand.

Outputs to this process are:
    the modified block vector candidate list bvCandList,
    the modified number of motion vector candidates in the list numCurrCand.

The variables isPrunedA₁ and isPrunedB₁ are set both equal to FALSE.
For each candidate in [[smr]]HmvpIbcCandList[hMvpIdx] with index hMvpIdx=1..[[smr]]NumHmvpIbcCand, the following ordered steps are repeated until numCurrCand is equal to MaxNumIbcMergeCand:
  1. The variable sameMotion is derived as follows:
     If *IsLgrBlk is ture and* all of the following conditions are true for any block vector candidate N with N being A₁ or B₁, sameMotion and isPrunedN are both set equal to TRUE:
       hMvpIdx is less than or equal to 1.
       The candidate HmvpIbcCandList[NumHmvpIbc-Cand−hMvpIdx] is equal to the block vector candidate N.
       isPrunedN is equal to FALSE.
     Otherwise, sameMotion is set equal to FALSE.
  2. When sameMotion is equal to FALSE, the candidate HmvpIbcCandList[NumHmvpIbcCand hMvpIdx] is added to the block vector candidate list as follows:

bvCandList[numCurrCand++]=HmvpIbcCandList
    [NumHmvpIbcCand−hMvpIdx]         (8-916)

5.6 Embodiment #6

Remove checking of spatial merge/AMVP candidates in the IBC motion list construction process and remove updating of HMVP tables when block size satisfies certain conditions, such as Width*Height<=K and left or above neighboring block is 4x4 and coded in IBC mode. In the following description, the threshold K can be pre-defined, as such 16 or 32.

7.4.9.2 Coding Tree Unit Semantics

The CTU is the root node of the coding tree structure.
The array IsAvailable[cIdx][x][y] specifying whether the sample at (x, y) is available for use in the derivation process for neighbouring block availability as specified in clause 6.4.4 is initialized as follows for cIdx=0 . . . 2, x=0 . . . CtbSizeY−1, and y=0 . . . CtbSizeY−1:

IsAvailable[cIdx][$x$][$y$]=FALSE         (7-123)

[[The array IsInSmr[x][y] specifying whether the sample at (x, y) is located inside a shared merging candidate list region, is initialized as follows for x=0 . . . CtbSizeY−1 and y=0 . . . CtbSizeY−1:

IsInSmr[$x$][$y$]=FALSE         (7-124)]]

7.4.9.4 Coding Tree Semantics

[[When all of the following conditions are true, IsInSmr[x][y] is set equal to TRUE for x=x0 . . . x0+cbWidth−1 and y=y0 . . . y0+cbHeight−1:
    IsInSmr[x0][y0] is equal to FALSE
    cbWidth*cbHeight/4 is less than 32
    treeType is not equal to DUAL_TREE_CHROMA
When IsInSmr[x0][y0] is equal to TRUE, the arrays SmrX[x][y], SmrY[x][y], SmrW[x][y] and SmrH[x][y] are derived as follows for x=x0 . . . x0+cbWidth−1 and y=y0 . . . y0+cbHeight−1:

SmrX[$x$][$y$]=x0         (7-126)

SmrY[$x$][$y$]=y0         (7-127)

SmrW[$x$][$y$]=cbWidth         (7-128)

SmrH[$x$][$y$]=cbHeight         (7-129)]]

8.6.2 Derivation Process for Block Vector Components for IBC Blocks

8.6.2.1 General

Inputs to this process are:
    a luma location (xCb, yCb) of the top-left sample of the current luma coding block relative to the top-left luma sample of the current picture,
    a variable cbWidth specifying the width of the current coding block in luma samples,
    a variable cbHeight specifying the height of the current coding block in luma samples.
Outputs of this process are:
    the luma block vector in 1/16 fractional-sample accuracy bvL.
The luma block vector mvL is derived as follows:
    The derivation process for IBC luma block vector prediction as specified in clause 8.6.2.2 is invoked with the luma location (xCb, yCb), the variables cbWidth and cbHeight inputs, and the output being the luma block vector bvL.
When general_merge_flag[xCb][yCb] is equal to 0, the following applies:
  1. The variable bvd is derived as follows:

$bvd[0]$=MvdL0[$xCb$][$yCb$][0]         (8-900)

$bvd[1]$=MvdL0[$xCb$][$yCb$][1]         (8-901)

2. The rounding process for motion vectors as specified in clause 8.5.2.14 is invoked with mvX set equal to bvL, rightShift set equal to AmvrShift, and leftShift set equal to AmvrShift as inputs and the rounded bvL as output. 3. The luma block vector bvL is modified as follows:

$u[0]=(bvL[0]+bvd[0]+2^{18})\% \ 2^{18}$         (8-902)

$bvL[0]=(u[0]>=2^{17})?(u[0]-2^{18}):u[0]$         (8-903)

$u[1]=(bvL[1]+bvd[1]+2^{18})\% \ 2^{18}$         (8-904)

$bvL[1]=(u[1]>=2^{17})?(u[1]-2^{18}):u[1]$         (8-905)

NOTE 1—The resulting values of bvL[0] and bvL[1] as specified above will always be in the range of $-2^{17}$ to $2^{17}-1$, inclusive.

*The varaible IsIgrBlk is set to (cb Width × cb Height is greater than K ? true: false).*
*If IsLgrBlk is true, when the left neighboring block is 4x4 and coded in IBC mode, IsLgrBlk is set to false.*
*If IsLgrBlk is true, when the above neighboring block is 4x4 and coded in IBC mode, IsLgrBlk is set to false.*
(or alternatively,
*The varaible IsIgrBlk is set to (cbWidth × cbHeight is greater than K ? true: false).*
*If IsLgrBlk is true, when the left neighboring block is 4x4 and coded in IBC mode, IsLgrBlk is set to false.*
*If IsLgrBlk is true, when the above neighboring block is in the same CTU as current block, and it is 4x4 and coded in IBC mode, IsLgrBlk is set to false.*)
When *IsLgrBlk is true* [[IsInSmr[xCb][yCb] is equal to false]], the updating process for the history-based block vector predictor list as specified in clause 8.6.2.6 is invoked with luma block vector bvL.

It is a requirement of bitstream conformance that the luma block vector bvL shall obey the following constraints:

CtbSizeY is greater than or equal to ((yCb+(bvL[1]>>4)) & (CtbSizeY−1))+cbHeight.

IbcVirBuf[ ][(x+(bvL[0]>>4)) & (IbcVirBufWidth−1)] [(y+(bvL[1]>>4)) & (CtbSizeY−1)] shall not be equal to 1 for x=xCb . . . xCb+cbWidth−1 and y=yCb . . . yCb+cbHeight−1.

8.6.2.2 Derivation Process for IBC Luma Block Vector Prediction

This process is only invoked when CuPredMode[0][xCb][yCb] is equal to MODE_IBC, where (xCb, yCb) specify the top-left sample of the current luma coding block relative to the top-left luma sample of the current picture.

Inputs to this process are:
a luma location (xCb, yCb) of the top-left sample of the current luma coding block relative to the top-left luma sample of the current picture,
a variable cbWidth specifying the width of the current coding block in luma samples,
a variable cbHeight specifying the height of the current coding block in luma samples.

Outputs of this process are:
the luma block vector in 1/16 fractional-sample accuracy bvL.

[[The variables xSmr, ySmr, smrWidth, and smrHeight are derived as follows:

xSmr=IsInSmr[xCb][yCb]?SmrX[xCb][yCb]: xCb   (8-906)

ySmr=IsInSmr[xCb][yCb]?SmrY[xCb][yCb]: yCb   (8-907)

smrWidth=IsInSmr[xCb][yCb]?SmrW[xCb][yCb]: cbWidth   (8-908)

smrHeight=IsInSmr[xCb][yCb]?SmrH[xCb][yCb]: cbHeight   (8-909)]]

*The varaible IsIgrBlk is set to (cb Width× cb Height is greater than K ? true: false).*

*If IsLgrBlk is true, when the left neighboring block is 4x4 and coded in IBC mode, IsLgrBlk is set to false.*

*If IsLgrBlk is true, when the above neighboring block is 4x4 and coded in IBC mode, IsLgrBlk is set to false.*

(or alternatively,

*The varaible IsIgrBlk is set to (cb Width× cbHeight is greater than K ? true: false).*

*If IsLgrBlk is true, when the left neighboring block is 4x4 and coded in IBC mode, IsLgrBlk is set to false.*

*If IsLgrBlk is true, when the above neighboring block is in the same CTU as current block, and it is 4x4 and coded in IBC mode, IsLgrBlk is set to false.*)

The luma block vector bvL is derived by the following ordered steps:

1. *When IsIgrBlk is true,* The derivation process for spatial block vector candidates from neighbouring coding units as specified in clause 8.6.2.3 is invoked with the luma coding block location (xCb, yCb) set equal to (*xCb, yCb* [[xSmr, ySmr]]), the luma coding block width cbWidth, and the luma coding block height cbHeight set equal to [[smr]] *Cb* Width and [[smr]] *Cb* Height as inputs, and the outputs being the availability flags availableFlag$A_1$, availableFlag$B_1$ and the block vectors bv$A_1$ and bv$B_1$.

2. *When IsIgrBlk is true,* The block vector candidate list, bvCandList, is constructed as follows:

$i=0$ if(availableFlag$A_1$)

bvCandList[$i$++]=$bvA_1$ if(availableFlag$B_1$)

bvCandList[$i$++]=$bvB_1$   (8-910)

3. *When IsIgrBlk is true,* The variable numCurrCand is set equal to the number of merging candidates in the bvCandList.

4. When numCurrCand is less than MaxNumIbcMergeCand and NumHmvpIbcCand is greater than 0, the derivation process of IBC history-based block vector candidates as specified in 8.6.2.4 is invoked with bvCandList, *and IsL grBlk,* and numCurrCand as inputs, and modified bvCandList and numCurrCand as outputs.

5. When numCurrCand is less than MaxNumIbcMergeCand, the following applies until numCurrCand is equal to MaxNumIbcMergeCand:
   1. bvCandList[numCurrCand][0] is set equal to 0.
   2. bvCandList[numCurrCand][1] is set equal to 0.
   3. numCurrCand is increased by 1.

6. The variable bvIdx is derived as follows:

bvIdx=general_merge_flag[xCb][yCb]?merge_idx [xCb][yCb]: mvp_l0_flag[xCb][yCb]   (8-911)

7. The following assignments are made:

bvL[0]=bvCandList[mvIdx][0]   (8-912)

bvL[1]=bvCandList[mvIdx][1]   (8-913)

8.6.2.3 Derivation Process for IBC Spatial Block Vector Candidates

Inputs to this process are:
a luma location (xCb, yCb) of the top-left sample of the current luma coding block relative to the top-left luma sample of the current picture,
a variable cbWidth specifying the width of the current coding block in luma samples,
a variable cbHeight specifying the height of the current coding block in luma samples.

Outputs of this process are as follows:
the availability flags availableFlag$A_1$ and availableFlag$B_1$ of the neighbouring coding units,
the block vectors in 1/16 fractional-sample accuracy bv$A_1$, and bv$B_1$ of the neighbouring coding units, For the derivation of availableFlag$A_1$ and mv$A_1$ the following applies:
The luma location (xNb$A_1$, yNb$A_1$) inside the neighbouring luma coding block is set equal to (xCb−1, yCb+cbHeight−1).
The derivation process for neighbouring block availability as specified in clause 6.4.4 is invoked with the current luma location (xCurr, yCurr) set equal to (xCb, yCb), the neighbouring luma location (xNb$A_1$, yNb$A_1$), checkPredModeY set equal to TRUE, and cIdx set equal to 0 as inputs, and the output is assigned to the block availability flag available$A_1$.

The variables availableFlagA$_1$ and bvA$_1$ are derived as follows:
  If availableA$_1$ is equal to FALSE, availableFlagA$_1$ is set equal to 0 and both components of bvA$_1$ are set equal to 0.
  Otherwise, availableFlagA$_1$ is set equal to 1 and the following assignments are made:

$$bvA_1=MvL0[xNbA_1][yNbA_1] \quad (8\text{-}914)$$

For the derivation of availableFlagB$_1$ and bvB$_1$ the following applies:
  The luma location (xNbB$_1$, yNbB$_1$) inside the neighbouring luma coding block is set equal to (xCb+cbWidth−1, yCb−1).
  The derivation process for neighbouring block availability as specified in clause 6.4.4 is invoked with the current luma location (xCurr, yCurr) set equal to (xCb, yCb), the neighbouring luma location (xNbB$_1$, yNbB$_1$), checkPredModeY set equal to TRUE, and cIdx set equal to 0 as inputs, and the output is assigned to the block availability flag availableB$_1$.
  The variables availableFlagB$_1$ and bvB$_1$ are derived as follows:
    If one or more of the following conditions are true, availableFlagB$_1$ is set equal to 0 and both components of bvB$_1$ are set equal to 0:
      availableB$_1$ is equal to FALSE.
      availableA$_1$ is equal to TRUE and the luma locations (xNbA$_1$, yNbA$_1$) and (xNbB$_1$, yNbB$_1$) have the same block vectors.
    Otherwise, availableFlagB$_1$ is set equal to 1 and the following assignments are made:

$$bvB_1=MvL0[xNbB_1][yNbB_1] \quad (8\text{-}915)$$

8.6.2.4 Derivation Process for IBC History-Based Block Vector Candidates
Inputs to this process are:
  a block vector candidate list bvCandList,
  [[a variable isInSmr specifying whether the current coding unit is inside a shared merging candidate region,]] *a variable to indicate non-small block IslgrBlk,*
  the number of available block vector candidates in the list numCurrCand.
Outputs to this process are:
  the modified block vector candidate list bvCandList,
  the modified number of motion vector candidates in the list numCurrCand.
The variables isPrunedA$_1$ and isPrunedB$_1$ are set both equal to FALSE.
For each candidate in [[smr]]HmvpIbcCandList[hMvpIdx] with index hMvpIdx=1. [[smr]]NumHmvpIbcCand, the following ordered steps are repeated until numCurrCand is equal to MaxNumIbcMergeCand:
  1. The variable sameMotion is derived as follows:
    If *IsLgr Blk is ture and* all of the following conditions are true for any block vector candidate N with N being A$_1$ or B$_1$, sameMotion and isPrunedN are both set equal to TRUE:
      hMvpIdx is less than or equal to 1.
      The candidate HmvpIbcCandList[NumHmvpIbcCand hMvpIdx] is equal to the block vector candidate N.
      isPrunedN is equal to FALSE.
    Otherwise, sameMotion is set equal to FALSE.
  2. When sameMotion is equal to FALSE, the candidate HmvpIbcCandList[NumHmvpIbcCand hMvpIdx] is added to the block vector candidate list as follows:

$$bvCandList[numCurrCand++]=HmvpIbcCandList[NumHmvpIbcCand-hMvpIdx] \quad (8\text{-}916)$$

Figure 22:
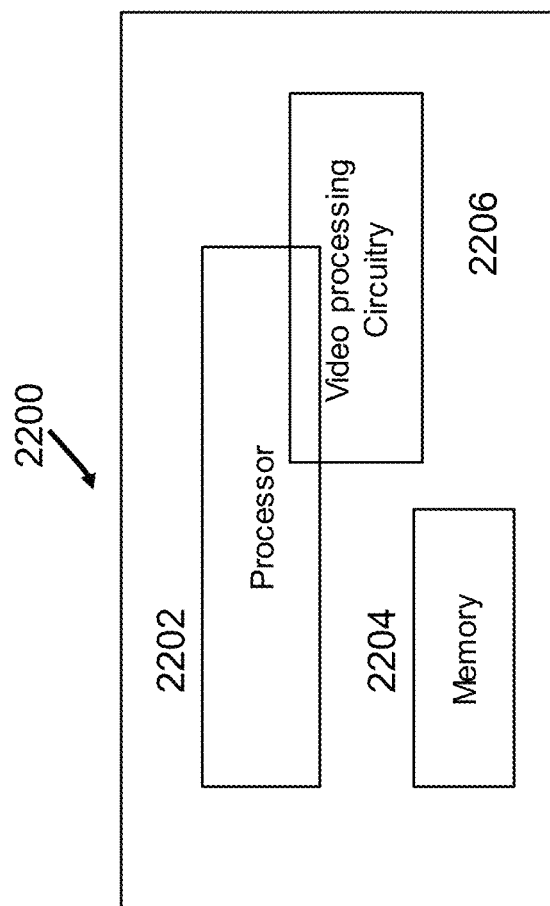
FIG. 22 is a block diagram of an example of a video processing apparatus.

FIG. 22 is a block diagram of a video processing apparatus 2200. The apparatus 2200 may be used to implement one or more of the methods described herein. The apparatus 2200 may be embodied in a smartphone, tablet, computer, Internet of Things (IoT) receiver, and so on. The apparatus 2200 may include one or more processors 2202, one or more memories 2204 and video processing hardware 2206. The processor(s) 2202 may be configured to implement one or more methods described in the present document. The memory (memories) 2204 may be used for storing data and code used for implementing the methods and techniques described herein. The video processing hardware 2206 may be used to implement, in hardware circuitry, some techniques described in the present document. The video processing hardware 2206 may be partially or completely includes within the processor(s) 2202 in the form of dedicated hardware, or graphical processor unit (GPU) or specialized signal processing blocks.

Figure 23:
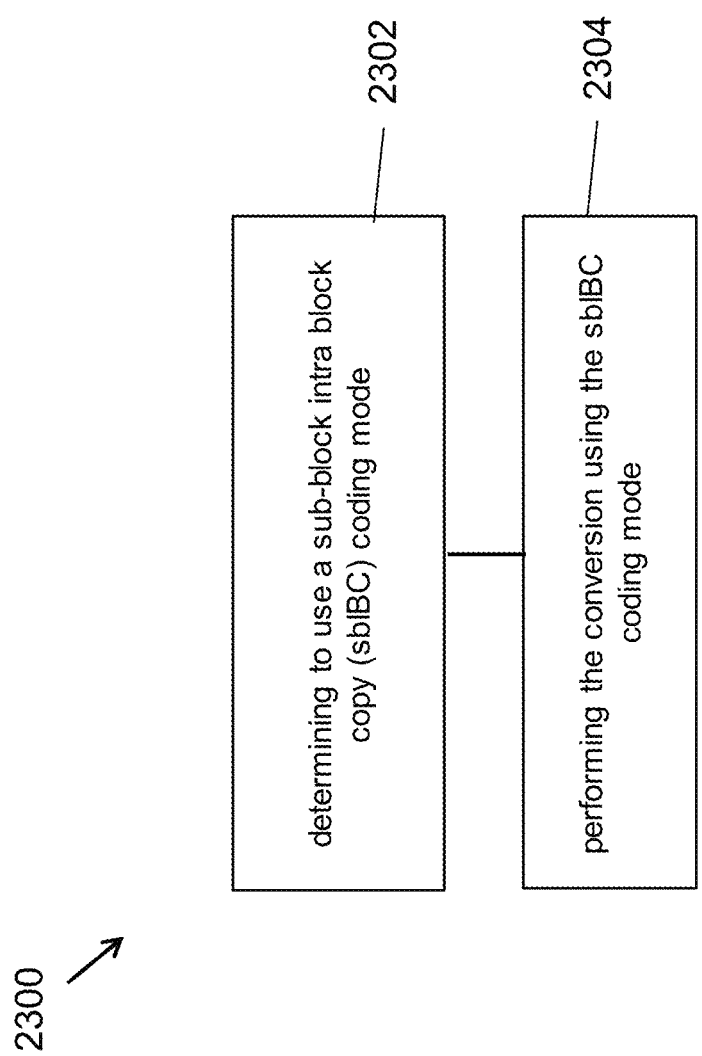
FIG. 23 is a flowchart for an example of a video processing method.

FIG. 23 is a flowchart for an example of a video processing method 2300. The method 2300 includes, at operation 2302, determining to use a sub-block intra block copy (sbIBC) coding mode. The method 2300 also includes, at operation 2304, performing the conversion using the sbIBC coding mode.

Some embodiments may be described using the following clause-based description.

The following clauses show example embodiments of techniques discussed in item 1 in the previous section.

1. A method of video processing, comprising: determining to use a sub-block intra block copy (sbIBC) coding mode in a conversion between a current video block in a video region and a bitstream representation of the current video block in which the current video block is split into multiple sub-blocks and each sub-block is coded based on reference samples from the video region, wherein sizes of the sub-blocks are based on a splitting rule; and performing the conversion using the sbIBC coding mode for the multiple sub-blocks.

2. The method of clause 1, wherein the current video block is an M×N block, where M and N are integers, and wherein the splitting rule specifies that each sub-block has a same size.

3. The method of clause 1, wherein the bitstream representation includes a syntax element indicative of the splitting rule or sizes of the sub-blocks.

4. The method of any of clauses 1-3, wherein the splitting rule specifies sizes of the sub-blocks depending on a color component of the current video block.

5. The method of any of clauses 1-4, wherein sub-blocks of a first color component may derive their motion vector information from sub-blocks of a second color component corresponding to the current video block.

The following clauses show example embodiments of techniques discussed in items 2 and 6 in the previous section.

1. A method of video processing, comprising: determining to use a sub-block intra block copy (sbIBC) coding mode in a conversion between a current video block in a video region and a bitstream representation of the current video block in which the current video block is split into multiple sub-blocks and each sub-block is coded based on reference samples from the video region; and performing the conversion using the sbIBC coding mode for the multiple sub-blocks, wherein the conversion includes: determining an initialized motion vector (initMV) for a given sub-block; identifying a reference block from the initMV; and deriving motion vector (MV) information for the given sub-block using MV information for the reference block.

2. The method of clause 1, wherein the determining the initMV includes determining the initMV from one or more neighboring blocks of the given sub-block.

3. The method of clause 2, wherein the one or more neighboring blocks are checked in an order.

4. The method of clause 1, wherein the determining the initMV includes deriving the initMV from a motion candidate list.

5. The method of any of clauses 1-4, wherein the identifying the reference block includes converting the initMV into one-pel precision and identifying the reference block based on the converted initMV.

6. The method of any of clauses 1-4, wherein the identifying the reference block includes applying the initMV to an offset location within the given block, wherein the offset location is denoted as being offset by (offsetX, offsetY) from a predetermined location of the given sub-block.

7. The method of any of clauses 1 to 6, wherein the deriving the MV for the given sub-block includes clipping the MV information for the reference block.

8. The method of any of clauses 1 to 7, wherein the reference block is in a different color component than that of the current video block.

The following clauses show example embodiments of techniques discussed in items 3, 4 and 5 in the previous section.

1. A method of video processing, comprising determining to use a sub-block intra block copy (sbIBC) coding mode in a conversion between a current video block in a video region and a bitstream representation of the current video block in which the current video block is split into multiple sub-blocks and each sub-block is coded based on reference samples from the video region; and performing the conversion using the sbIBC coding mode for the multiple sub-blocks, wherein the conversion includes generating a sub-block IBC candidate.

2. The method of clause 1, wherein the sub-block IBC candidate is added to a candidate list that includes alternative motion vector predictor candidates.

3. The method of clause 1, wherein the sub-block IBC candidate is added to a list that includes affine merge candidates.

The following clauses show example embodiments of techniques discussed in items 7, 8, 9, 10, 11, 12 and 13 in the previous section.

1. A method of video processing, comprising: performing a conversion between a bitstream representation of a current video block and the current video block that is divided into multiple sub-blocks, wherein the conversion includes processing a first sub-block of the multiple sub-blocks using a sub-block intra block coding (sbIBC) mode and a second sub-block of the multiple sub-blocks using an intra coding mode.

2. A method of video processing, comprising: performing a conversion between a bitstream representation of a current video block and the current video block that is divided into multiple sub-blocks, wherein the conversion includes processing all sub-blocks of the multiple sub-blocks using an intra coding mode.

3. A method of video processing, comprising: performing a conversion between a bitstream representation of a current video block and the current video block that is divided into multiple sub-blocks, wherein the conversion includes processing all of the multiple sub-blocks using a palette coding mode in which a palette of representative pixel values is used for coding each sub-block.

4. A method of video processing, comprising: performing a conversion between a bitstream representation of a current video block and the current video block that is divided into multiple sub-blocks, wherein the conversion includes processing a first sub-block of the multiple sub-blocks using a palette mode in which a palette of representative pixel values is used for coding the first sub-block and a second sub-block of the multiple sub-blocks using an intra block copy coding mode.

5. A method of video processing, comprising: performing a conversion between a bitstream representation of a current video block and the current video block that is divided into multiple sub-blocks, wherein the conversion includes processing a first sub-block of the multiple sub-blocks using a palette mode in which a palette of representative pixel values is used for coding the first sub-block and a second sub-block of the multiple sub-blocks using an intra coding mode.

6. A method of video processing, comprising: performing a conversion between a bitstream representation of a current video block and the current video block that is divided into multiple sub-blocks, wherein the conversion includes processing a first sub-block of the multiple sub-blocks using a sub-block intra block coding (sbIBC) mode and a second sub-block of the multiple sub-blocks using an inter coding mode.

7. A method of video processing, comprising: performing a conversion between a bitstream representation of a current video block and the current video block that is divided into multiple sub-blocks, wherein the conversion includes processing a first sub-block of the multiple sub-blocks using a sub-block intra coding mode and a second sub-block of the multiple sub-blocks using an inter coding mode.

The following clauses show example embodiments of techniques discussed in item 14 in the previous section.

8. The method of any of clauses 1-7, wherein the method further includes refraining from updating an IBC history-based motion vector predictor table after the conversion of the current video block.

The following clauses show example embodiments of techniques discussed in item 15 in the previous section.

9. The method of any one or more of clauses 1-7, further including refraining from updating a non-IBC history-based motion vector predictor table after the conversion of the current video block.

The following clauses show example embodiments of techniques discussed in item 16 in the previous section.

10. The method of any of clauses 1-7, wherein the conversion includes selective usage of an in-loop filter that is based on the processing.

The following clauses show example embodiments of techniques discussed in item 1 in the previous section.

17. The method of any of clauses 1-7, wherein the performing the conversion includes performing the conversion by disabling a certain coding mode for the current video block due to using the method, wherein the certain coding mode includes one or more of a sub-block transform, an affine motion prediction, a multiple reference line intra prediction, a matrix-based intra prediction, a symmetric motion vector difference (MVD) coding, a merge with MVD decoder side motion derivation/refinement, a bi-directional optimal flow, a reduced secondary transform, or a multiple transform set.

The following clauses show example embodiments of techniques discussed in item 18 in the previous section.

1. The method of any of above clauses, wherein an indicator in the bitstream representation includes information about how the method is applied to the current video block.

The following clauses show example embodiments of techniques discussed in item 19 in the previous section.

1. A method of video encoding, comprising: making a decision to use the method recited in any of above clauses for encoding the current video block into the bitstream representation; and including information indicative of the decision in the bitstream representation at a decoder parameter set level or a sequence parameter set level or a video parameter set level or a picture parameter set level or a picture header level or a slice header level or a tile group header level or a largest coding unit level or a coding unit level or a largest coding unit row level or a group of LCU level or a transform unit level or a prediction unit level or a video coding unit level.

2. A method of video encoding, comprising: making a decision to use the method recited in any of above clauses for encoding the current video block into the bitstream representation based on an encoding condition; and performing the encoding using the method recited in any of the above clauses, wherein the condition is based on one or more of: a position of coding unit, prediction unit, transform unit, the current video block or a video coding unit of the current video block, a block dimension of the current vide block and/or its neighboring blocks, a block shape of the current video block and/or its neighboring blocks, an intra mode of the current video block and/or its neighboring blocks, motion/block vectors of neighboring blocks of the current video block;

a color format of the current video block;

Coding tree structure;

a slice or a tile group type or a picture type of the current video block;

a color component of the current video block;

a temporal layer ID of the current video block;

a profile or level or a standard used for the bitstream representation.

The following clauses show example embodiments of techniques discussed in item 20 in the previous section.

1. A method of video processing, comprising: determining to use an intra block copy mode and an inter prediction mode for conversion between blocks in a video region and a bitstream representation of the video region; and performing the conversion using the intra block copy mode and the inter prediction mode for a block in the video region.

2. The method of clause 1, wherein the video region comprises a video picture or a video slice or a video tile group or a video tile.

3. The method of any of clauses 1-2, wherein the inter prediction mode uses an alternative motion vector predictor (AMVP) coding mode.

4. The method of any of clauses 1-3, wherein the performing the conversion includes deriving merge candidates for the intra block copy mode from neighboring blocks.

The following clauses show example embodiments of techniques discussed in item 21 in the previous section.

1. A method of video processing, comprising: performing, during a conversion between a current video block and a bitstream representation of the current video block, a motion candidate list construction process depending and/or a table update process for updating history-based motion vector predictor tables, based on a coding condition, and performing the conversion based on the motion candidate list construction process and/or the table update process.

2. The method of clause 1, different processes may be applied when the coding condition is satisfied or unsatisfied.

3. The method of clause 1, when the coding condition is satisfied, the updating of history-based motion vector predictor tables is not applied.

4. The method of clause 1, when the coding condition is satisfied, derivation of candidates from spatial neighboring (adjacent or non-adjacent) blocks is skipped.

5. The method of clause 1, when the coding condition is satisfied, derivation of HMVP candidates is skipped.

6. The method of clause 1, the coding condition comprises the block width times height is no greater than 16 or 32 or 64.

7. The method of clause 1, the coding condition comprises the block is coded with IBC mode.

8. The method of clause 1, wherein the coding condition is as described in item 21.b.s.iv in the previous section.

The method of any of above clauses, wherein the conversion includes generating the bitstream representation from the current video block.

The method of any of above clauses, wherein the conversion includes generating samples of the current video block from the bitstream representation.

A video processing apparatus comprising a processor configured to implement a method recited in any one or more of the above clauses.

A computer readable medium having code stored thereon, the code, upon execution, causing a processor to implement a method recited in any one or more of above clauses.

Figure 24:
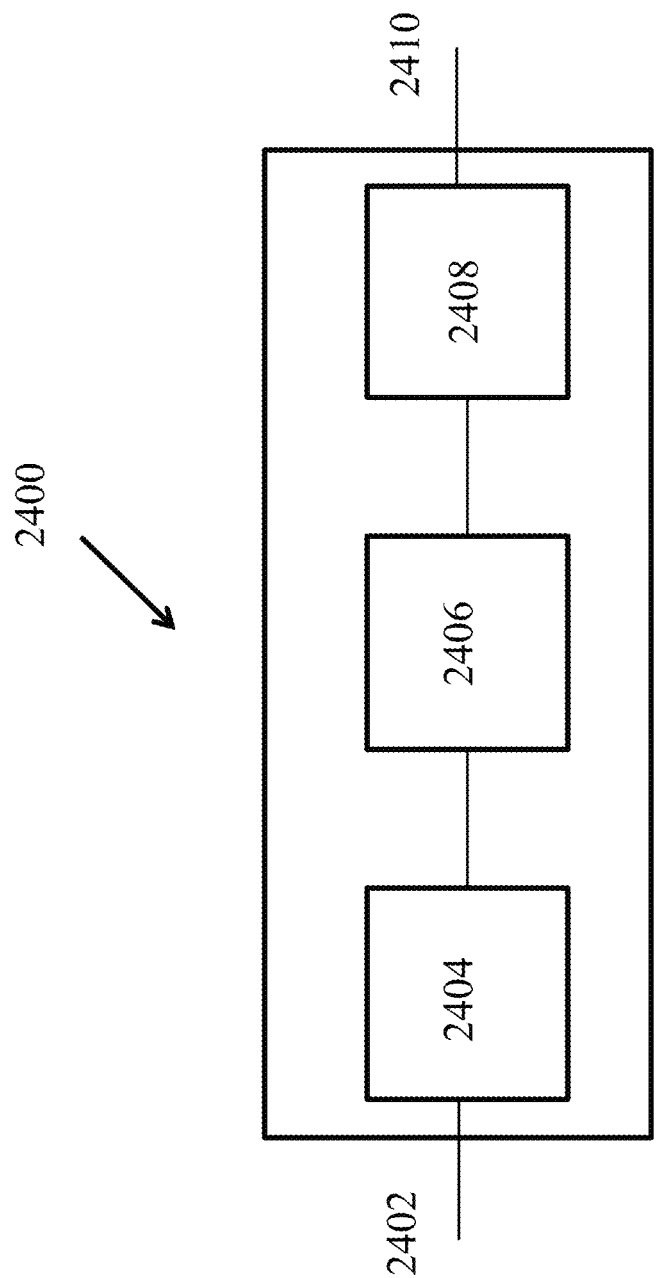
FIG. 24 is a block diagram of an example video processing system in which disclosed techniques may be implemented.

FIG. 24 is a block diagram showing an example video processing system 2400 in which various techniques disclosed herein may be implemented. Various implementations may include some or all of the components of the system 2400. The system 2400 may include input 2402 for receiving video content. The video content may be received in a raw or uncompressed format, e.g., 8 or 10 bit multi-component pixel values, or may be in a compressed or encoded format. The input 2402 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2400 may include a coding component 2404 that may implement the various coding or encoding methods described in the present document. The coding component 2404 may reduce the average bitrate of video from the input 2402 to the output of the coding component 2404 to produce a coded representation of the video. The coding techniques are therefore sometimes called video compression or video transcoding techniques. The output of the coding component 2404 may be either stored, or transmitted via a communication connected, as represented by the component 2406. The stored or communicated bitstream (or coded) representation of the video received at the input 2402 may be used by the component 2408 for generating pixel values or displayable video that is sent to a display interface 2410. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 25:
FIG. 25 is a flowchart representation of a method for video processing in accordance with the present technology.

FIG. 25 is a flowchart representation of a method 2500 for video processing in accordance with the present technology. The method 2500 includes, at operation 2510, determining, for a conversion between a current block of a video and a bitstream representation of the video, that the current block is split into multiple sub-blocks. At least one of the multiple blocks is coded using a modified intra-block copy (IBC) coding technique that uses reference samples from one or more video regions from a current picture of the current block. The method 2500 includes, at operation 2520, performing the conversion based on the determining.

In some embodiments, the video region comprises the current picture, a slice, a tile, a brick, or a tile group. In some embodiments, the current block is split into the multiple sub-blocks in case the current block has a dimension of M×N, M and N being integers. In some embodiments, the multiple sub-blocks have a same size of L×K, L and K being integers. In some embodiments, L=K. In some embodiments, L=4 or K=4.

In some embodiments, the multiple sub-blocks have different sizes. In some embodiments, the multiple sub-blocks have a non-rectangular shape. In some embodiments, the multiple sub-blocks have a triangular or a wedgelet shape.

In some embodiments, a size of at least one of the multiple sub-blocks is determined based on a size of a minimum coding unit, a minimum prediction unit, a minimum transform unit, or a minimum unit for motion information storage. In some embodiments, the size of at least one sub-block is represented as (N1×minW)×(N2×minH), wherein minW× minH represents the size of the minimum coding unit, the prediction unit, the transform unit, or the unit for motion information storage, and wherein N1 and N2 are positive integers. In some embodiments, a size of at least one of the multiple sub-blocks is based on a coding mode in which the current block is coded in the bitstream representation. In some embodiments, the coding mode comprises at least an intra block copy (IBC) merge mode, or a sub-block temporal motion vector prediction mode. In some embodiments, wherein a size of at least one of the multiple sub-blocks is signaled in the bitstream representation.

In some embodiments, the method includes determining that a subsequent block of the video is split into multiple sub-blocks for the conversion, wherein a first sub-block in the current block has a different size than a second sub-block in the subsequent block. In some embodiments, a size of the first sub-block differs from a size of the second sub-block according a dimension of the current block and a dimension of the subsequent block. In some embodiments, a size of at least one of the multiple sub-blocks is based on a color format or a color component of the video. In some embodiments, a first sub-block is associated with a first color component of the video and a second sub-block is associated with a second color component of the video, the first sub-block and the second sub-block having different dimensions. In some embodiments, in case a color format of the video is 4:2:0, the first sub-block associated with a luma component has a dimension of 2L×2K and the second sub-block associated with a chroma component has a dimension of L×K. In some embodiments, in case a color format of the video is 4:2:2, the first sub-block associated with a luma component has a dimension of 2L×2K and the second sub-block associated with a chroma component has a dimension of 2L×K. In some embodiments, a first sub-block is associated with a first color component of the video and a second sub-block is associated with a second color component of the video, the first sub-block and the second sub-block having a same dimension. In some embodiments, the first sub-block associated with a luma component has a dimension of 2L×2K and the second sub-block associated with a chroma component has a dimension of 2L×2K in case the color format of the video is 4:2:0 or 4:4:4.

In some embodiments, a motion vector of a first sub-block associated with a first color component of the video is determined based on one or more sub-blocks associated with a second color component of the video. In some embodiments, the motion vector of the first sub-block is an average of motion vectors of the one or more sub-blocks associated with the second color component. In some embodiments, the current block is partitioned into the multiple sub-blocks based on a single tree partitioning structure. In some embodiments, the current block is associated with a chroma component of the video. In some embodiments, the current block has a size of 4×4.

In some embodiments, motion information of the at least one sub-block of the multiple sub-blocks is determined based on identifying a reference block based on an initial motion vector and determining the motion information of the sub-block based on the reference block. In some embodiments, the reference block is located within the current picture. In some embodiments, the reference block is located within a reference picture of one or more reference pictures. In some embodiments, at least one of the one or more reference pictures is the current picture. In some embodiments, the reference block is located within a collocated reference picture that is collocated with one of the one or more reference pictures according to temporal information. In some embodiments, the reference picture is determined based on motion information of a collated block or neighboring blocks of the collated block. The collocated block is collocated with the current block according to temporal information. In some embodiments, the initial motion vector of the reference block is determined based on one or more neighboring blocks of the current block or one or more neighboring blocks of the sub-block. In some embodiments, the one or more neighboring blocks comprises adjacent blocks and/or non-adjacent blocks of the current block or the sub-block. In some embodiments, at least one of the one or more neighboring blocks and the reference block are located within a same picture. In some embodiments, at least one of the one or more neighboring blocks is located within a reference picture of one or more reference pictures. In some embodiments, at least one of the one or more neighboring blocks is located within a collocated reference picture that is collocated with one of the one or more reference pictures according to temporal information. In some embodiments, the reference picture is determined based on motion information of a collated block or neighboring blocks of the collated block, wherein the collocated block is collocated with the current block according to temporal information.

In some embodiments, the initial motion vector is equal to a motion vector stored in one of the one or more neighboring blocks. In some embodiments, the initial motion vector is determined based on an order in which the one or more neighboring blocks are examined for the conversion. In some embodiments, the initial motion vector is a first identified motion vector associated with the current picture. In some embodiments, the initial motion vector of the reference block is determined based on a list of motion candidates. In some embodiments, the list of motion candidates comprises a list of intra-block copy (IBC) candidates, a list of merge candidates, a list of sub-block temporal motion vector prediction candidates, or a list of history-based motion candidates that is determined based on past motion prediction results. In some embodiments, the initial motion vector is determined based on a selected candidate in the list. In some embodiments, the selected candidate is a first candidate in the list. In some embodiments, the list of candidates is constructed based on a process that uses different spatial neighboring blocks than spatial neighboring blocks in a conventional construction process.

In some embodiments, the initial motion vector of the reference block is determined based on a location of the current block in the current picture. In some embodiments, the initial motion vector of the reference block is determined based on a dimension of the current block. In some embodiments, the initial motion vector is set to a default value. In some embodiments, the initial motion vector is indicated in the bitstream representation in a video unit level. In some embodiments, the video unit comprises a tile, a slice, a picture, a brick, a row of a coding tree unit (CTU), a CTU, a coding tree block (CTB), a coding unit (CU), a prediction unit (PU), or a transform unit (TU). In some embodiments, the initial motion vector for the sub-block is different than another initial motion block for a second sub-block of the current block. In some embodiments, initial motion vectors of the multiple sub-blocks of the current block are determined differently according to a video unit. In some embodiments, the video unit comprises a block, a tile, or a slice.

In some embodiments, prior to identifying the reference block, the initial motion vector is converted to a F-pel integer precision, F being a positive integer greater than or equal to 1. In some embodiments, F is 1, 2, or 4. In some embodiments, the initial motion vector is represented as (vx, vy), and wherein the converted motion vector (vx', vy') is represented as (vx×F, vy×F). In some embodiments, a top-left position of the sub-block is represented as (x,y) and the sub-block has a size of L×K, L being a width of the current sub-block and K being a height of the sub-block. The reference block is identified as an area covering (x+offsetX+vx', y+offsetY+vy'), offsetX and offset being non-negative values. In some embodiments, offsetX is 0 and/or offsetY is 0. In some embodiments, offsetX is equal to L/2, L/2+1, or L/2−1. In some embodiments, offsetY is equal to K/2, K/2+1, or K/2−1. In some embodiments, offsetX and/or offsetY are clipped within a range, the range comprising a picture, a slice, a tile, a brick, or an intra-block copy reference area.

In some embodiments, the motion vector of the sub-block is determined further based on motion information of the reference block. In some embodiments, the motion vector of the sub-block is same as a motion vector of the reference block in case the motion vector of the reference block is directed to the current picture. In some embodiments, the motion vector of the sub-block is determined based on adding the initial motion vector to a motion vector of the reference block in case the motion vector of the reference block is directed to the current picture. In some embodiments, the motion vector of the sub-block is clipped within a range such that the motion vector of the sub-block is directed to an intra-block-copy reference area. In some embodiments, the motion vector of the sub-block is a valid motion vector of an intra-block-copy candidate of the sub-block.

In some embodiments, one or more intra-block copy candidates for the sub-block are determined for determining the motion information of the sub-block. In some embodiments, the one or more intra-block copy candidates are added to a list of motion candidates that comprises one of: a merge candidate for the sub-block, a sub-block temporal motion vector prediction candidate for the sub-block, or an affine merge candidate for the sub-block. In some embodiments, the one or more intra-block copy candidates are positioned before any merge candidate for the sub-block in the list. In some embodiments, the one or more intra-block copy candidates are positioned after any sub-block temporal motion vector prediction candidate for the sub-block in the list. In some embodiments, the one or more intra-block copy candidates are positioned after any inherited or constructed affine candidate for the sub-block in the list. In some embodiments, whether the one or more intra-block copy candidates are added to a list of motion candidates is based on a coding mode of the current block. In some embodiments, the one or more intra-block copy candidates are excluded from the list of motion candidates in case the current block is coded using an intra-block copy (IBC) sub-block temporal motion vector prediction mode.

In some embodiments, whether the one or more intra-block copy candidates are added to the list of motion candidates is based on partitioning structure of the current block. In some embodiments, the one or more intra-block copy candidates are added as a merge candidate of the sub-block in the list. In some embodiments, the one or more intra-block copy candidates are added to the list of motion candidates based on different initial motion vectors. In some embodiments, whether the one or more intra-block copy candidates are added to the list of motion candidates is indicated in the bitstream representation. In some embodiments, whether an index indicating the list of motion candidates is signaled in the bitstream representation is based on a coding mode of the current block. In some embodiments, the index indicating the list of motion candidates that comprises an intra-block copy merge candidate is signaled in the bitstream representation in case the current block is coded using an intra block copy merge mode. In some embodiments, the index indicating the list of motion candidates that comprises an intra-block copy sub-block temporal motion vector prediction candidate is signaled in the bitstream representation in case the current block is coded using an intra block copy sub-block temporal motion vector prediction mode. In some embodiments, a motion vector difference for the intra block copy sub-block temporal motion vector prediction mode is applied to the multiple sub-blocks.

In some embodiments, the reference block and the sub-block are associated with a same color component of the video. In some embodiments, whether the current block is split into the multiple sub-blocks is based on a coding characteristic associated with the current block. In some embodiments, the coding characteristic comprises a syntax flag in the bitstream representation in a decoder parameter set, a sequence parameter set, a video parameter set, a picture parameter set, APS, a picture header, a slice header, a tile group header, Largest Coding Unit (LCU), a Coding Unit (CU), a row of a LCU, a group of LCUs, a transform unit, a prediction unit, a prediction unit block, or a video coding unit. In some embodiments, the coding characteristic comprises a position of a coding unit, a prediction unit, a transform unit, a block, or a video coding unit. In some embodiments, the coding characteristic comprises a dimension of the current block or a neighboring block of the current block. In some embodiments, the coding characteristic comprises a shape of the current block or a neighboring block of the current block. In some embodiments, the coding characteristic comprises an intra coding mode of the current block or a neighboring block of the current block. In some embodiments, the coding characteristic comprises a motion vector of a neighboring block of the current block. In some embodiments, the coding characteristic comprises an indication of a color format of the video. In some embodiments, the coding characteristic comprises a coding tree structure of the current block. In some embodiments, the coding characteristic comprises a slice type, a tile group type, or a picture type associated with the current block. In some embodiments, the coding characteristic comprises a color component associated with the current block. In some embodiments, the coding characteristic comprises a temporal layer identifier associated with the current block. In some embodiments, the coding characteristic comprises a profile, a level, or a tier of a standard for the bitstream representation.

Figure 26:
FIG. 26 is a flowchart representation of another method for video processing in accordance with the present technology.

FIG. 26 is a flowchart representation of a method 2600 for video processing in accordance with the present technology. The method 2600 includes, at operation 2610, determining, for a conversion between a current block of a video and a bitstream representation of the video, that the current block is split into multiple sub-blocks. Each of the multiple sub-blocks is coded in the coded representation using a corresponding coding technique according to a pattern. The method also includes, at operation 2620, performing the conversion based on the determining.

In some embodiments, the pattern specifies that a first sub-block of the multiple sub-blocks is coded using a modified intra-block copy (IBC) coding technique in which reference samples from a video region are used. In some embodiments, the pattern specifies that a second sub-block of the multiple sub-blocks is coded using an intra prediction coding technique in which samples from the same sub-block are used. In some embodiments, the pattern specifies that a second sub-block of the multiple sub-blocks is coded using a palette coding technique in which a palette of representative pixel values is used. In some embodiments, the pattern specifies that a second sub-block of the multiple sub-blocks is coded using an inter coding technique in which temporal information is used.

In some embodiments, the pattern specifies that a first sub-block of the multiple sub-blocks is coded using an intra prediction coding technique in which samples from the same sub-block are used. In some embodiments, the pattern specifies that a second sub-block of the multiple sub-blocks is coded using a palette coding technique in which a palette of representative pixel values is used. In some embodiments, the pattern specifies that a second sub-block of the multiple sub-blocks is coded using an inter coding technique in which temporal information is used.

In some embodiments, the pattern specifies that all of the multiple sub-blocks are coded using a single coding technique. In some embodiments, the single coding technique comprises an intra prediction coding technique in which samples from the same sub-block are used for coding the multiple sub-blocks. In some embodiments, the single coding technique comprises a palette coding technique in which a palette of representative pixel values is used for coding the multiple sub-blocks.

In some embodiments, a history-based table of motion candidates for a sub-block temporal motion vector prediction mode remains same for the conversion in case the pattern of one or more coding techniques applies to the current block, the history-based table of motion candidates determined based on motion information in past conversions. In some embodiments, the history-based table is for the IBC coding technique or a non-IBC coding technique.

In some embodiments, in case the pattern specifies that at least one sub-block of the multiple sub-blocks is coded using the IBC coding technique, one or more motion vectors for the at least one sub-block are used to update a history-based table of motion candidates for an IBC sub-block temporal motion vector prediction mode, the history-based table of motion candidates determined based on motion information in past conversions. In some embodiments, in case the pattern specifies that at least one sub-block of the multiple sub-blocks is coded using the inter coding technique, one or more motion vectors for the at least one sub-block are used to update a history-based table of motion candidates for a non-IBC sub-block temporal motion vector prediction mode, the history-based table of motion candidates determined based on motion information in past conversions.

In some embodiments, usage of a filtering process in which boundaries of the multiple sub-blocks are filtered is based on usage of the at least one coding technique according to the pattern. In some embodiments, the filtering process filtering boundaries of the multiple sub-blocks is applied in case the at least one coding technique is applied. In some embodiments, the filtering process filtering boundaries of the multiple sub-blocks is omitted in case the at least one coding technique is applied.

In some embodiments, a second coding technique is disabled for the current block for the conversion according to the pattern. In some embodiments, the second coding technique comprises at least one of: a sub-block transform coding technique, an affine motion prediction coding technique, a multiple-reference-line intra prediction coding technique, a matrix-based intra prediction coding technique, a symmetric motion vector difference (MVD) coding technique, a merge with a MVD decoder-side motion derivation or refinement coding technique, a bi-directional optimal flow coding technique, a secondary transform coding technique with a reduced dimension based on a dimension of the current block, or a multiple-transform-set coding technique.

In some embodiments, usage of the at least one coding technique according to the pattern is signaled in the bitstream representation. In some embodiments, the usage is signaled in at a sequence level, a picture level, a slice level, a tile group level, a tile level, a brick level, a coding tree unit (CTU) level, a coding tree block (CTB) level, a coding unit (CU) level, a prediction unit (PU) level, a transform unit (TU), or at another video unit level. In some embodiments, the at least one coding technique comprises the modified IBC coding technique, and the modified IBC coding technique is indicated in the bitstream representation based on an index value indicating a candidate in a motion candidate list. In some embodiments, a predefined value is assigned to the current block coded using modified IBC coding technique.

In some embodiments, usage of the at least one coding technique according to the pattern is determined during the conversion. In some embodiments, usage of an intra-block copy (IBC) coding technique for coding the current block in which reference samples from the current block are used is signaled in the bitstream. In some embodiments, usage of an intra-block copy (IBC) coding technique for coding the current block in which reference samples from the current block are used is determined during the conversion.

In some embodiments, motion information of the multiple sub-blocks of the current block is used as a motion vector predictor for a conversion between a subsequent block of the video and the bitstream representation. In some embodiments, motion information of the multiple sub-blocks of the current block is disallowed to be used for a conversion between a subsequent block of the video and the bitstream representation. In some embodiments, the determining that the current block is split into the multiple sub-blocks coded using the at least one coding technique is based on whether a motion candidate is a candidate is applicable for a block of video or a sub-block within the block.

Figure 27:
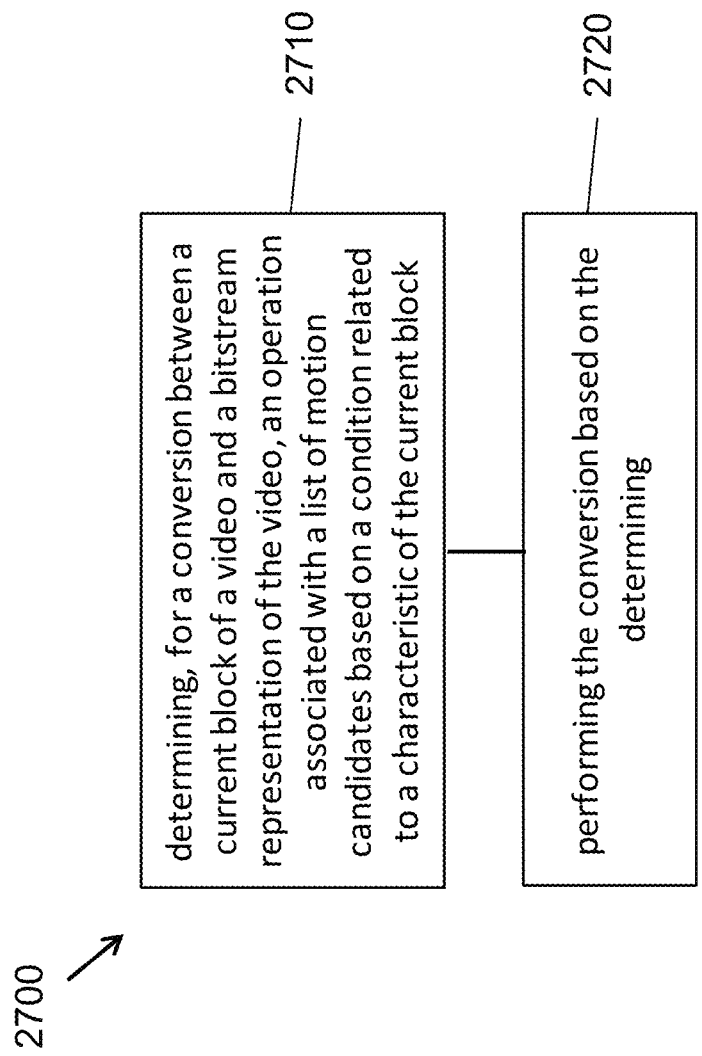
FIG. 27 is a flowchart representation of another method for video processing in accordance with the present technology.

FIG. 27 is a flowchart representation of a method 2700 for video processing in accordance with the present technology. The method 2700 includes, at operation 2710, determining, for a conversion between a current block of a video and a bitstream representation of the video, an operation associated with a list of motion candidates based on a condition related to a characteristic of the current block. The list of motion candidates is constructed for a coding technique or based on information from previously processed blocks of the video. The method 2700 also includes, at operation 2720, performing the conversion based on the determining.

In some embodiments, the coding technique comprises a merge coding technique, an intra block copy (IBC) sub-block temporal motion vector prediction coding technique, a sub-block merge coding technique, an IBC coding technique, or a modified IBC coding technique that uses reference samples from a video region of the current block for coding at least one sub-block of the current block.

In some embodiments, the current block has a dimension of W×H, W and H being positive integers. The condition is related to the dimension of the current block. In some embodiments, the condition is related to coded information of the current block or coded information of a neighboring block of the current block. In some embodiments, the condition is related to a merge sharing condition for sharing the list of motion candidates between the current block and another block.

In some embodiments, the operation comprises deriving a spatial merge candidate for the list of motion candidates using a merge coding technique. In some embodiments, the operation comprises deriving a motion candidate for the list of motion candidates based on a spatial neighboring block of the current block. In some embodiments, the spatial neighboring block comprises an adjacent block or a non-adjacent block of the current block.

In some embodiments, the operation comprises deriving a motion candidate for the list of motion candidates that is constructed based on the information from previously processed blocks of the video. In some embodiments, the operation comprises deriving a pairwise merge candidate for the list of motion candidates. In some embodiments, the operation comprises one or more pruning operations that remove redundant entries in the list of motion candidates. In some embodiments, the one or more pruning operations are for spatial merge candidates in the list of motion candidates.

In some embodiments, the operation comprises updating, after the conversion, the list of motion candidates that is constructed based on the information from previously processed blocks of the video. In some embodiments, the updating comprises adding a derived candidate into the list of motion candidates without a pruning operation that removes redundancy in the list of motion candidates. In some embodiments, the operation comprises adding a default motion candidate in the list of motion candidates. In some embodiments, the default motion candidate comprises a zero motion candidate using an IBC sub-block temporal motion vector prediction coding technique. In some embodiments, the operation is skipped in case the condition is satisfied.

In some embodiments, the operation comprises checking motion candidates in the list of motion candidates in a predefined order. In some embodiments, the operation comprises checking a predefined number of motion candidates in the list of motion candidates. In some embodiments, the condition is satisfied in case W×H is greater than or equal to a threshold. In some embodiments, the condition is satisfied in case W×H is greater than or equal to the threshold and the current block is coded using the IBC sub-block temporal motion vector prediction coding technique or the merge coding technique. In some embodiments, the threshold is 1024.

In some embodiments, the condition is satisfied in case W and/or H is greater than or equal to a threshold. In some embodiments, the threshold is 32. In some embodiments, the condition is satisfied in case W×H is smaller than or equal to a threshold and the current block is coded using the IBC sub-block temporal motion vector prediction coding technique or the merge coding technique. In some embodiments, the threshold is 16. In some embodiments, the threshold is 32 or 64. In some embodiments, in case the condition is satisfied, the operation that comprises inserting a candidate determined based on a spatial neighboring block into the list of motion candidates is skipped.

In some embodiments, the condition is satisfied in case W is equal to T2, H is equal to T3, and a neighboring block above the current block is available and is coded using a same coding technique as the current block, T2, and T3 being positive integers. In some embodiments, the condition is satisfied in case the neighboring block and the current block are in a same coding tree unit.

In some embodiments, the condition is satisfied in case W is equal to T2, H is equal to T3, and a neighboring block above the current block is not available or is outside of a current coding tree unit in which the current block is located, T2 and T3 being positive integers. In some embodiments, T2 is 4 and T3 is 8. In some embodiments, the condition is satisfied in case W is equal to T4, H is equal to T5, and a neighboring block to the left of the current block is available and is coded using a same coding technique as the current block, T4, and T5 being positive integers. In some embodiments, the condition is satisfied in case W is equal to T4, H is equal to T5, and a neighboring block to the left of the current block is unavailable, T4 and T5 being positive integers. In some embodiments, T4 is 8 and T5 is 4.

In some embodiments, the condition is satisfied in case W×H is smaller than or equal to a threshold, the current block is coded using the IBC sub-block temporal motion vector prediction coding technique or the merge coding technique, and both a first neighboring block above the current block and a second neighboring block to the left of the current block are coded using a same coding technique. In some embodiments, the first and second neighboring blocks are available and coded using the IBC coding technique, and wherein the second neighboring block is within a same coding tree unit as the current block. In some embodiments, the first neighboring block is unavailable, and wherein the second neighboring block is available and within a same coding tree unit as the current block. In some embodiments, the first and second neighboring blocks are unavailable. In some embodiments, the first neighboring block is available, and the second neighboring block is unavailable. In some embodiments, the first neighboring block is unavailable, and the second neighboring block is outside a coding tree unit in which the current block is located. In some embodiments, the first neighboring block is available, and the second neighboring block is outside a coding tree unit in which the current block is located. In some embodiments, the threshold is 32. In some embodiments, the first and second neighboring blocks are used for deriving a spatial merge candidate. In some embodiments, a top-left sample of the current block is positioned at (x, y), and wherein the second neighboring block covers a sample positioned at (x−1, y+H−1). In some embodiments, a top-left sample of the current block is positioned at (x, y), and wherein the second neighboring block covers a sample positioned at (x+W−1, y−1).

In some embodiments, the same coding technique comprises an IBC coding technique. In some embodiments, the same coding technique comprises an inter coding technique. In some embodiments, the neighboring block of the current block has a dimension equal to A×B. In some embodiments, the neighboring block of the current block has a dimension greater than A×B. In some embodiments, the neighboring block of the current block has a dimension smaller than A×B. In some embodiments, A×B is equal to 4×4. In some embodiments, the threshold is predefined. In some embodiments, the threshold is signaled in the bitstream representation. In some embodiments, the threshold is based on a coding characteristic of the current block, the coding characteristic comprising a coding mode in which the current block is coded.

In some embodiments, the condition is satisfied in case the current block has a parent node that shares the list of motion candidates and the current block is coded using the IBC sub-block temporal motion vector prediction coding technique or the merge coding technique. In some embodiments, the condition adaptively changes according to a coding characteristic of the current block.

Figure 28:
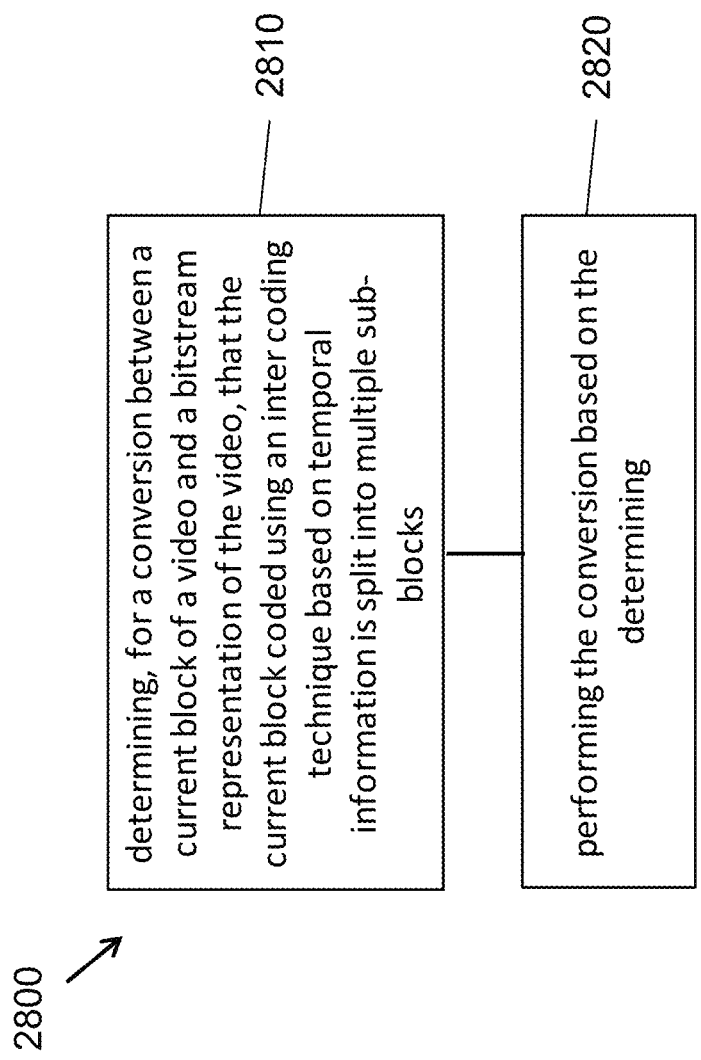
FIG. 28 is a flowchart representation of yet another method for video processing in accordance with the present technology.

FIG. 28 is a flowchart representation of a method 2800 for video processing in accordance with the present technology. The method 2800 includes, at operation 2810, determining, for a conversion between a current block of a video and a bitstream representation of the video, that the current block coded using an inter coding technique based on temporal information is split into multiple sub-blocks. At least one of the multiple blocks is coded using a modified intra-block copy (IBC) coding technique that uses reference samples from one or more video regions from a current picture that includes the current block. The method 2800 includes, at operation 2820, performing the conversion based on the determining.

In some embodiments, a video region comprises the current picture, a slice, a tile, a brick, or a tile group. In some embodiments, the inter coding technique comprises a sub-block temporal motion vector coding technique, and wherein one or more syntax elements indicating whether the current block is coded based on both the current picture and a reference picture different than the current picture are included in the bitstream representation. In some embodiments, the one or more syntax elements indicate the reference picture used for coding the current block in case the current block is coded based on both the current picture and the reference picture. In some embodiments, the one or more syntax elements further indicate motion information associated with the reference picture, the motion information comprising at least a motion vector prediction index, a motion vector difference, or a motion vector precision. In some embodiments, a first reference picture list includes only the current picture and a second reference picture list includes only the reference picture. In some embodiments, the inter coding technique comprises a temporal merge coding technique, and motion information is determined based on a neighboring block of the current block, the motion information comprising at least a motion vector or a reference picture. In some embodiments, the motion information is only applicable to the current picture in case the neighboring block is determined based on the current picture only. In some embodiments, the motion information is applicable to both the current picture and the reference picture in case the neighboring block is determined based on both the current picture and the reference picture. In some embodiments, the motion information is applicable to the current picture only in case the neighboring block is determined based on both the current picture and the reference picture. In some embodiments, the neighboring block is discarded for determining a merge candidate in case the neighboring block is determined based only the reference picture.

In some embodiments, a fixed weighting factor is assigned to reference blocks from the current picture and reference blocks from the reference picture. In some embodiments, the fixed weighting factor is signaled in the bitstream representation.

In some embodiments, performing the conversion includes generating the bitstream representation based on the block of the video. In some embodiments, performing the conversion includes generating the block of the video from the bitstream representation.

It will be appreciated that techniques for video encoding or video decoding are disclosed. These techniques may be adopted by video encoders or decoders for using intra block copy and sub-block based video processing together to achieve greater coding efficiency and performance.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of video processing, comprising:
constructing, for a conversion between a first video block of a video and the bitstream of the video, a block vector candidate list;
determining, based on the block vector candidate list, a motion information for the first video block in a first prediction mode, wherein in the first prediction mode, prediction samples of the first video block are derived from blocks of sample values of a same video region including the first video block;
determining whether to update a first history-based predictor table with the motion information of the first video block based on a first condition that relates to a size of the first video block; and
performing the conversion based on the motion information of the first video block;
wherein the first history-based predictor table includes a set of block vector candidates, each of which is associated with corresponding motion information of a previous video block in a picture including the first video block, and arrangement of the motion candidates in the history-based predictor table is based on a sequence of addition of the motion candidates into the table,
wherein the first history-based predictor table is updated with the motion information of the first video block in response to the size of the first video block being greater than a threshold.

2. The method of claim 1, wherein in the first prediction mode, constructing the block vector candidate list comprises inserting block vector candidates derived from spatial neighboring blocks of the first video block.

3. The method of claim 2, wherein block vector candidates derived from spatial neighboring blocks of the first video block are inserted to the block vector candidate list in response to the size of the video block being greater than the threshold.

4. The method of claim 2, wherein block vector candidates derived from spatial neighboring blocks of the first video block are inserted to the block vector candidate list in response to the prediction modes of the spatial neighboring blocks being same as the first prediction mode.

5. The method of claim 2, wherein in the first prediction mode, one or more pruning operations are performed when inserting the block vector candidates to the block vector candidate list, and the number of maximum pruning operations is reduced or set to 0 in response to the size of the first video block being no greater than the threshold.

6. The method of claim 2, wherein the block vector candidate list only includes motion candidates from the first history-based predictor table and/or default candidates in response to the size of the first video block being no greater than the threshold.

7. The method of claim 1, wherein the size of the first video block being greater than the threshold is W×H being greater than 16, wherein W is a width of the video block and H is a height of the first video block.

8. The method of claim 1, wherein a motion candidate list and a second history-based predictor table are applied in a second prediction mode for a second video block of the video,
wherein in the second prediction mode, prediction samples of the second video block are derived from blocks of sample values of a picture different from the picture comprising the second video block,
wherein the second history-based predictor table is updated in response to a second condition relating to relationship between size of the second video block and a threshold included in the bitstream being satisfied.

9. The method of claim 8, wherein a pruning operation among a motion candidate from the second history-based predictor table and other motion candidates which have existed in the motion candidate list is removed.

10. The method of claim 1, wherein the conversion includes encoding the current video block into the bitstream.

11. The method of claim 1, wherein the conversion includes decoding the current video block from the bitstream.

12. An apparatus for processing video data comprising a processor and a non-transitory memory with instructions thereon, wherein the instructions upon execution by the processor, cause the processor to:
construct, for a conversion between a first video block of a video and the bitstream of the video, a block vector candidate list;
determining, based on the block vector candidate list, a motion information for the first video block in a first prediction mode, wherein in the first prediction mode, prediction samples of the first video block are derived from blocks of sample values of a same video region including the first video block;
determine, whether to update a first history-based predictor table with the motion information of the first video block based on a first that relates to a size of the first video block; and
perform the conversion based on the motion information of the first video block;
wherein the first history-based predictor table includes a set of block vector candidates, each of which is associated with corresponding motion information of a previous video block in a picture including the first video block, and arrangement of the motion candidates in the history-based predictor table is based on a sequence of addition of the motion candidates into the table,
wherein the first history-based predictor table is updated with the motion information of the first video block in response to the size of the first video block being greater than a threshold.

13. The apparatus of claim 12, wherein the size of the first video block being greater than the threshold is W×H being greater than 16, wherein W is a width of the first video block and H is a height of the first video block.

14. The apparatus of claim 12, wherein a second history-based predictor table is updated with a second motion information of the video block in response to a second condition relating to relationship between a size of the second video block and a threshold included in the bitstream being satisfied, and
wherein a motion candidate list and the second history-based predictor table are applied in a second prediction mode for a second video block of the video,
wherein in the second prediction mode, prediction samples of the video block are derived from blocks of sample values of a picture different from the picture comprising the second video block.

15. A non-transitory computer-readable storage medium storing instructions that cause a processor to:
construct, for a conversion between a first video block of a video and the bitstream of the video, a block vector candidate list;
determining, based on the block vector candidate list, a motion information for the first video block in a first prediction mode, wherein in the first prediction mode, prediction samples of the first video block are derived from blocks of sample values of a same video region including the first video block;
determine, whether to update a first history-based predictor table with the motion information of the first video block based on a first condition that relates to a size of the first video block; and
perform the conversion based on the motion information of the first video block;
wherein the first history-based predictor table includes a set of block vector candidates, each of which is associated with corresponding motion information of a previous video block in a picture including the first video block, and arrangement of the motion candidates in the history-based predictor table is based on a sequence of addition of the motion candidates into the table,
wherein the first history-based predictor table is updated with the motion information of the first video block in response to the size of the first video block being greater than a threshold.

16. A non-transitory computer-readable recording medium storing a bitstream of a video which is generated by a method performed by a video processing apparatus, wherein the method comprises:
constructing, for a conversion between a first video block of a video and the bitstream of the video, a block vector candidate list;

determining, based on the block vector candidate list, a motion information for the first video block in a first prediction mode, wherein in the first prediction mode, prediction samples of the first video block are derived from blocks of sample values of a same video region including the first video block;

determining, whether to update a first history-based predictor table with the motion information of the first video block based on a first condition that relates to a size of the first video block; and performing the conversion based on the motion information of the first video block;

generating the bitstream based on the motion information of the first video block;

wherein the first history-based predictor table includes a set of block vector candidates, each of which is associated with corresponding motion information of a previous video block in a picture including the first video block, and arrangement of the motion candidates in the history-based predictor table is based on a sequence of addition of the motion candidates into the table, wherein the first history-based predictor table is updated with the motion information of the first video block in response to the size of the first video block being greater than a threshold.

17. The non-transitory computer-readable storage medium of claim 15,
wherein a candidate list and a second history-based predictor table are applied in a second prediction mode for a second video block of the video,
wherein in the second prediction mode, prediction samples of the video block are derived from blocks of sample values of a picture different from the picture comprising the second video block,
wherein the second history-based predictor table is updated in response to a second condition relates to relationship between the size of the second video block and a threshold included in the bitstream being satisfied.

18. The non-transitory computer-readable storage medium of claim 15, wherein in the first prediction mode, constructing the first block vector candidate list comprises inserting block vector candidates derived from spatial neighboring blocks of the first video block.

19. The non-transitory computer-readable recording medium of claim 16,
wherein a motion candidate list and a second history-based predictor table are applied in a second prediction mode for a second video block of the video,
wherein in the second prediction mode, prediction samples of the video block are derived from blocks of sample values of a picture different from the picture comprising the second video block,
wherein the second history-based predictor table is updated in response to a second condition relates to relationship between the size of the second video block and a threshold included in the bitstream being satisfied.

20. The non-transitory computer-readable recording medium of claim 16, wherein in the first prediction mode, constructing the first block vector candidate list comprises inserting block vector candidates derived from spatial neighboring blocks of the first video block.

* * * * *